US009278773B2

(12) United States Patent
Arima et al.

(10) Patent No.: US 9,278,773 B2
(45) Date of Patent: Mar. 8, 2016

(54) FILM-FITTING DEVICE

(71) Applicant: FUJI SEAL INTERNATIONAL, INC., Osaka-shi, Osaka (JP)

(72) Inventors: Koji Arima, Itami (JP); Takuji Sawamura, Sakai (JP); Takato Sonoda, Nara (JP); Hiroshi Sugimoto, Osakasayama (JP); Daisuke Yabe, Suita (JP)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 526 days.

(21) Appl. No.: 13/673,184

(22) Filed: Nov. 9, 2012

(65) Prior Publication Data

US 2013/0118136 A1 May 16, 2013

Related U.S. Application Data

(60) Provisional application No. 61/564,043, filed on Nov. 28, 2011, provisional application No. 61/563,974, filed on Nov. 28, 2011.

(30) Foreign Application Priority Data

| Nov. 14, 2011 | (JP) | 2011-248968 |
| Nov. 14, 2011 | (JP) | 2011-249034 |
| Dec. 5, 2011 | (JP) | 2011-265552 |
| Jan. 27, 2012 | (JP) | 2012-014899 |
| Feb. 8, 2012 | (JP) | 2012-024723 |
| Aug. 29, 2012 | (JP) | 2012-188387 |
| Sep. 28, 2012 | (JP) | 2012-218375 |

(51) Int. Cl.
*B65B 9/14* (2006.01)
*B65C 3/06* (2006.01)
(Continued)

(52) U.S. Cl.
CPC ............... *B65C 3/065* (2013.01); *B29C 63/423* (2013.01); *B65B 9/14* (2013.01); *B65C 9/42* (2013.01)

(58) Field of Classification Search
CPC ...... B65B 61/06; B65B 21/245; B65B 21/24; B65B 9/14; B65B 9/13; B65C 3/065; B65C 9/0065; B29C 63/426; B29C 63/423
USPC ................................. 53/556, 567, 585
See application file for complete search history.

(56) References Cited

U.S. PATENT DOCUMENTS 4,545,181 A * 10/1985 Frankefort ............ B65C 3/065
53/295
4,565,592 A * 1/1986 Wehrmann et al. .... B65H 3/065
156/350

(Continued)

FOREIGN PATENT DOCUMENTS

EP 1 845 019 A1 10/2007
EP 2 154 072 A1 2/2010
(Continued)

OTHER PUBLICATIONS

International Search Report issued in International Patent Application No. PCT/JP2012/079879 dated Mar. 11, 2013, 3 pages.
(Continued)

*Primary Examiner* — Stephen F Gerrity
(74) *Attorney, Agent, or Firm* — Oliff PLC

(57) ABSTRACT

A film-fitting device includes a cutting mechanism that cuts a label-forming medium into a predetermined length, a film transfer mechanism that transfers downstream a tubular film arranged around a mandrel, and a shot roller that receives the tubular film transferred by the film transfer mechanism and delivers the tubular film downstream while rotating the tubular film in the circumferential direction. The distance from the cutting mechanism to the shot roller and the distance from the film transfer mechanism to the shot roller are both greater than the length of the tubular film formed by the cutting. Further, rotational drive of the shot roller is carried out by an independent servo motor or stepping motor.

22 Claims, 50 Drawing Sheets

(51) Int. Cl.
*B65C 9/42* (2006.01)
*B29C 63/42* (2006.01)

(56) References Cited

U.S. PATENT DOCUMENTS

| | | | | |
|---|---|---|---|---|
| 4,910,941 | A * | 3/1990 | Nagano et al. | B65C 3/065 53/291 |
| 6,016,641 | A * | 1/2000 | Nagano | B65C 3/065 53/291 |
| 6,502,488 | B1 * | 1/2003 | Taylor | B65C 9/0065 82/130 |
| 6,684,599 | B1 * | 2/2004 | Fresnel | B65C 3/065 53/585 |
| 2003/0145702 | A1 * | 8/2003 | Eiban | B65C 3/065 83/54 |
| 2005/0072510 | A1 * | 4/2005 | Navarro et al. | B65C 3/065 156/64 |
| 2006/0090624 | A1 * | 5/2006 | Chen | B65C 9/0065 83/651 |
| 2010/0037556 | A1 | 2/2010 | Fresnel | |
| 2010/0093507 | A1 | 4/2010 | Hoeben | |
| 2010/0163164 | A1 * | 7/2010 | Deonarine et al. | B65C 3/065 156/229 |

FOREIGN PATENT DOCUMENTS

| | | |
|---|---|---|
| JP | B2-6-98973 | 12/1994 |
| WO | WO 2008/076718 A1 | 6/2008 |
| WO | WO 2008/088210 A1 | 7/2008 |

OTHER PUBLICATIONS

Written Opinion issued in International Patent Application No. PCT/JP2012/079879 dated Mar. 11, 2013, 7 pages.

* cited by examiner (I)   (II)   (III)

(I)   (II)   (III)

FIG. 22a
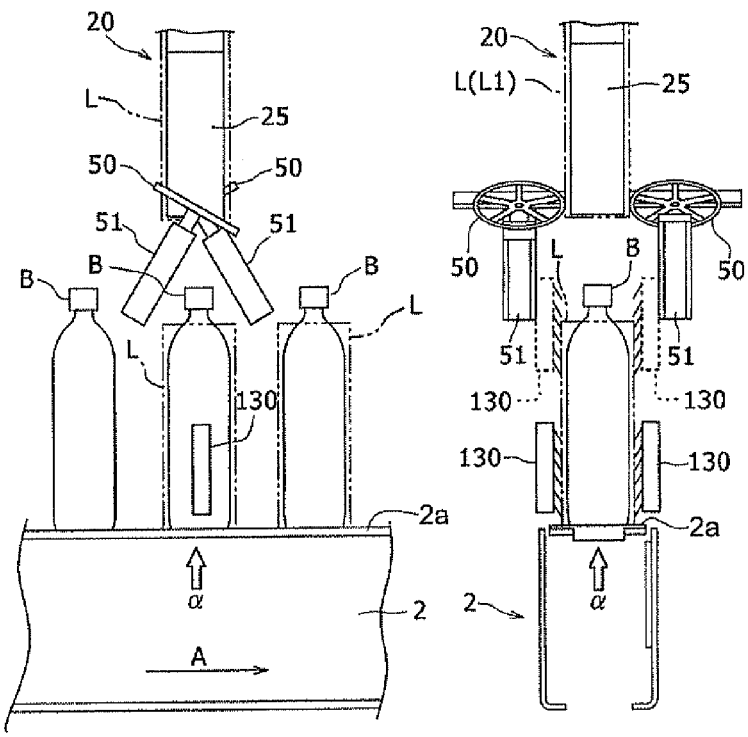
FIG. 22b
FIG. 23
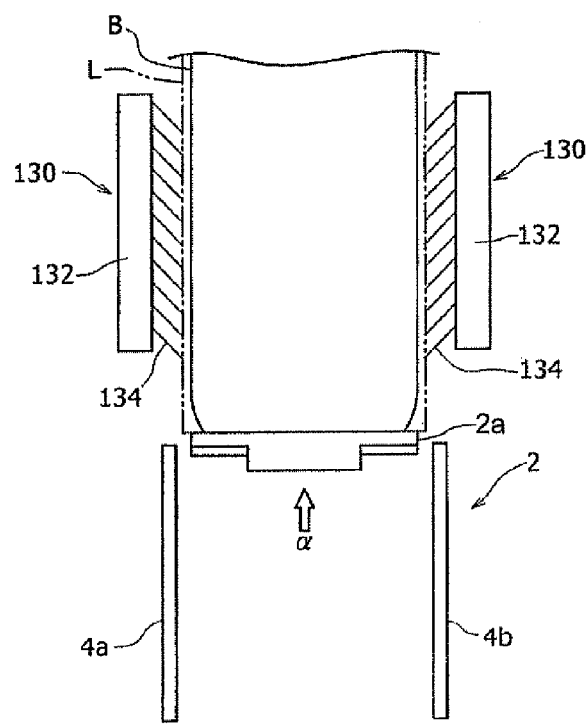

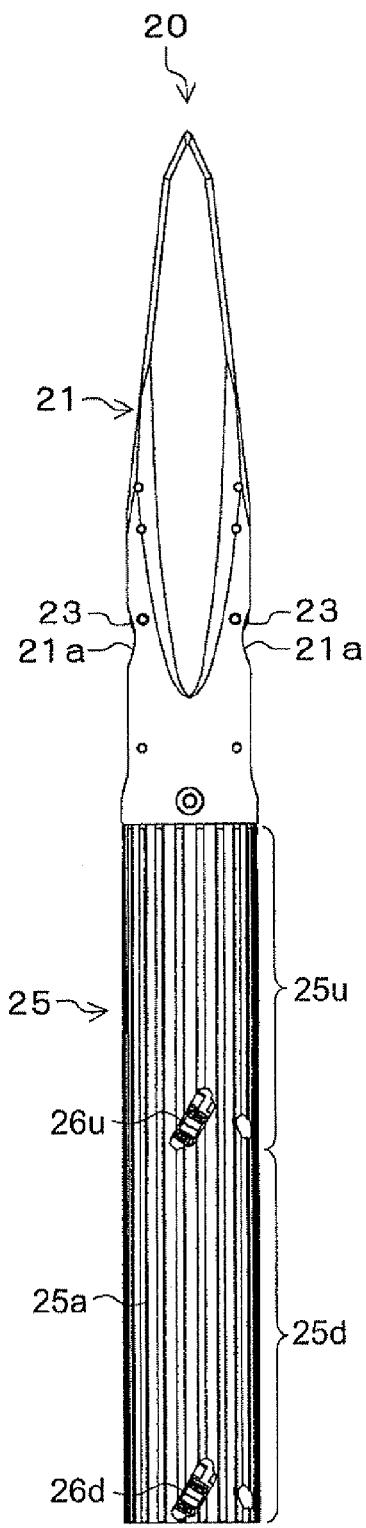
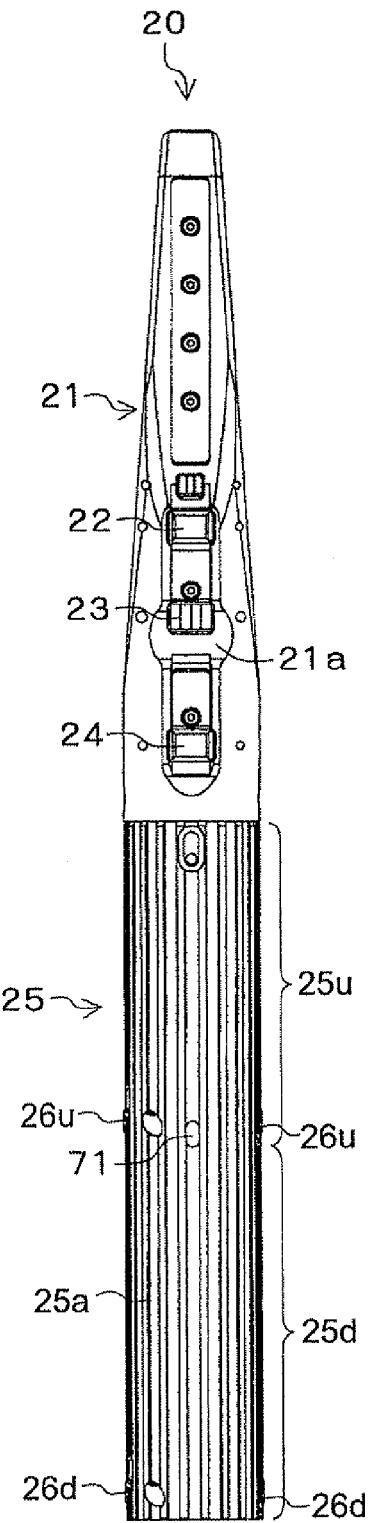

FIG. 53
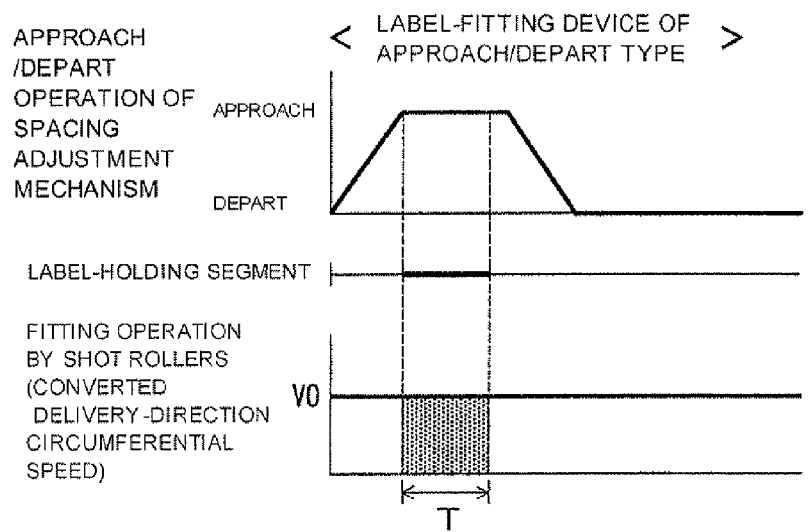
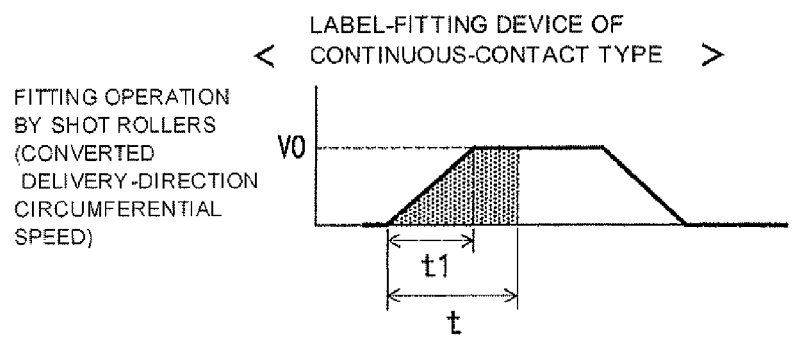

PRIOR ART

PRIOR ART

PRIOR ART

FILM-FITTING DEVICE

FIELD OF INVENTION

The present invention relates to a film-fitting device for fitting a tubular film such as a cap seal or a label around a body to be subjected to fitting such as a bottle container, and more particularly to a film-fitting device suitable for thin tubular films.

RELATED ART

As a label-fitting device for arranging a tubular label L formed of a thin film around the trunk of a bottle container B, there has been disclosed a device as shown in FIG. 56, for example. In this film-fitting device 980, as can be seen in FIG. 56, a label-forming medium M in the shape of a long band composed of continuously connected tubular labels L in folded sheet-like form is opened into a predetermined form by being arranged around a cylindrical mandrel 981, and at the same time, the label-forming medium M is fed to the lower part of the mandrel 981 by feed rollers 982. By sequentially cutting the label-forming medium M into a predetermined length by a cut unit 983 disposed surrounding the central part of the mandrel at a cutting position, individual labels L are formed. Subsequently, by sequentially delivering the opened individual labels L to a predetermined label-fitting position by means of a roller 984, the labels L are arranged around the trunks of containers B that are sequentially transported to the label-fitting position.

As shown in FIG. 56, the roller 984 is arranged in a slanted state with respect to the label L delivery direction. By rotating the roller 984 while the roller 984 is holding the label L against the mandrel 981, the roller 984 delivers the label L downward while rotating the label L in the circumferential direction.

By delivering the label L downward while rotating in the circumferential direction as described above, the tubular label L unfolds in the radially outward direction, and the lower end part of the label L ejected from the mandrel 981 is prevented from deflating. This arrangement is advantageous in that, even when the label L is composed of a thin film, the label L can be reliably arranged around the trunk of the bottle container B.

In the above-described label-fitting device 980, in order to deliver the label L cut apart from the label-forming medium M downward using the roller 984, it is necessary to hold the lower end part of the label-forming medium M between the roller 984 and the mandrel 981 before the label L is cut apart from the label-forming medium M.

However, as described above, because the roller 984 rotates the end of the label-forming medium M in the circumferential direction when causing the label-forming medium M to be held between the roller 984 and the mandrel 981, the label-forming medium M becomes twisted and may become damaged during the period until the label L is cut apart from the label-forming medium M.

Further, as described above, in order to ensure arrangement of the label L composed of a thin film around the trunk of the bottle container B, the label L must be in an opened, substantially cylindrical shape at the point when the label L begins to be fitted around the bottle container B; i.e., at the initial stage of the label L delivery. Accordingly, after the rotational drive of the roller 984 for arranging the label L around the bottle container B is started, the rotational speed must be increased up to a speed corresponding to the final fitting speed in the shortest possible amount of time. Here, when delivering the label L while rotating the label L in the circumferential direction, in order to attain a delivery speed equivalent to that reached in the case of delivering without rotating the label L in the circumferential direction, the rotational speed of the roller 984 must be increased considerably. For example, when the roller 984 inclination angle is 60 degrees, the rotational speed must be approximately doubled. This results in requiring a longer time for acceleration, such that, disadvantageously, it is not possible to sufficiently benefit from the advantage achieved by delivering the label L while rotating the label L in the circumferential direction.

In light of the above, an object of the present invention is to provide a film-fitting device of the type that delivers a tubular film while rotating the tubular film in the circumferential direction, in which damages to the tubular film are prevented and the tubular film can be reliably fitted around a body to be subjected to fitting. Another object of the present invention is to provide a film-fitting method for such a film-fitting device.

SUMMARY OF THE INVENTION

According to one aspect of the present invention, there is provided a film-fitting device which sequentially delivers tubular films downstream while opening each tubular film by arranging the tubular film around a mandrel, and thereby causes the tubular film to be fitted around a body to be subjected to fitting that is transported to a position facing the mandrel. The film-fitting device comprises: a cutting mechanism that cuts a label-forming medium into a predetermined length so as to form a tubular film having the predetermined length; a film transfer mechanism that transfers downstream the tubular film arranged around the mandrel; and at least one shot roller installed with its rotational shaft being slanted with respect to an axis core of the mandrel. The shot roller receives the tubular film transferred by the film transfer mechanism, by causing the tubular film to be held between the shot roller and the mandrel, and delivers the tubular film downstream while rotating the tubular film in a circumferential direction. In this film-fitting device, a distance from the cutting mechanism to the shot roller and a distance from the film transfer mechanism to the shot roller are both greater than the length of the tubular film formed by the cutting, and rotational drive of the shot roller is carried out by an independent servo motor or stepping motor.

According to another aspect of the present invention, there is provided a film-fitting method comprising sequentially delivering tubular films downstream while opening each tubular film by arranging the tubular film around a mandrel, and thereby causing the tubular film to be fitted around a body to be subjected to fitting that is transported to a position facing the mandrel, each tubular film being formed to have a tubular shape by overlapping two side edge portions of a film in a width direction with each other and joining the overlapped part, the tubular film having a non-joint part on a tip side of the joint part at a first side edge portion which is located on an inner side of the overlapped part. In this film-fitting method, the tubular film is delivered from the mandrel to the body to be subjected to fitting by delivering the tubular film downstream while rotating the tubular film in a tip direction of a second side edge portion of the tubular film which is located on an outer side of the overlapped part.

BRIEF DESCRIPTION OF THE DRAWINGS

FIG. 22a is a front view of a label-fitting device provided with check members on lateral sides of the label-fitting position.

FIG. 22b is a side view of the above-noted label-fitting device.

FIG. 23 is an enlarged view of the check members shown in FIG. 22a.

FIG. 36a is a front view of a mandrel constituting the above-noted label-fitting device.

FIG. 36b is a side view of the mandrel constituting the above-noted label-fitting device.

FIG. 53 shows a timing chart showing a label-fitting period in the above-noted label-fitting device, and a timing chart showing a label-fitting period in a continuous-contact type fitting device.

DETAILED DESCRIPTION OF THE INVENTION

Figure 1:
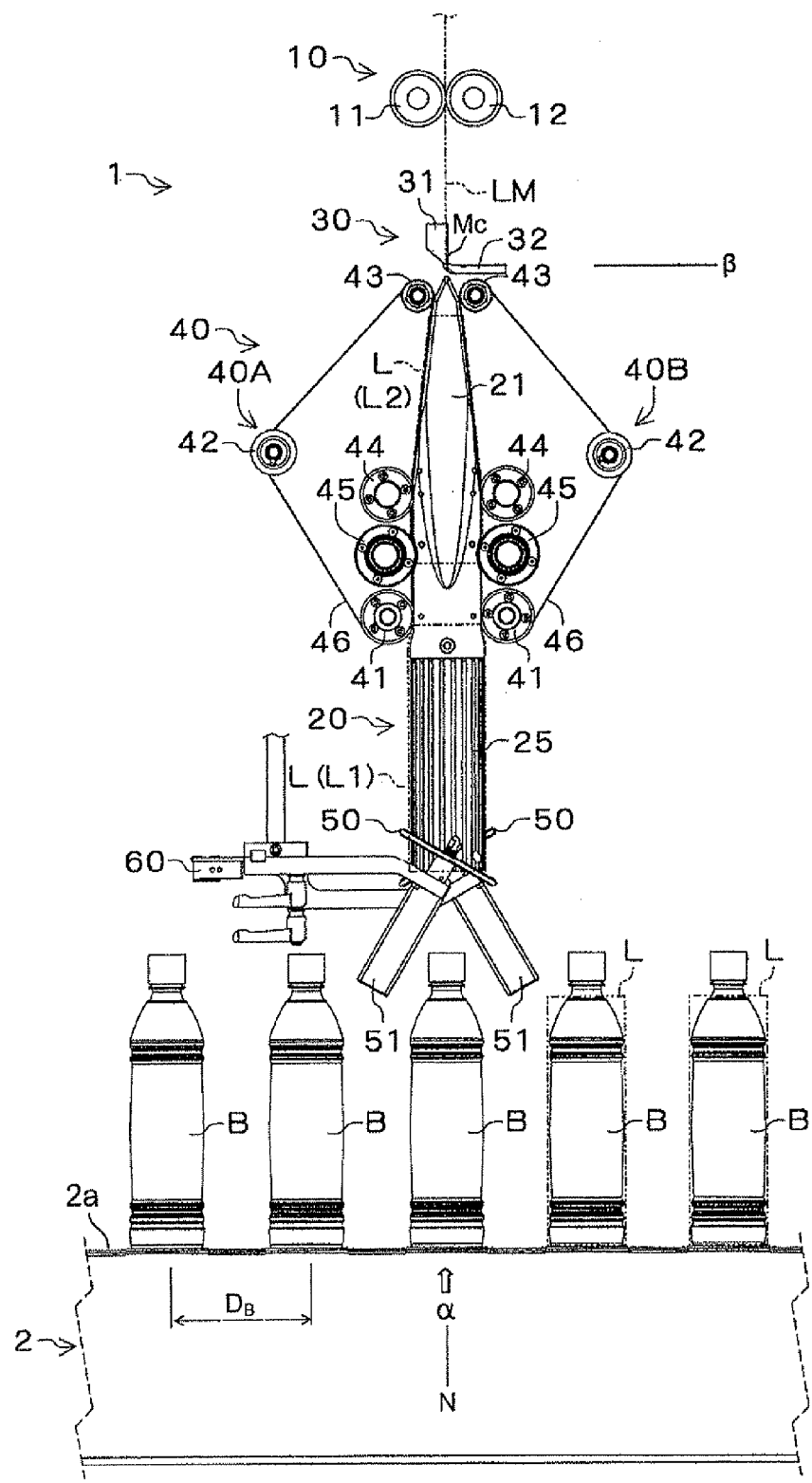
FIG. 1 is a front view showing a label-fitting device according to a first embodiment of the present invention.
Figure 2:
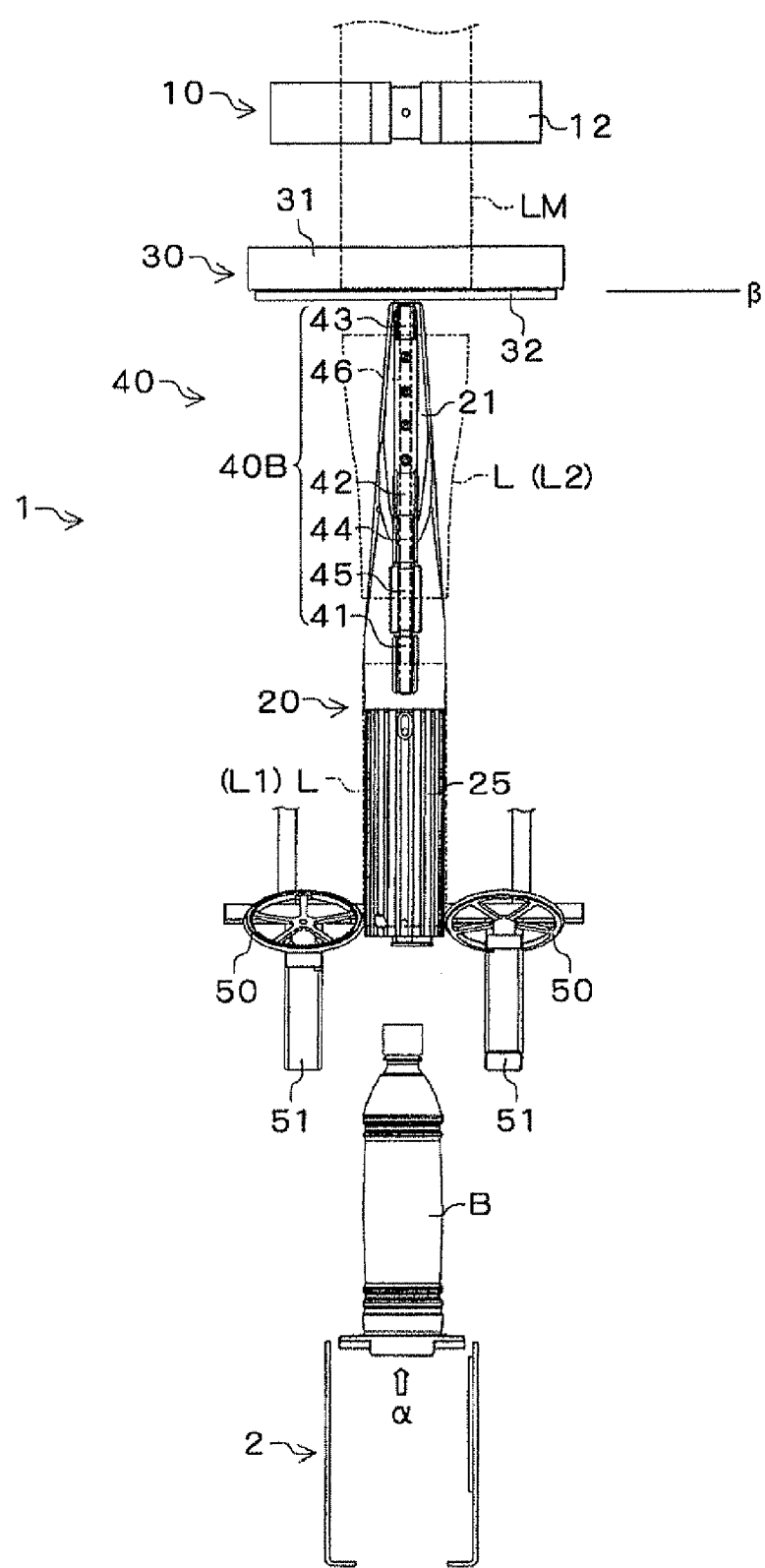
FIG. 2 is a side view showing the above-noted label-fitting device.

A first embodiment of the present invention is described below by reference to the drawings. FIGS. 1 and 2 show a label-fitting device 1 for arranging, around a trunk of a bottle container B (body to be subjected to fitting), a label L (tubular film) formed by printing or the like on a shrink film made of a polyester resin, polystyrene resin, polyolefin resin, or the like and having a thickness in the range from 15 to 40 µm. As shown in FIGS. 1 and 2, in this label-fitting device 1, from a label-forming medium LM composed of continuously connected tubular labels L in folded sheet-like form, individual labels L are cut apart and, at the same time, sequentially delivered to a label-fitting position α, so as to be arranged around trunks of bottle containers B that are sequentially transported to the label-fitting position α at a predetermined transport pitch by a bottle transport device 2. The label-fitting device 1 comprises: a medium-delivering unit 10 including a drive roller 11 and a driven roller 12 for intermittently delivering, to a cutting position, the label-forming medium LM fed out from a roll unit (not shown) that has the label-forming medium LM wounded thereon and is mounted on a tubular label feeding device; a mandrel 20 that opens the label-forming medium LM delivered by the medium-delivering unit 10 to a predetermined form by having the label-forming medium LM fitted around the mandrel 20; a guillotine-type medium cut unit 30 having a fixed blade 31 and a movable blade 32 provided between the medium-delivering unit 10 and the mandrel 20, for sequentially cutting the label-forming medium LM at a predetermined cut pitch so as to form the individual labels L; a label transfer mechanism 40 for intermittently transferring, toward the area underneath the mandrel 20, the labels L that are cut apart while in the state of being arranged around the mandrel 20; and a pair of shot rollers 50 for receiving the labels L transferred by the label transfer mechanism 40 and for delivering the labels L to the label-fitting position α.

As shown in FIGS. 1 to 3b, the mandrel 20 includes a tapered and wedge-shaped label-opening part 21 on the upper end side, and a label-shaping part 25 having a circular cross-section and provided as a continuous part below the label-opening part 21. The label-forming medium LM arranged around the upper end portion of the label-opening part 21 is gradually opened while being transferred toward the lower portion of the label-opening part 21. After the label-forming medium LM is cut into individual labels L, each label L is shaped into cylindrical form by being arranged around the label-shaping part 25.

In the lower half portion of the label-opening part 21, in its side surfaces on the upstream and downstream sides along the bottle container B transport direction, a pair of upper rollers 22, a pair of intermediate rollers 23, and a pair of lower rollers 24 are rotatably mounted, respectively, in a manner such that their circumferential surfaces are slightly projecting. In the two side surfaces of the label-opening part 21, there are provided recesses 21a for exposing the lower portions of the circumferential surfaces of the respective intermediate rollers 23.

On the outer surface of the label-shaping part 25, there are formed a large number of vertical grooves 25a for reducing the area of contact with the labels L. At the lower end portion of the label-shaping part 25, at positions orthogonal to the bottle container B transport direction, a pair of rollers 26, against which the pair of shot rollers 50 hold the labels L, are rotatably mounted in a manner such that their circumferential surfaces are slightly projecting.

Further, a label detection sensor 60 constituted with a reflection type photoelectric sensor is provided on the upstream side along the bottle container B transport direction, and a reflection mirror 61 for reflecting light emitted from the label detection sensor 60 is mounted on the lower end portion of the label-shaping part 25 of the mandrel 20. This arrangement is used to detect a label L transferred by the shot rollers 50 to a position at the lower end of the mandrel 20.

Figure 4:
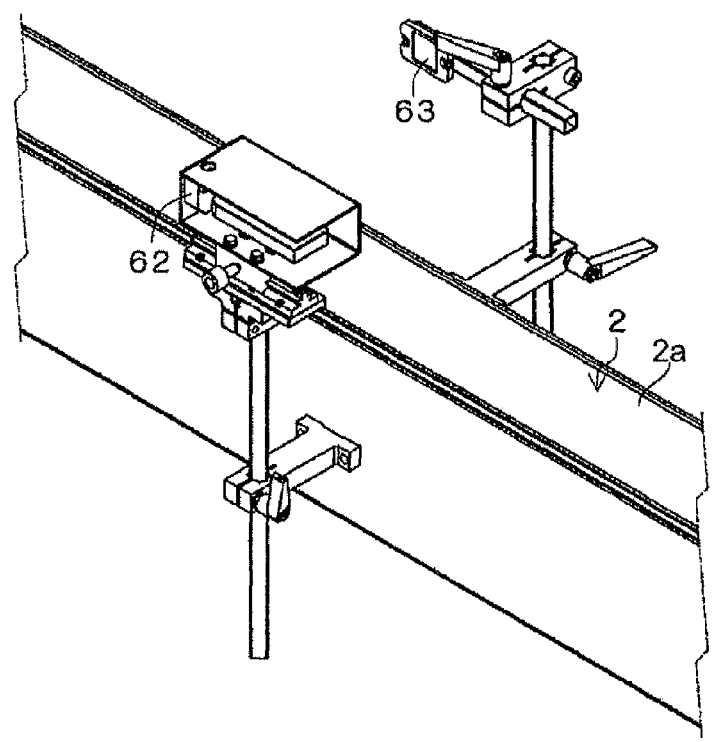
FIG. 4 is a perspective view showing a bottle detection sensor installed in the above-noted label-fitting device.

Furthermore, as shown in FIG. 4, a bottle detection sensor 62 constituted with a reflection type photoelectric sensor and a reflection mirror 63 for reflecting light emitted from the bottle detection sensor 62 are provided near the label-fitting position α on the upstream side along the bottle container B transport direction, on opposite sides of the bottle container B transport path. This arrangement is used to detect a bottle container B being transported by the bottle transport device 2, at a position immediately upstream of the label-fitting position α.

As shown in FIGS. 1 and 2, the label transfer mechanism 40 includes feed belt units 40A, 40B arranged on the upstream and downstream sides of the mandrel 20, respectively, along the bottle container B transport direction. After each label L is cut apart from the label-forming medium LM by the medium cut unit 30 while in the state of being arranged around the label-opening part 21 of the mandrel 20, the feed belt units 40A, 40B cause the label L to be held between the feed belt units 40A, 40B and the label-opening part 21, and transfer the label L to the label-shaping part 25. Each of the feed belt units 40A, 40B includes a drive pulley 41, four driven pulleys 42, 43, 44, 45, and a feed belt 46 entrained around these pulleys.

The drive pulley 41 and the driven pulleys 44, 45 are mounted at positions corresponding to the lower roller 24, the upper roller 22, and the intermediate roller 23, respectively, which are provided in the label-opening part 21 of the mandrel 20. The drive pulley 41 and the driven pulleys 44, 45 serve to hold each label L against the lower roller 24, the upper roller 22, and the intermediate roller 23 via the feed belt 46.

In each of the feed belt units 40A, 40B, the drive pulley 41 and the driven pulleys 44, 45 are rotatably supported on the same support member. By having the respective driven pulleys 45 being inserted into the recesses 21a formed in the label-opening part 21 of the mandrel 20, the driven pulleys 45 serve to support the mandrel 20 via the intermediate rollers 23.

Figure 3A:
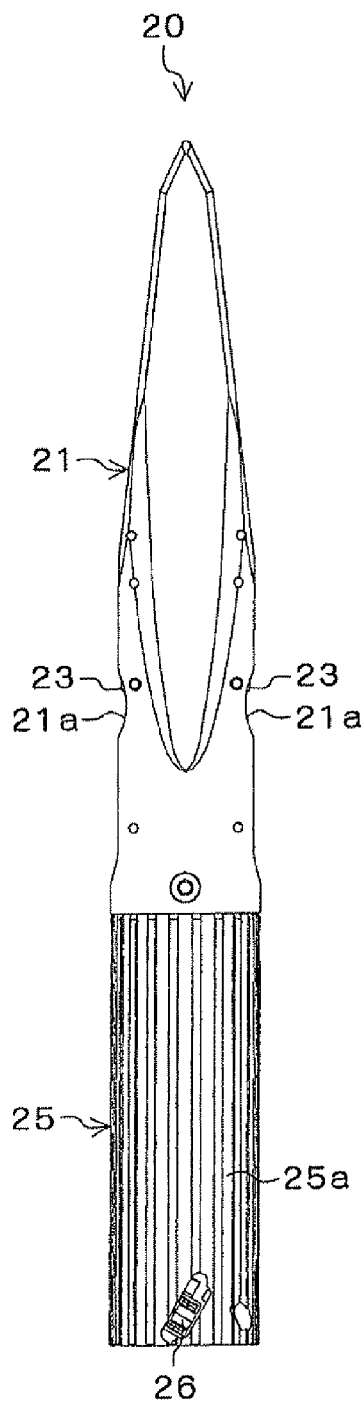
FIG. 3a is a front view of a mandrel constituting the above-noted label-fitting device.
Figure 3B:
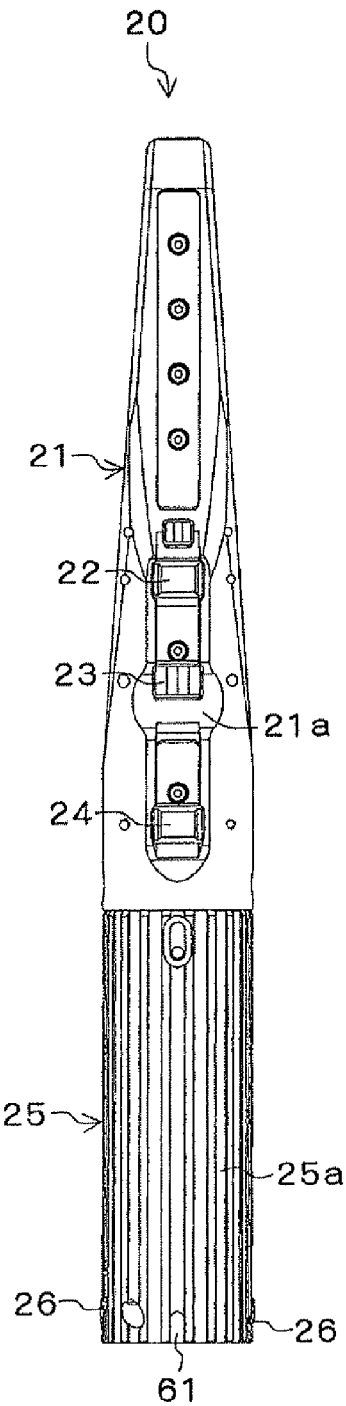
FIG. 3b is a side view of the mandrel constituting the above-noted label-fitting device.

As shown in FIGS. 1 and 2, the pair of shot rollers 50 are arranged on opposite sides of the bottle container B transport path by having their rotational shafts being slanted at 30 degrees with respect to the axis core of the mandrel 20; i.e., by having the shot rollers 50 being slanted at 60 degrees with respect to the axis core of the mandrel 20, with one of the shot rollers in a downward slant toward the downstream side along the bottle container B transport direction and the other shot roller in a downward slant toward the upstream side along the bottle container B transport direction. As shown in FIG. 3a, the rollers 26 at the label-shaping part 25 of the mandrel 20 are mounted on the label-shaping part 25 with their rotational shafts being slanted at 30 degrees with respect to the axis core of the mandrel 20 while being sloped in the same direction as the respective corresponding shot rollers 50.

Each shot roller 50 is directly coupled to a rotational shaft of a corresponding shot roller motor 51 comprising a servo motor. By supporting the respective shot roller motors 51 with their rotational shafts being slanted at 30 degrees with respect to the axis core of the mandrel 20 in opposite directions from each other, the respective shot rollers 50 are configured such that, while being slanted in opposite directions from each other, their outer surfaces substantially contact the outer surfaces of the corresponding rollers 26 in the label-shaping part 25.

With the above-described arrangement, by rotating the shot rollers 50 when the label L arranged around the mandrel 20 is held between the shot rollers 50 and the mandrel 20, the label L is delivered downward while being rotated in the circumferential direction.

Figure 5:
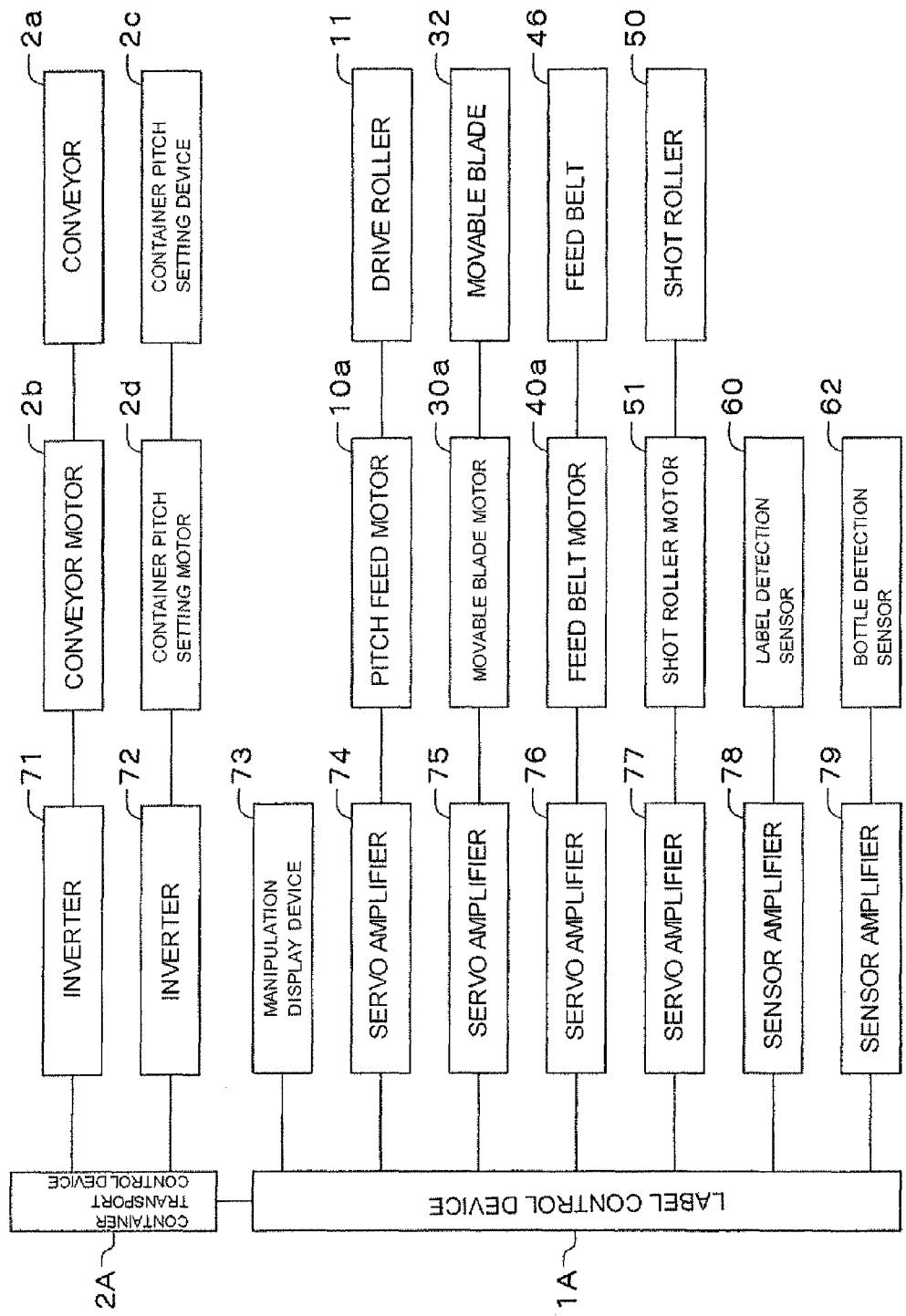
FIG. 5 is a functional block diagram showing a control system of the above-noted label-fitting device.

FIG. 5 is a functional block diagram showing a control system of the above-described label-fitting device 1. The control system of the label-fitting device 1 includes a container transport control device 2A and a label control device 1A. The label control device 1A is connected to the container transport control device 2A, and the configuration is such that, between the container transport control device 2A and the label control device 1A, data, control signals, and the like related to label placement operations are input and output with respect to each other.

An inverter 71 for driving a conveyor motor 2b that operates a conveyor 2a of the bottle transport device 2 is connected to the container transport control device 2A. When the container transport control device 2A outputs to the inverter 71a control signal for operating the conveyor 2a, the inverter 71 outputs a drive signal to the conveyor motor 2b. The conveyor motor 2b is thereby rotationally driven, and the conveyor 2a transports the bottle containers B to the label-fitting device 1.

A container pitch setting device 2c comprising a screw conveyor or the like serves to create spaces between the large number of bottles B transported thereto in one line without any spaces in between, so as to set the respective intervals between the bottles to a predetermined bottle interval $D_B$[mm]. An inverter 72 for driving a container pitch setting motor 2d that operates the container pitch setting device 2c is connected to the container transport control device 2A. When the container transport control device 2A outputs to the inverter 72a control signal for operating the container pitch setting device 2c, the inverter 72 outputs a drive signal to the container pitch setting motor 2d. The container pitch setting motor 2d is thereby rotationally driven, and the container pitch setting device 2c causes the bottle containers B to be transported at a predetermined transport pitch.

The container transport control device 2A is capable of changing the rotational speeds of the conveyor motor 2b and the container pitch setting motor 2d. By changing these rotational speeds, it is possible to change the bottle container B transport speed.

The label control device 1A is provided with a microcomputer (not shown), and, based on commands from the container transport control device 2A and a pre-stored operation program, controls operations of the drive roller 11 of the medium-delivering unit 10, the movable blade 32 of the medium cut unit 30, the feed belts 46 of the label transfer mechanism 40, and the shot rollers 50. The label control device 1A includes a memory (not shown) for storing various data.

With respect to the label control device 1A, a manipulation display device 73 is connected, and the label detection sensor 60 and the bottle detection sensor 62 are also connected thereto via sensor amplifiers 78, 79.

A servo amplifier 74 for controlling a pitch feed motor 10a comprising a servo motor that performs rotational drive of the drive roller 11 of the medium-delivering unit 10 is connected to the label control device 1A. When the label control device 1A outputs to the servo amplifier 74, based on a label detection signal and a bottle detection signal output from the label detection sensor 60 and the bottle detection sensor 62, a control signal for performing rotational operation of the drive roller 11, the servo amplifier 74 outputs a drive signal to the pitch feed motor 10a. The pitch feed motor 10a is thereby driven, and the drive roller 11 is rotated.

A servo amplifier 75 for controlling a movable blade motor 30a comprising a servo motor that drives the movable blade 32 is also connected to the label control device 1A. When the label control device 1A outputs to the servo amplifier 75, based on a label detection signal and a bottle detection signal output from the label detection sensor 60 and the bottle detection sensor 62, a control signal for performing advancing and retracting movements of the movable blade 32, the servo amplifier 75 outputs a drive signal to the movable blade motor 30a. The movable blade motor 30a is thereby driven, and the movable blade 32 advances and retracts with respect to the fixed blade 31.

A servo amplifier 76 for controlling a feed belt motor 40a comprising a servo motor that performs rotational drive of the drive pulley 41 entraining the feed belt 46 is further connected to the label control device 1A. When the label control device 1A outputs to the servo amplifier 76, based on a label detection signal and a bottle detection signal output from the label detection sensor 60 and the bottle detection sensor 62, a control signal for performing rotational operation of the drive pulley 41, the servo amplifier 76 outputs a drive signal to the feed belt motor 40a. The feed belt motor 40a is thereby rotationally driven, and the drive pulley 41 rotates to carry out cyclic movement of the feed belt 46.

A servo amplifier 77 for controlling the shot roller motor 51 that performs rotational drive of the shot roller 50 is also connected to the label control device 1A. When the label control device 1A outputs to the servo amplifier 77, based on a label detection signal and a bottle detection signal output from the label detection sensor 60 and the bottle detection sensor 62, a control signal for performing rotational operation of the shot roller 50, the servo amplifier 77 outputs a drive signal to the shot roller motor 51. The shot roller motor 51 is thereby rotationally driven, and the shot roller 50 is rotated.

Figure 6:
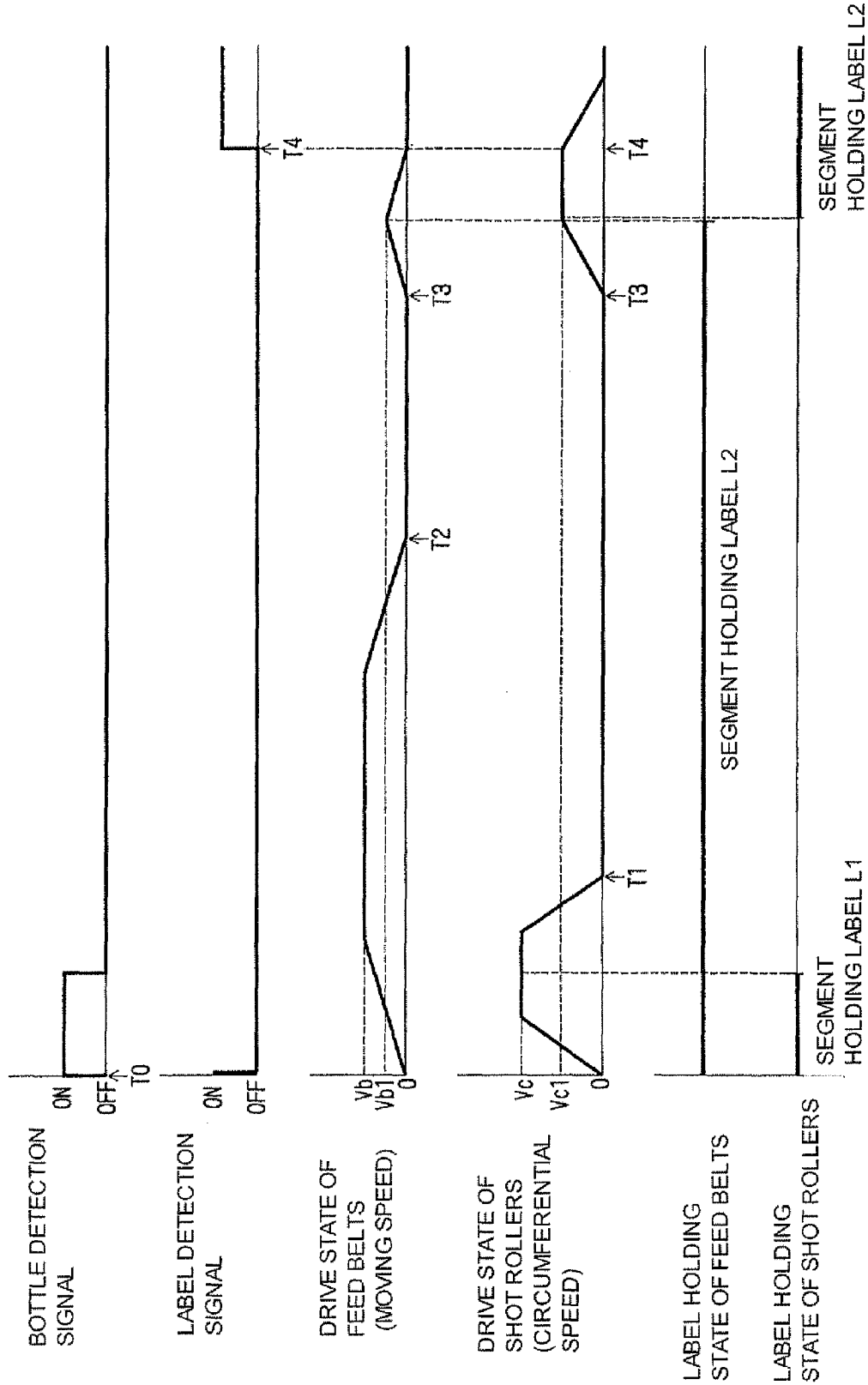
FIG. 6 is a timing chart showing operations of feed belts and shot rollers in the above-noted label-fitting device.

Operations of the label-fitting device 1 are next described by reference to the timing chart shown in FIG. 6, First, while in the standby state shown in FIGS. 1 and 2, when a bottle container B is detected by the above-described bottle detection sensor (T0), the shot rollers 50 start rotating, to thereby rotate a label L(L1) arranged around the label-shaping part 25 in the circumferential direction and to simultaneously deliver the label downward at a timing at which the bottle container B passes the label-fitting position α, resulting in fitting the label around the trunk of the bottle container B. During this operation, the shot rollers 50 are quickly accelerated to a final circumferential speed Vc corresponding to the fitting speed, and then rotated at the final circumferential speed Vc for a predetermined period of time. Subsequently, after the label L is located away from the shot rollers 50, the rotation is stopped (T1).

When a bottle container B is detected by the bottle detection sensor 62 (T0), drive of the label transfer mechanism 40 is also started so as to start transferring a subsequent label L(L2), which is held between the label transfer mechanism 40 and the label-opening part 21 of the mandrel 20, to the label-shaping part 25 of the mandrel 20. When the label L(L2) reaches a position immediately upstream of the position at which its lower end portion becomes held by the shot rollers 50, the label L transfer operation is temporarily stopped (T2). At this point, the upper end portion of the label L(L2) is still being held between the feed belts 46 of the label transfer mechanism 40 and the label-opening part 21.

During the period (T0-T2) from the point after the drive of the label transfer mechanism 40 is started until the label L transfer operation is temporarily stopped, the medium-delivering unit 10 delivers the label-forming medium LM downward. The label-forming medium LM is thereby arranged around the label-opening part 21 of the mandrel 20, and is transferred by the label transfer mechanism 40 so that its lower end portion extends approximately to the lower half portion of the label-opening part 21. In this state, the distance from the cutting position to the lower end of the label-forming medium LM equals the label length. During the time when drive of the label transfer mechanism 40 is stopped, the medium cut unit 30 cuts the label-forming medium LM, so that a label L is cut apart while being held between the feed belts 46 of the label transfer mechanism 40 and the label-opening part 21.

At a time (T3) after elapse of a predetermined period of time from the point when the drive of the label transfer mechanism 40 is stopped, drive of both the label transfer mechanism 40 and the shot rollers 50 is restarted, so that both the upper and lower labels L arranged around the mandrel 20 are transferred slightly downward, and the lower label L(L2) is handed over from the label transfer mechanism 40 to the shot rollers 50. During this operation, it is set such that the moving speed Vb1 of the feed belts 46 of the label transfer mechanism 40 is substantially equal to a half of the circumferential speed Vc of the shot rollers 50.

As described above, when the shot rollers 50 installed in a slanted state at an angle θ of 60 degrees with respect to the axis core of the mandrel 20 are rotated, the label L held between the mandrel 20 and the shot rollers 50 is delivered downward at a speed of (the circumferential speed Vc1 of the shot rollers 50)·(cos θ)=Vc1/2. Accordingly, the handing over and receiving of the label L between the label transfer mechanism 40 and the shot rollers 50 is executed at equal speeds at the label transfer mechanism 40 and the shot rollers 50.

Here, it should be noted that, in this label-fitting device 1, when the label L is being handed over from the feed belts 46 of the label transfer mechanism 40 to the shot rollers 50, the feed belts 46 and the shot rollers 50 do not simultaneously hold the label L. The spacing between the label transfer mechanism 40 and the shot rollers 50 is set such that the shot rollers 50 can receive the label L after the label L leaves the feed belts 46.

While the label transfer mechanism 40 executes a stopping operation (deceleration and stop) at once when the label L leaves the feed belts 46, the shot rollers 50 continue their constant-speed rotation until the lower end portion of the label L is detected by the label detection sensor 60. At a time (T4) when the label L is detected by the label detection sensor 60, a stop signal for the shot rollers 50 is output, and the shot rollers 50 execute a stopping operation (deceleration and stop).

In this way, the label-fitting device 1 returns to the standby state shown in FIGS. 1 and 2. Operations as described above are subsequently repeated.

As described above, the label-fitting device 1 includes the label transfer mechanism 40 which transfers downward a label L that is in the state of being arranged around the mandrel 20 and having been cut into a predetermined length. Since the label L having the predetermined length is handed over to the shot rollers 50 via this label transfer mechanism 40, it is possible to avoid twisting of and damaging to the label-forming medium LM having the shape of a long band, which may occur in a conventional film-fitting device in which a tubular film having a long band-like shape before being cut into a predetermined length is handed over to a shot roller.

Further, the label-fitting device 1 is configured such that the shot rollers 50 are rotationally driven by independent shot roller motors 51 comprising servo motors. Accordingly, after the rotational drive of the shot rollers 50 is started for fitting a label L around a bottle container B, the rotational speed can be increased up to a speed corresponding to the final fitting speed (circumferential speed) Vc in a very short time. As a result, it is possible to sufficiently benefit from the advantage attained by delivering the label L while rotating the label L in the circumferential direction; i.e., the advantage that a predetermined centrifugal force is generated so as to shape the label L into a substantially cylindrical form and also to enhance the shape maintaining property at the time of fitting of the label L around the bottle container B, so that, even when the label L has a small thickness of approximately 20 μm, for example, the label L can be reliably fitted around the body to be subjected to fitting.

In particular, since the label-fitting device 1 is configured such that, when the shot rollers 50 are holding a label L against the mandrel 20, the label L is located apart from the film transfer mechanism 40, no twisting is generated in the label L and the label L does not become damaged.

Further, if a shot roller 50 is arranged in the transport path of the bottle containers B, in order to avoid interference with the transported bottle containers B, the shot roller motor 51 driving the shot roller 50 must be installed in an upwardly projecting manner. In that case, if the label L has a short label length, there would be risks of interference between the shot roller motor 51 and the film transfer mechanism 40 installed above. In contrast, in the present film-fitting device 1, a pair of shot rollers 50 are arranged on opposite sides of the transport path of the bottle containers B. Accordingly, even when the shot roller motors 51 driving the shot rollers 50 are installed in a downwardly projecting manner, no interference occurs with the transported bottle containers B, and also no problem of interference between members is caused in the case of a label L having a short label length.

The tubular label L as described above is formed by delivering the long band-shaped label-forming medium, and at the same time turning up its two side parts in the width direction toward the center so as to overlap the two side edge portions with each other. After the two side edge portions are joined together by means of an adhesive applied to the overlapped part, the label-forming medium is cut into a predetermined length to form the label L. When applying the adhesive to the overlapped part of the two side edge portions of the label-forming medium, the adhesive is applied to a first side edge portion of the label-forming medium at a position located approximately 1 to 4 mm toward the inside from the tip of the edge portion, so as to avoid applying the adhesive off of the edge.

Figure 57A:
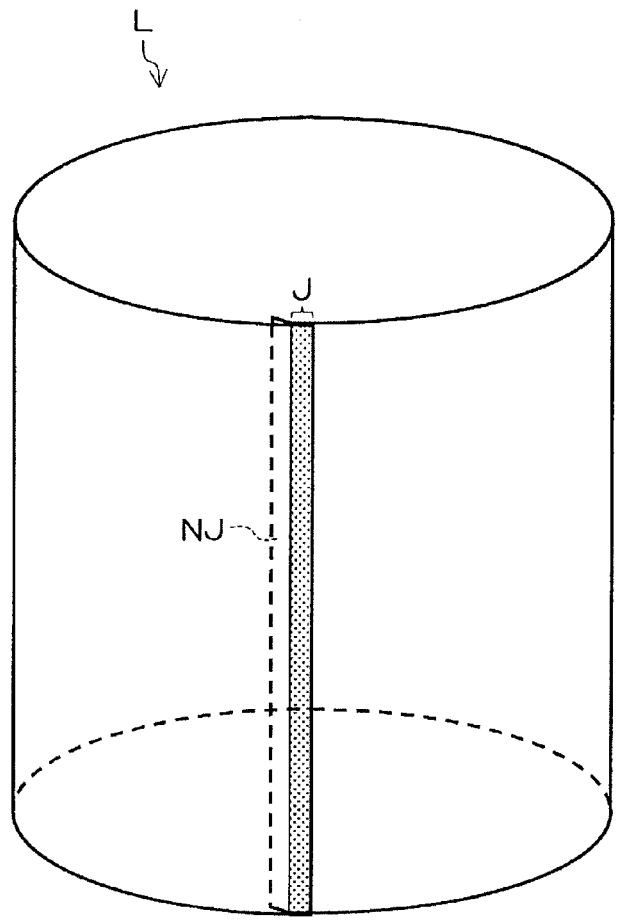
FIG. 57a is a perspective view of a label.
Figure 57B:
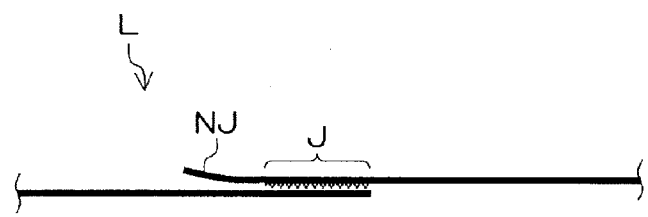
FIG. 57b is an enlarged view showing an overlapped portion of the label-forming medium in the above-noted label.
Figure 58:
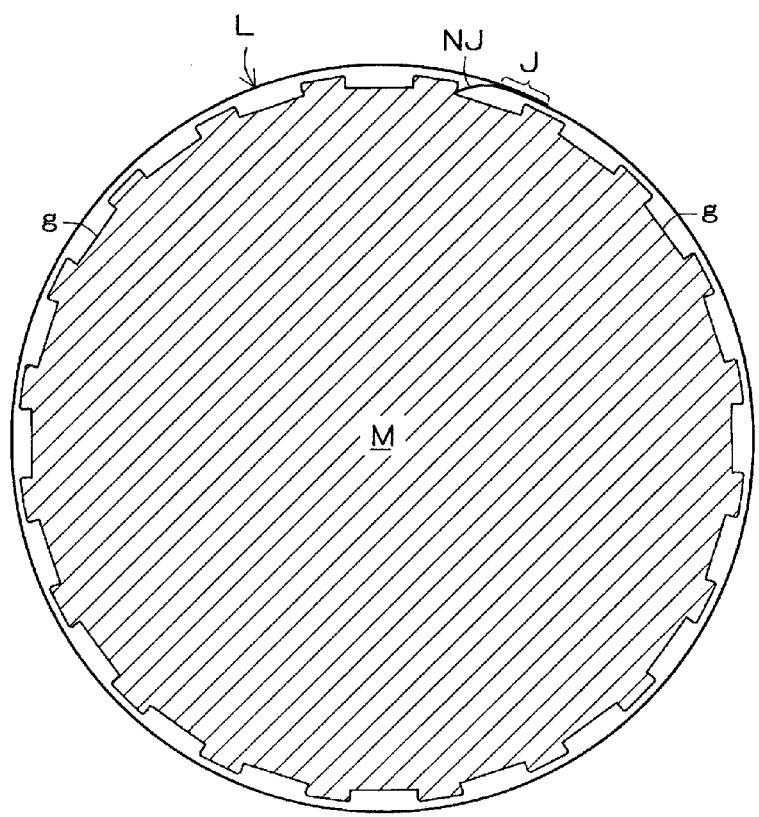
FIG. 58 is a diagram for explaining conventional problems.

As a result, a completed label L normally has, as shown in FIG. 57 a non-joint part NJ having a width of approximately 1 to 5 mm on the tip side of a joint part J at the first side edge portion which is located on the inner side of the overlapped part. When the label L arranged around the mandrel is being rotated in the circumferential direction, this non-joint part NJ may disadvantageously become jammed and cause resistance. This problem could become very serious particularly in the case in which a large number of vertical grooves g are formed on the outer surface of the mandrel M so as to reduce the area of contact with the label, as shown in FIG. 58.

Further, in the case in which the tubular label L is to be fitted around a cylindrical container to which a tack label is adhered at a part of its trunk outer surface, if one attempts to fit the label L around the container trunk while rotating the label L in the circumferential direction, the non-joint part NJ of the label L may disadvantageously become jammed on an edge of the tack label, possibly resulting in a placement failure.

Also in other cases where the tubular label L is to be fitted around a cylindrical container having small projections or the like on its trunk outer surface or around a container having a hexagonal or octagonal cross-section, the non-joint part NJ of the label L may similarly become jammed on the small projections or the corner parts of the trunk outer surface, possibly resulting in placement failures.

Accordingly, it is desirable to regulate the rotational direction of the label L at the label-shaping part 25 such that, even when the tubular film is formed having a non-joint part on the tip side of the joint part at the first side edge portion located on the inner side of the overlapped part, smooth rotation is achieved without causing resistance.

Figure 7A:
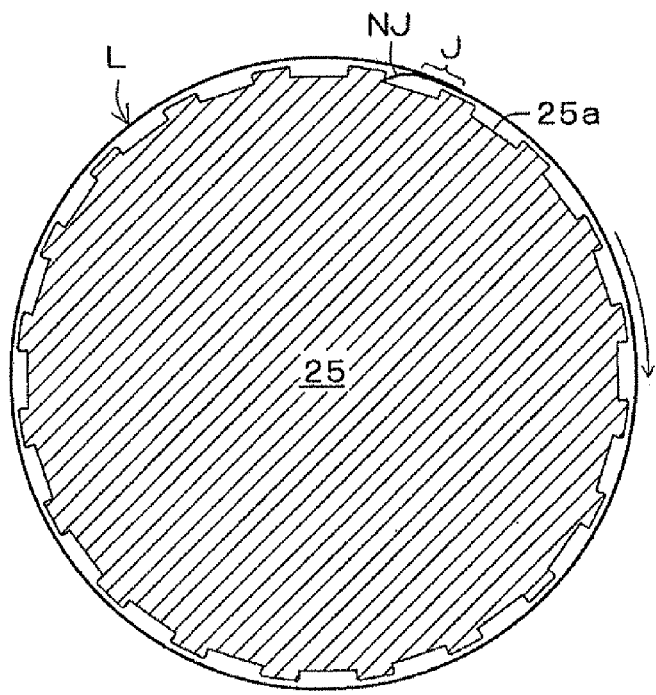
FIG. 7a is a diagram for explaining the label L rotational direction.
Figure 7B:
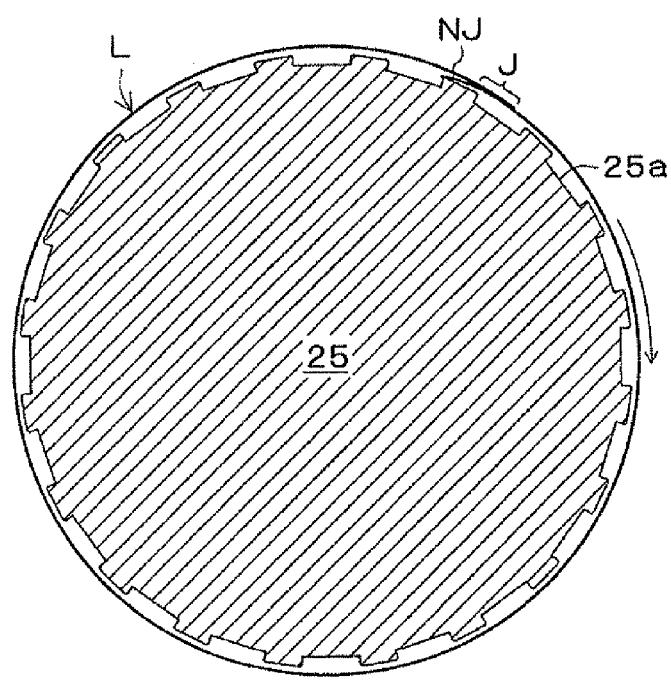
FIG. 7b is a diagram for explaining the label L rotational direction.

Specifically, it is desirable to set the rotational direction of the shot rollers 50 such that, as indicated by arrows in FIGS. 7a and 7b, the label L is rotated in the tip direction of the second side edge portion of the label which is located on the outer side of the overlapped part; that is, in the direction opposite to the extending direction of the non-joint part NJ.

By configuring as explained above, the non-joint part NJ formed at the tip of the first side edge portion located on the inner side of the overlapped part of the label L is prevented from causing resistance by being jammed in the vertical grooves 25a formed on the outer surface of the label-shaping part 25 of the mandrel 20, so that the label L can be rotated smoothly.

Further, by rotating the label L in the above-described direction, the non-joint part NJ of the label L is also prevented from being jammed in the rollers 26 even though the rollers 26 for holding the label L together with the shot rollers 50 are slightly projecting from the outer surface of the label-shaping part 25 of the mandrel 20.

Figure 56:
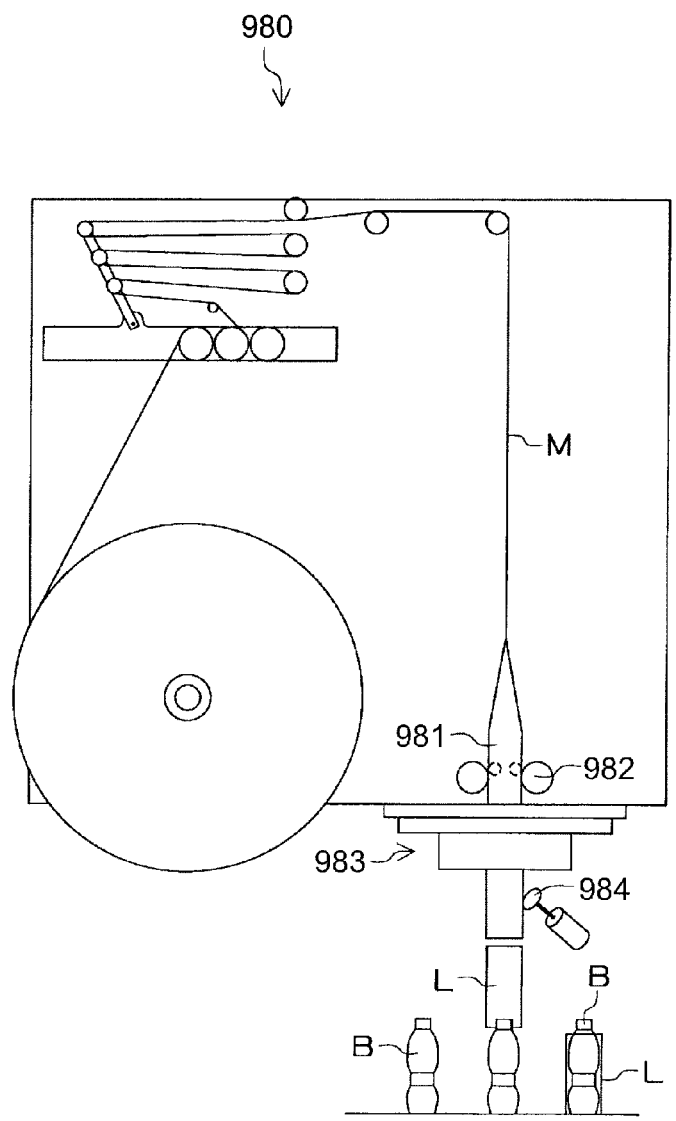
FIG. 56 is a schematic configuration diagram showing a conventional label-fitting device.

Next, a second embodiment of the present invention is described by reference to FIGS. 8 to 11. As in a conventional label-fitting device 980 as shown in FIG. 56, in a case where a label L arranged around the mandrel 981 is delivered while being rotated in the circumferential direction, when the label L has a large diameter and a small cut length, the label L lacks stiffness and is liable to buckling, so that it is desirable to increase the rotational frequency of the label L in the circumferential direction so as to enhance the shape maintaining property attained by centrifugal force. On the other hand, when the label L has a small folding diameter, the label L is less liable to buckling, so that it is desirable to minimize the rotational frequency of the label L in the circumferential direction and increase the label L delivery speed. Further, liability to buckling also varies depending on the material of the label L.

In light of the above, the second embodiment provides a label-fitting device 1 capable of fitting a tubular film around a body to be subjected to fitting at a rotational speed and a delivery speed which are optimal in accordance with the diameter, length, and material of the tubular film. This label-fitting device 1 is almost identical to the label-fitting device 1. However, in the label-fitting device 1 of the present embodiment, as shown in FIGS. 8, 9a, 9b, and 11, a pair of ball rollers 27, which are freely rotatable in arbitrary directions and against which the pair of shot rollers 50 hold the labels L, are mounted in a manner such that their circumferential surfaces are slightly projecting.

Figure 8:
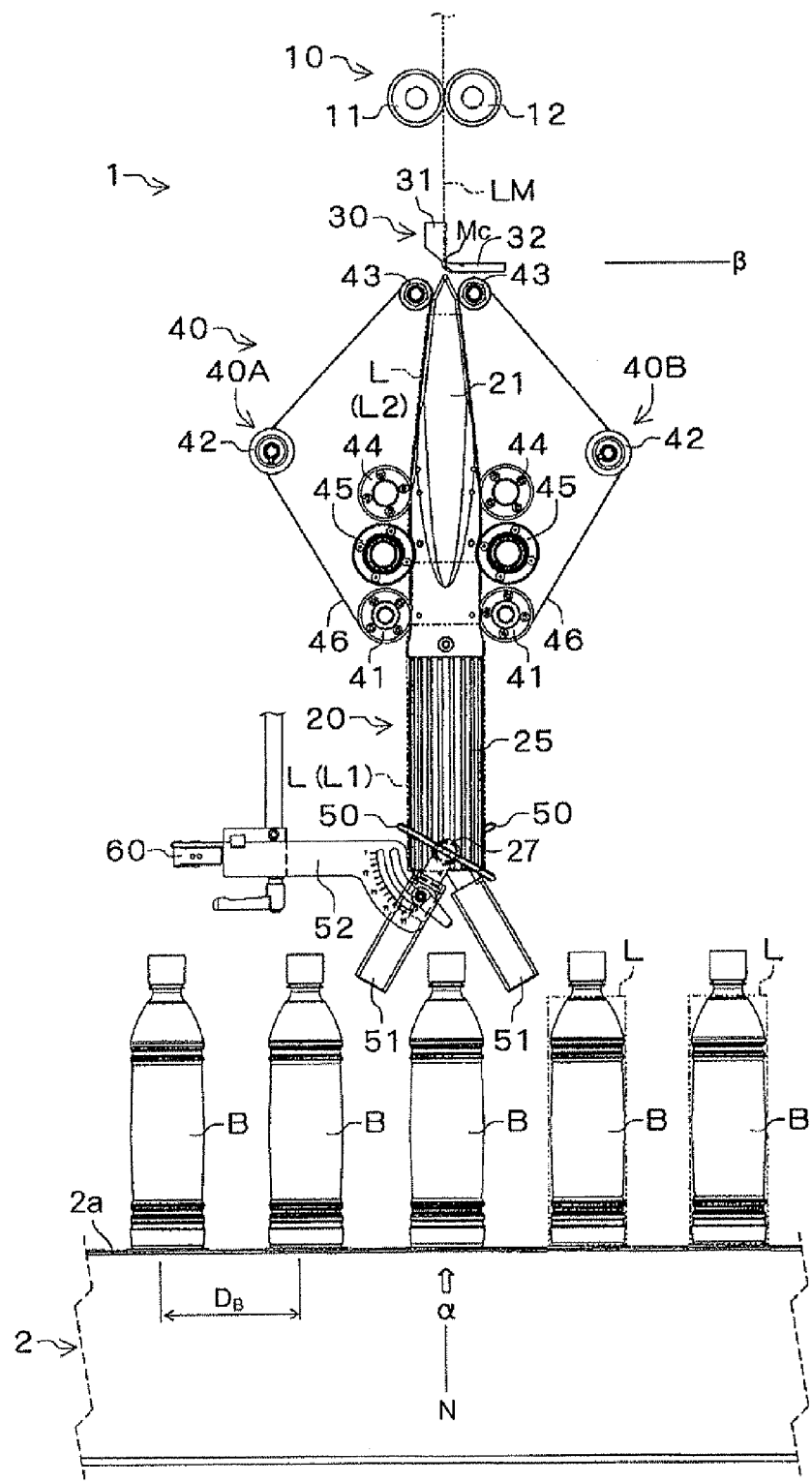
FIG. 8 is a front view showing a label-fitting device according to a second embodiment of the present invention.
Figure 10:
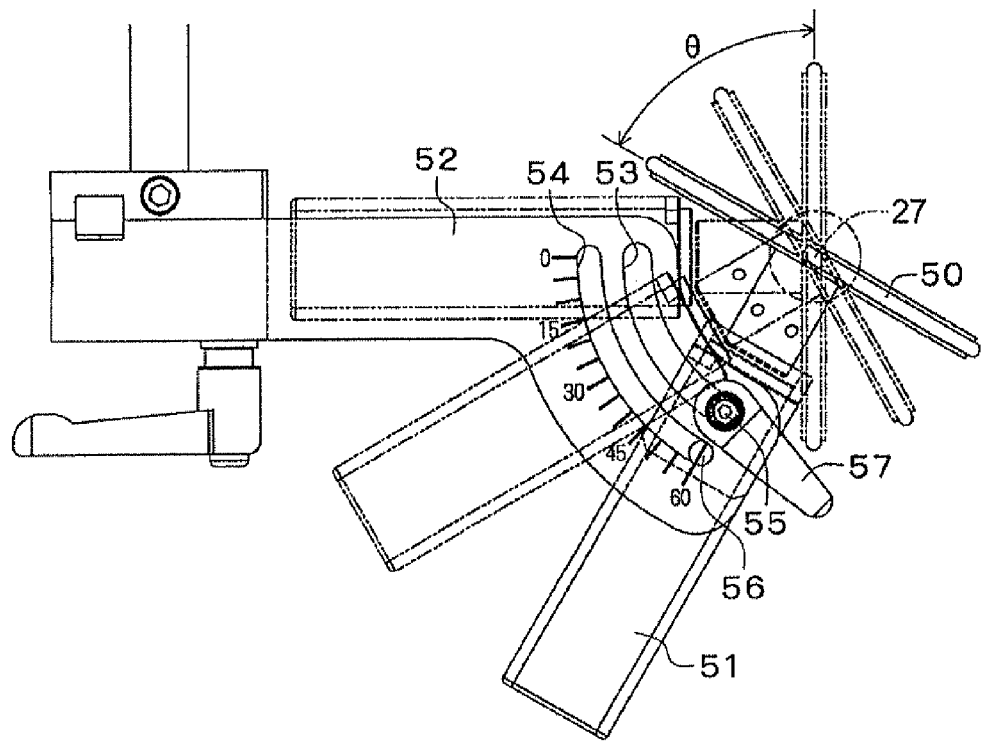
FIG. 10 is an enlarged side view showing a shot roller portion of the above-noted label-fitting device.
Figure 11:
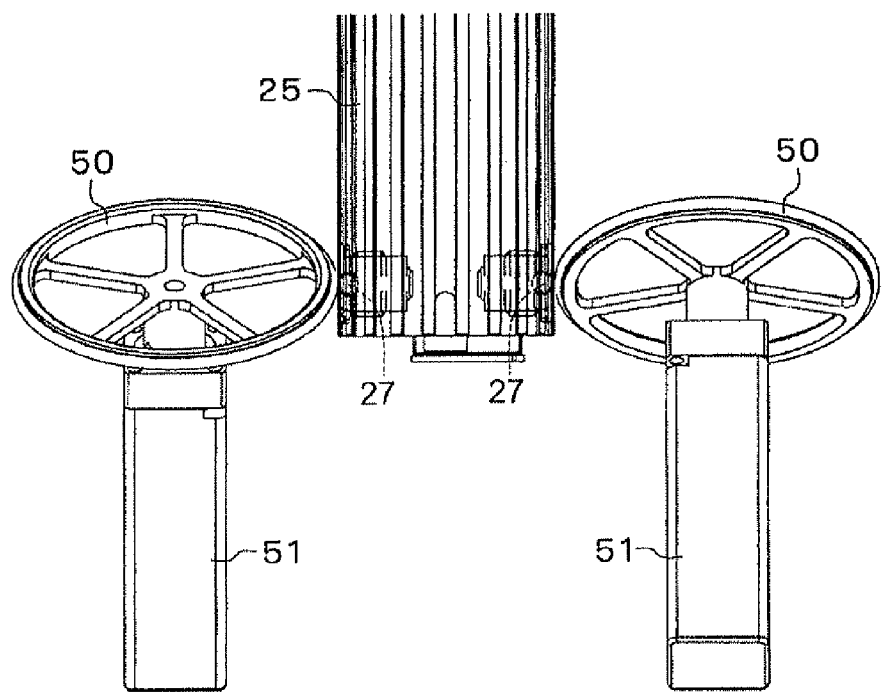
FIG. 11 is a partial side view of a mandrel, showing ball portions contacting the shot rollers in the above-noted label-fitting device.

Further, as shown in FIGS. 8 and 10, each shot roller motor 51 is supported on the support plate 52 so as to be pivotable about an axis that extends in the radial direction of the shot roller 50 from the ball roller 27 mounted on the mandrel 20. By means of an angle adjustment mechanism, the inclination angle of the shot roller 50 can be adjusted. In FIG. 8, the support plate for the other shot roller motor 51 is not shown.

As shown in FIG. 10, the angle adjustment mechanism comprises: two arc-shaped elongate holes 53, 54 that are created in the support plate 52 for mounting the shot roller motor 51, and that are formed along concentric circles having the center at the ball roller 27; slide pins 55, 56 attached to the shot roller motor 51 for fittingly engaging with the respective elongate holes 53, 54; and a securing lever 57 that is screwed onto the slide pin 55 engaging with the elongate hole 53, and, when tightened, is capable of securing the slide pin 55 at an arbitrary position within the range of the elongate hole 53. By loosening the securing lever 57, sliding the slide pins 55, 56 along the elongate holes 53, 54, and subsequently tightening the securing lever 57 again, the inclination angle of the shot roller 50 with respect to the axis core of the mandrel 20 can be set arbitrarily within the range of 0 to 60 degrees. When the inclination angle of the shot roller 50 with respect to the central axis of the mandrel 20 is denoted by θ and the circumferential speed of the shot roller 50 is denoted by V, the speed of downward delivery of a label L by the shot roller 50 is given by V·cos θ, and the label L rotational speed (circumferential speed) is given by V·sin θ. According to this angle adjustment mechanism, it is also possible to set the shot roller 50 in a non-slanted normal state (at the inclination angle of zero degree), allowing compatibility with a configuration having a non-slanted shot roller 50.

As described above, in the label-fitting device 1, each shot roller 50 is supported so as to be pivotable about an axis that extends in the radial direction of the shot roller 50 from the ball roller 27, and the label-fitting device 1 includes an angle adjustment mechanism for adjusting the inclination angle of the shot rollers 50. With this arrangement, by changing the inclination angle of the shot rollers in accordance with the diameter, length, thickness, and material of the label L as well as the surface state of the container, it is possible to fit the label L around the bottle container B at optimal rotational speed and delivery speed.

Further, as it is possible to carry out the label L fitting operations at various inclination angles of the shot rollers 50 in order to determine the optimal inclination angle, an operation for adjusting the shot roller 50 inclination angle can be easily performed.

In particular, in the film-fitting device 1, it is configured such that the label L is held between the ball rollers 27, which are mounted on the mandrel 20 and freely rotatable in arbitrary directions, and the shot rollers 50. As a result, even when the shot roller inclination angle is changed, the ball rollers 27 rotate in directions corresponding to the shot roller inclination angle, so that the label L can always be delivered downward while being rotated smoothly.

Next, a third embodiment of the present invention is described by reference to FIGS. 12 to 20. In a conventional label-fitting device 980 shown in FIG. 56, there are cases in which the labels L delivered from the mandrel 981 so as to be fitted around the containers B while being rotated in the circumferential direction may rebound and jump up from the conveyor that carries and transports the containers B. In such a case, if the labels L are shrink labels that are subjected to heat shrinkage when the containers are passed through a later heating stage so as to be attached to the containers, the attached positions or attached heights of the labels on the containers B become varied, generating the problem of appearance defect of the attached labels. In particular, when the labels L are to be fitted around containers having wet surfaces, variances in the label fitted height generated by rebound of the labels L tend to occur due to differences in the wet state of the containers.

Figure 12:
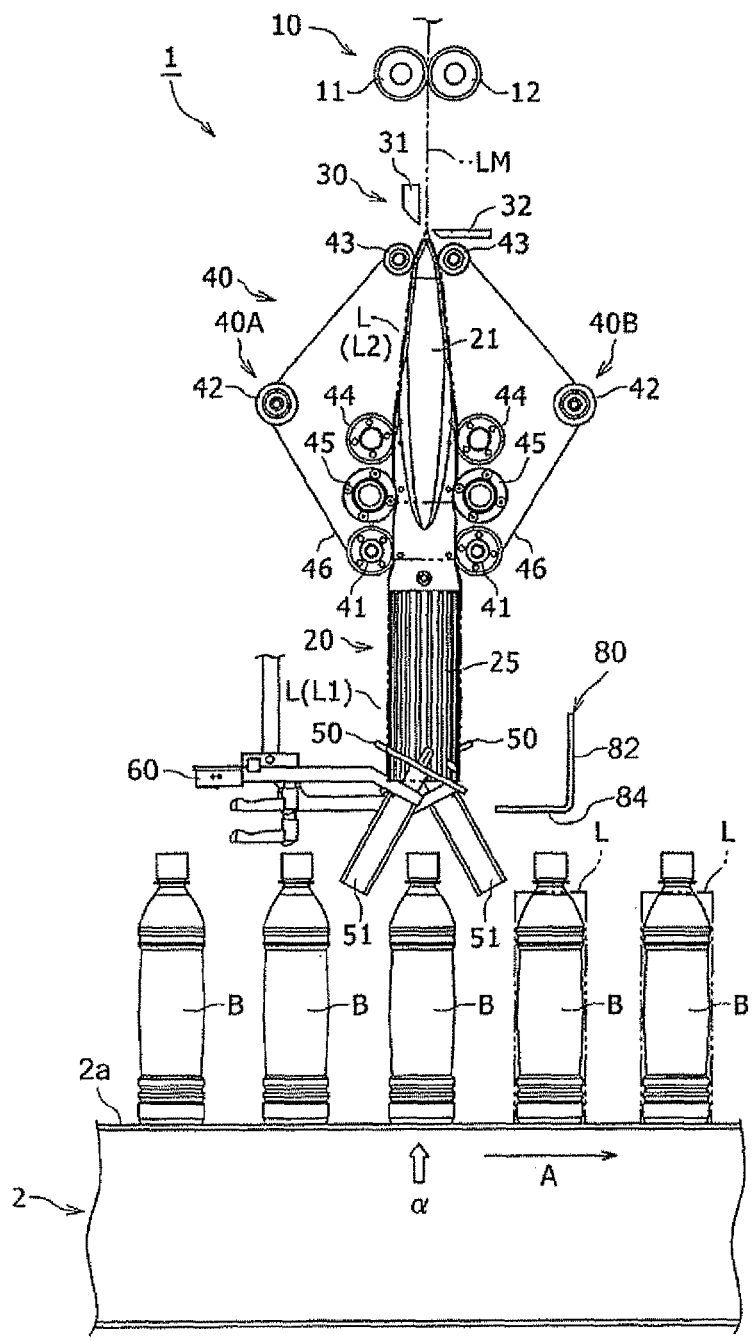
FIG. 12 is a front view showing a label-fitting device according to a third embodiment of the present invention.

In light of the above, the present embodiment provides a label-fitting device 1 capable of achieving substantially uniform fitted positions of labels fitted around containers. This label-fitting device 1 differs from the first embodiment in that, as shown in FIG. 12, a rebound prevention member 80 is provided. As the structures other than the rebound prevention member 80 are substantially identical to the first embodiment, the following description mainly refers to the rebound prevention member 80.

Figure 13:
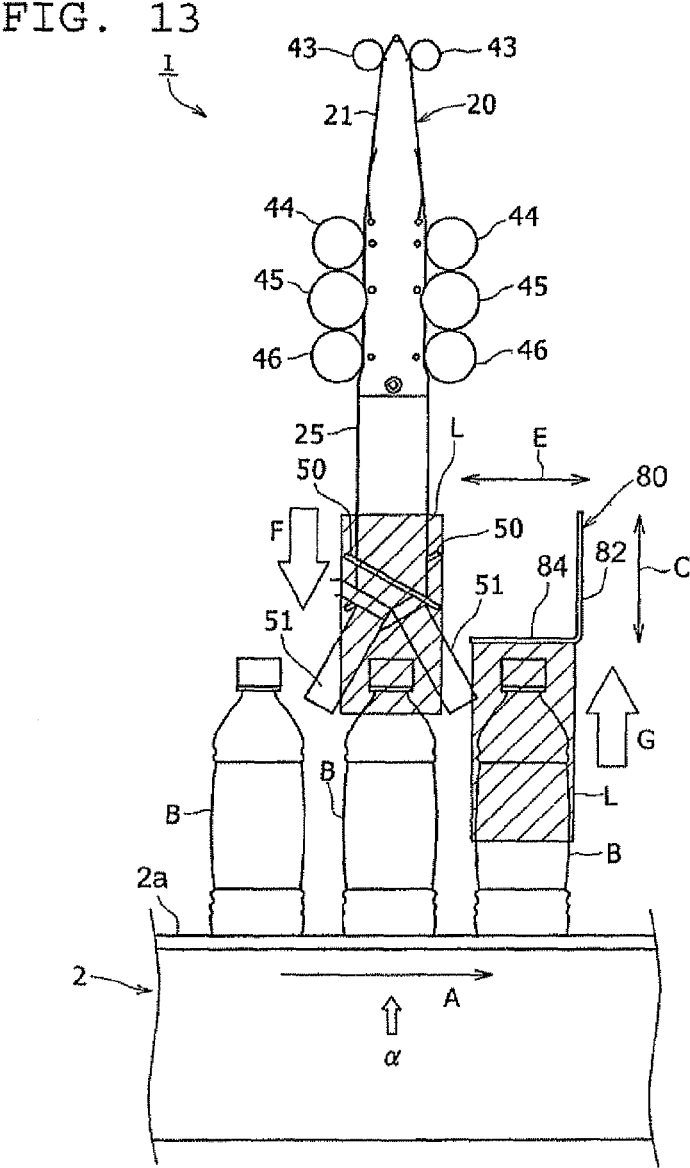
FIG. 13 is a front view corresponding to FIG. 12 for explaining a label rebound prevention member provided in the above-noted label-fitting device.
Figure 14:
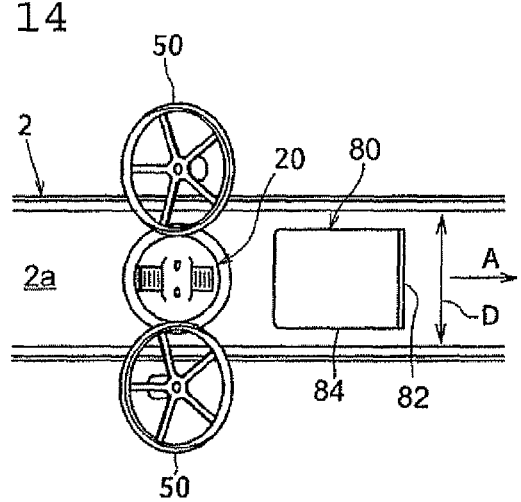
FIG. 14 is a top view of the above-noted label-fitting device for showing that the mounting position of the label rebound prevention member is adjustable along a lateral direction that is orthogonal to the bottle container transport direction.

FIG. 13 is a front view corresponding to FIG. 12 for explaining the label rebound prevention member 80 provided in the label-fitting device. FIG. 14 is a top view of the above-noted label-fitting device 1 for showing that the mounting position of the label rebound prevention member 80 is adjustable along a lateral direction that is orthogonal to the bottle container transport direction A. In FIG. 13, components such as the feed belts 46 are not shown. In FIG. 14, the feed belt units 40A, 40B are not shown.

As shown in FIGS. 12 and 13, a rebound prevention member 80 is provided near the label-fitting position α (i.e., the position immediately below the mandrel 20) and on the downstream side along the bottle container B transport direction. The rebound prevention member 80 is arranged above the bottle containers B continuously transported by the conveyor 2a of the bottle transport device 2. The rebound prevention member 80 has the function to abut the top end part of each label L that jumps up while surrounding a bottle container B, and to thereby align the fitted positions of the labels L with respect to the bottle containers B.

The rebound prevention member 80 includes a mounting portion 82 that is fastened to a support member (not shown), and an abutting portion 84 that is formed extending from the mounting portion 82 in a direction substantially orthogonal thereto and that serves to abut the top end part of each label L that jumps above the bottle container B. For example, the rebound prevention member 80 may be produced by bending a metal plate.

For example, the rebound prevention member 80 may be mounted by inserting bolts in elongate holes formed in the mounting portion 82 and tightening the bolts into female threaded holes in the support member. With this arrangement, the rebound prevention member 80 can be installed in a manner that allows adjustment of its vertical position C, as well as its lateral position D along a direction orthogonal to the container transport direction A as shown in FIG. 14.

Further, the rebound prevention member 80 can be installed in a manner that also allows adjustment of its horizontal position E along the container transport direction A by, for example, providing a spacer between the mounting portion 82 and the support member and changing the thickness of this spacer.

By configuring such that the installed position of the rebound prevention member 80 is adjustable as described above, adjustments can be made in response to changes in bottle container B size, changes in bottle container B transport speed, changes of labels L, and the like, so as to optimize the position of abutment with the labels L. It should be noted that the installed position of the rebound prevention member 80 is not necessarily adjustable in all of the above-noted three directions, and may alternatively be adjustable in, for example, two directions related to the vertical position C and the horizontal position E, or only the vertical position may be adjustable.

Next, operations and achieved effects of the label-fitting device 1 having the above-described structure are explained referring particularly to FIGS. 12 and 13.

Referring to FIG. 12, a long tubular label-forming medium LM folded in sheet form is intermittently delivered downward in units of a predetermined length by a delivery roller pair comprising the drive roller 11 and the driven roller 12. During this operation, the lower end portion of the label-forming medium LM is placed in a slightly opened state by an inner guide (not shown), so that the label-forming medium LM can be arranged around the tip of the label-opening part 21 of the mandrel 20.

While drive of the delivery roller pair is stopped, the mobile blade 32 of the medium cut unit 30 is driven, and a label L of a predetermined length is cut and formed. Such operations of delivery and cutting of the label-forming medium LM are repeated in the medium-delivering unit 10.

The label L formed by cutting into the predetermined length is arranged around the label-opening part 21 of the mandrel 20. While in this arranged state, the feed belt units 40A, 40B are driven, and the label L is transferred downward along the outer periphery of the mandrel 20 while being opened into a cylindrical shape.

Subsequently, when the label detection sensor 60 detects a state that the lower end part of the label L is held between the label-shaping part 25 of the mandrel 20 and the shot roller pair 50, the shot roller pair 50 is driven so as to deliver the label L downward from the mandrel while rotating the label L in the circumferential direction.

This operation of label L delivery by the shot rollers 50 is executed at an appropriate timing at which a bottle container B has reached the label-fitting position α immediately below the mandrel 20. Because circumferential rotation is applied to the label L, the state in which the overall label is unfolded in the radial direction is maintained, and as a result, the label L is fitted around the bottle container B in a reliable manner.

The bottle container B placed on the conveyor 2a of the bottle transport device 2 at a predetermined interval is continuously transported without making any temporary stop at the label-fitting position α. Consequently, the bottle container B fitted with the label L around its trunk is immediately moved to a position reaching underneath the label rebound prevention member 80.

The label L delivered by the shot roller pair 50 while being rotated is formed having a diameter larger than the trunk of the bottle container B, and is subjected to heat shrinkage in a later heating stage so as to be fully attached to the bottle container B. Accordingly, clearance or gap is present between the label L before heat shrinkage and the outer shape of the bottle container B. For this reason, there are cases in which the label L delivered downward with momentum at the label-fitting position α rebounds and jumps up after once reaching the conveyor 2a of the bottle transport device 2 while surrounding the bottle container B. Even when the outer surface of the bottle container B is wet, the rotating label L delivered for fitting fits around the bottle container B without adhering to or stopping on the bottle container B surface, and therefore the rebound from the conveyor 2a as described above is generated.

The rebound amount of the jumping-up label L is not necessarily uniform for all bottle containers B and may be varied for each bottle container B. In consideration of this, one might provide a pair of rotating brush rolls on opposite sides of the container transport path at a position spaced toward the downstream of the container transport path from the label-fitting position α, and use the brush rolls to rub on each label L surrounding a bottle container B in an attempt to slide down the label L. However, as it is extremely difficult to scrape down the label L using the brush rolls once the label L is closely adhered to a wet container surface, it is almost impossible to adjust the varied label L fitted positions in alignment with a desired position. If the labels L are subjected to heat shrinkage for attachment to the bottle containers B while the labels L remain in the non-uniform fitted positions, appearance defect of the attached labels may be generated.

To address this problem, as shown in FIG. 14, in the label-fitting device 1 of the present embodiment, a label rebound prevention member 80 is provided at a position slightly moved toward the downstream of the container transport path from the label-fitting position α and above the bottle container B. At the point when a label L fitted around a bottle container B rebounds against the conveyor 2 and jumps up, the bottle container B is already reaching a position immediately below the abutting portion 84 of the label rebound prevention member 80. Accordingly, at least a part of the top end part of the rebounding label L abuts the abutting portion 84 of the label rebound prevention member 80, and the label L is thereby stopped. With this arrangement, the fitted height of the label L on each bottle container B becomes substantially aligned. As a result, the attached height of the labels L attached by being subjected to heat shrinkage in the later heating stage can be made substantially uniform, enabling to reduce generation of appearance defect of the attached labels. It should be noted that, particularly in the case of fitting tubular labels L on bottle containers B having a wet surface, the above-described achieved effects are effectively generated by carrying out the fitting while the label L is rotating in the circumferential direction. In a state without rotation in the circumferential direction, the label L adheres to the wet bottle container B, such that movement and height alignment of the label L with respect to the bottle container B is impeded.

Next, a label-fitting device 1 provided with a label rebound prevention member 81 having a different form is described by reference to FIGS. 15 and 16.

Figure 15:
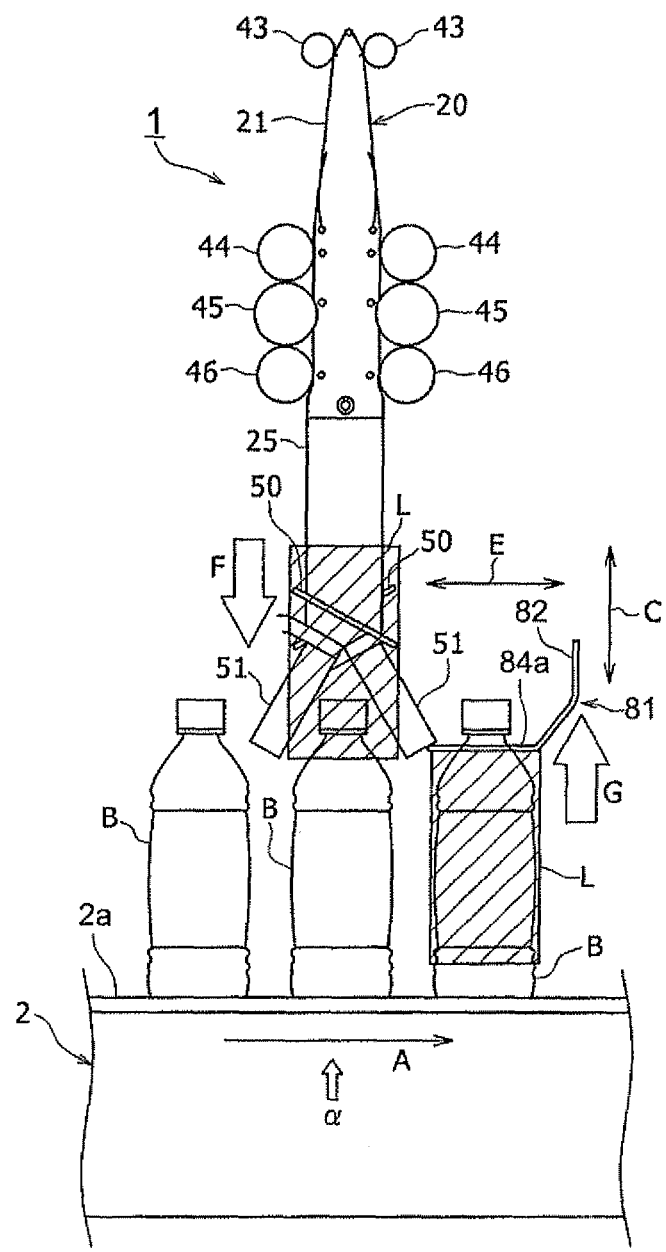
FIG. 15 is a front view corresponding to FIG. 12, showing a label-fitting device provided with a label rebound prevention member having a different form.
Figure 16:
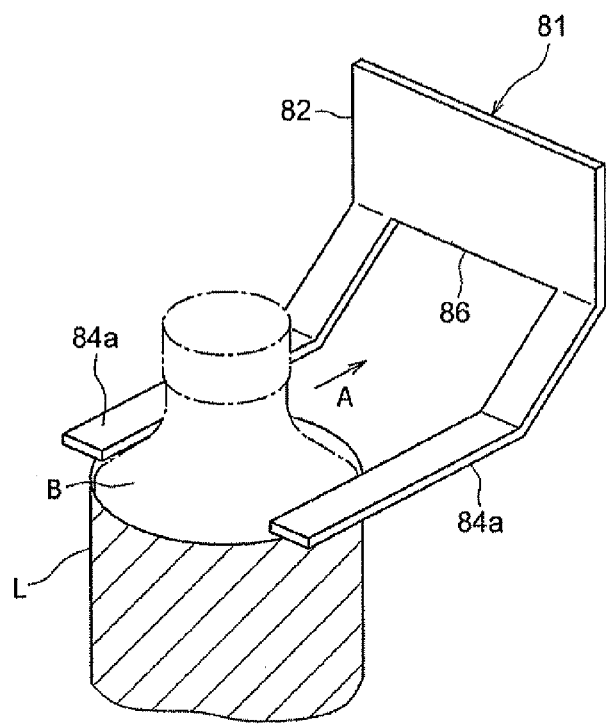
FIG. 16 is an enlarged perspective view of the label rebound prevention member shown in FIG. 15.

As shown in FIGS. 15 and 16, the label rebound prevention member 81 is installed immediately near the label-fitting position α toward the downstream along the bottle container B transport direction, similarly to the rebound prevention member 80. Meanwhile, the label rebound prevention member 81 of the present form includes a mounting portion 82, two abutting portions 84a extending in parallel to each other from the lower part of the mounting portion 82, and a cutout portion 86 formed between the abutting portions 84a. Further, the label rebound prevention member 81 is installed such that the abutting portions 84a abut the top end part of the label L fitted around the bottle container B at positions on opposite sides of the container transport direction A.

The abutting portions 84a of the label rebound prevention member 81 are arranged so as to abut the top end part of the label L on two sides of the bottle container B at a position lower than the uppermost or crown part of the bottle container B. Further, the cutout portion 86 is formed so that the top part (or cap part) of the bottle container B transported in the direction indicated by arrow A can pass without interfering. While this description refers to a structure in which two abutting portions 84a abut the top end part of the label L on two sides of the bottle container B, it is alternatively possible to provide a structure in which only one abutting portion 84a is provided to abut the top end part of the label L on one side of the bottle container B. Furthermore, the two abutting portions 84a may be constituted as separate members and supported separately.

According to the label-fitting device 1 including the label rebound prevention member 81 of the present form, the amount of label L rebound can be regulated at a position lower than the uppermost part of the bottle container B, and the label L fitted positions can be aligned with a position at the desired height. As a result, the attached state of the labels L fully attached by being subjected to heat shrinkage in the later heating stage can be made substantially uniform, enabling to reduce generation of appearance defect of the attached labels. Further, according to the label-fitting device 1 including the label rebound prevention member 81, because it is possible to attain a state in which the label L is fitted at a relatively low position, the need to carry out an additional step of sliding down the label L around the bottle container B using a rotary brush roll may be eliminated.

While it is described above that the label rebound prevention member may be formed using a bent plate material, the present invention is not limited by this feature. Rod members, wires, and the like may alternatively be used.

Figure 17:
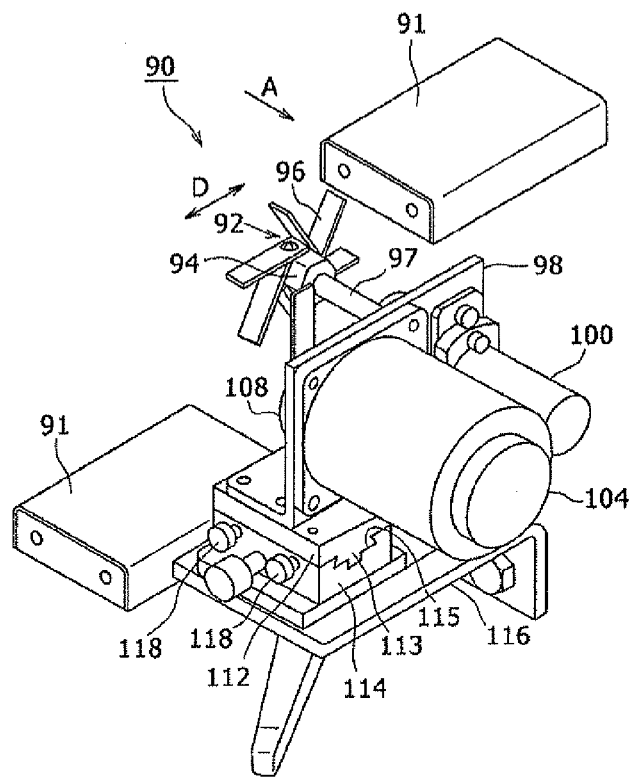
FIG. 17 is a perspective view showing a label position alignment device with rotary brush, which is a label rebound prevention member having a further different form.
Figure 18:
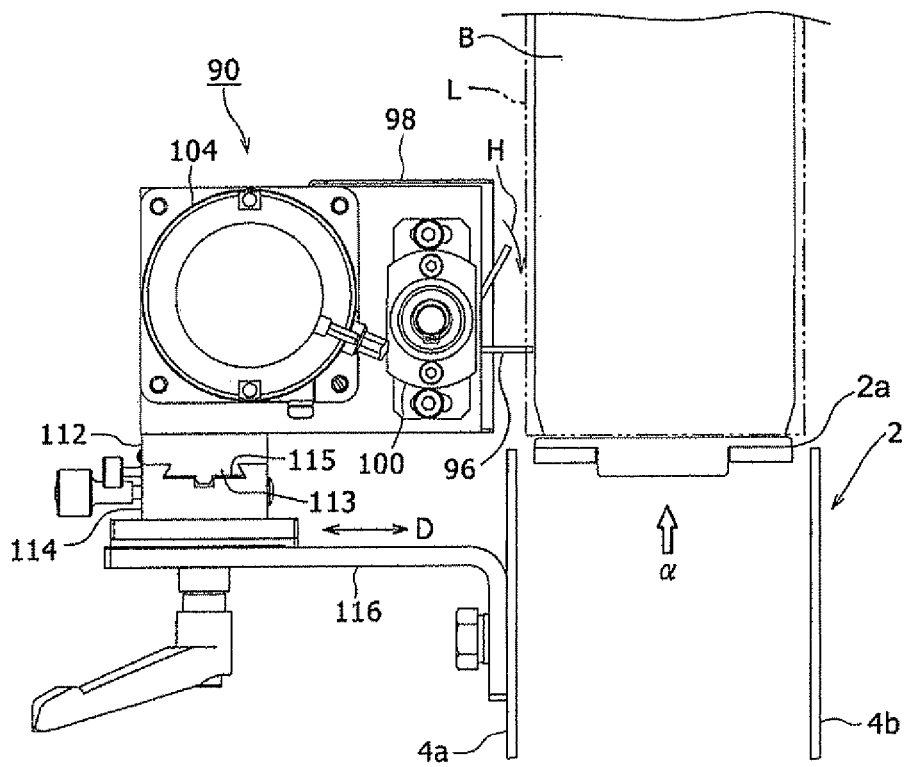
FIG. 18 is a side view showing the label position alignment device.
Figure 19:
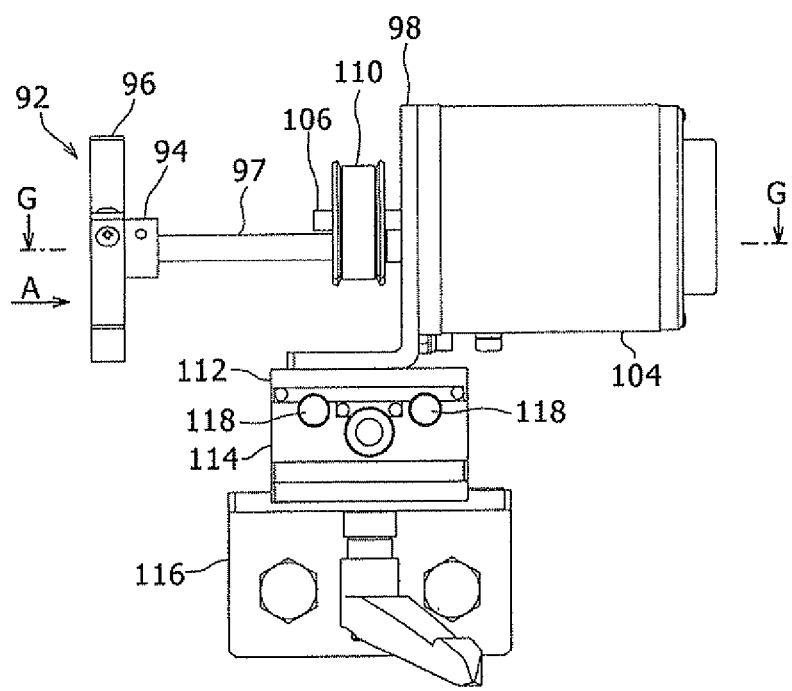
FIG. 19 is a front view showing the label position alignment device.
Figure 20:
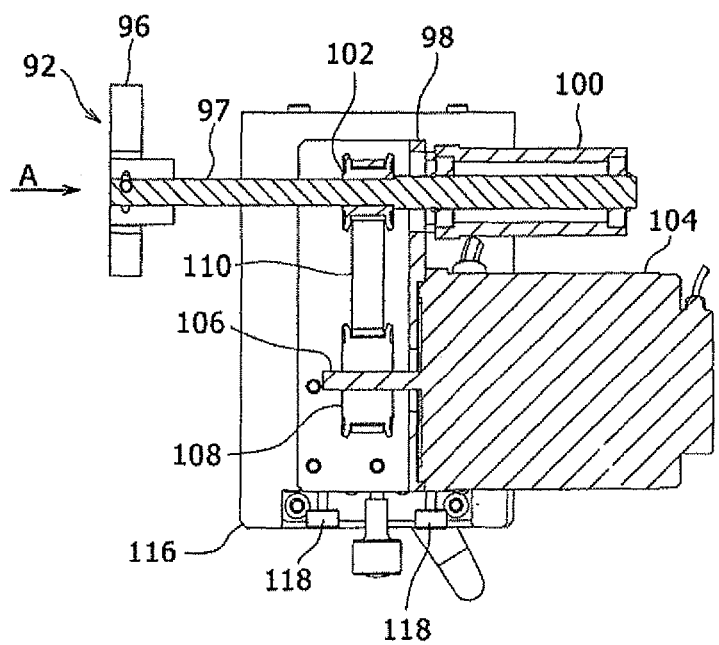
FIG. 20 is a cross-sectional view taken along line G-G in FIG. 19.

Next, a label position alignment device (film position alignment device) with rotary brush, which is another form of the label rebound prevention member, is described by reference to FIGS. 17 to 20. FIG. 17 is a perspective view showing the label position alignment device 90. FIG. 18 is a side view showing the label position alignment device 90. FIG. 19 is a front view showing the label position alignment device 90. FIG. 20 is a cross-sectional view taken along line G-G in FIG. 19. In FIGS. 17 to 20, the mandrel 20 is not shown.

As shown in FIGS. 17 to 20, the label position alignment device 90 includes a rotary brush 92. The rotary brush 92 has the function to rub, by rotation, on the outer surface of a label L fitted around a bottle container B, and to thereby suppress rebound of the label L.

Similarly to the abutting portion of the above-described label rebound prevention member 80, the rotary brush 92 is installed close to the label-fitting position α, at a position immediately downstream from the label-fitting position α along the container transport direction (direction of arrow A). Meanwhile, as shown in FIG. 18, the rotary brush 92 differs in that it is arranged at a position which is immediately downstream of the label-fitting position α and lateral to the bottle containers B continuously transported by the conveyor 2a of the bottle transport device 2. In FIG. 18, the bottle container transport direction is the direction along an axis perpendicular to the sheet surface, from further in the drawing toward the viewer.

Since the rotary brush 92 is installed at a position located away from the bottle container B transport path toward the front as described above and does not obstruct bottle container transport, the rotary brush 92 can be provided immediately near the label-fitting position α, or even at a position right in front of the label-fitting position α. However, in order to avoid interfering with the label-fitting operation, the rotary brush 92 is preferably arranged at a position slightly moved downstream from the label-fitting position.

While, in the example shown in FIG. 18, the rotary brush 92 is arranged to contact the label L at a position lateral to a lower part of the bottle container B, the present invention is not limited by this feature. The rotary brush 92 may alternatively be arranged at a position for sliding contact with the label L at its intermediate part along the label height direction. Here, although it might be possible to place the rotary brush 92 in sliding contact with a top end part of the label L, since that may result in causing buckling or damages to a label L having a small thickness (for example, a thickness of 30 μm or less), it is preferable to place the rotary brush 92 in sliding contact with parts other than a top end part of the label L. However, depending on the choices of or the balance between the material and thickness of the label L and the properties of the rotary brush 92, if such buckling or the like does not occur, the rotary brush 92 may be placed in sliding contact with a side surface of the label L near its top end part.

The rotary brush 92 includes a tubular mounting member 94 and a plurality of sliding contact members 96 mounted on the outer surface of the mounting member 94. Each of the sliding contact members 96 is a rectangular piece made of a soft and flexible material such as a rubber plate or a resin film. In each sliding contact member 96, one end portion is secured to the outer surface of the mounting member 94 by a screw or the like, and the other end portion extends along a direction tangential to the outer surface of the mounting member 94. While the present embodiment shows an example in which six sliding contact members 96 are provided at equal intervals in the circumferential direction, the number of sliding contact members 96 can be changed as appropriate.

Each sliding contact member 96 of the rotary brush 92 may alternatively be configured by embedding soft and flexible resin fibers, animal hair, and the like on the outer surface of the mounting member 94

The rotary brush 92 is secured to one end of a shaft 97. As shown in FIG. 20, the other end of the shaft 97 extending through a support plate 98 is rotatably supported by a bearing unit 100 fixed to an upright wall part of the support plate 98. Further, a driven pulley 102 is mounted on an intermediate segment of the shaft 97. The driven pulley 102 is mounted on the same side of the upright wall part of the support plate 98 as the rotary brush 92.

The support plate 98 is formed by bending a metal plate into an L-shape. On the upright wall part of the support plate 98, a drive motor 104 is mounted adjacent to the bearing unit 100. A drive pulley 108 is secured to a drive shaft 106 of the drive motor 104. Further, a belt 110 is entrained around this drive pulley 108 and the above-noted driven pulley 102.

With this arrangement, when the drive motor 104 of the label position alignment device 90 is rotationally driven, the rotational motive force is transmitted to the shaft 97 via the two pulleys 102, 108 and the belt 110, and as a result, the rotary brush 92 secured to the shaft 97 is rotated. At that time, as indicated by arrow H in FIG. 18, the sliding contact members 96 of the rotary brush 92 are rotated so as to make a downward sliding contact with the outer surface of the label L which is fitted around the bottle container B transported by the bottle transport device 2.

In order to avoid generating impediments to label attachment process, the rotational speed of the rotary brush 92 (or the label sliding-contact speed of the sliding contact members 96) is preferably set greater than the speed of label L delivery by the shot rollers 50. Alternatively, the rotational speed of the rotary brush 92 may be set slightly lower than the label L delivery speed to thereby generate a braking effect, so as to reduce the speed of collision of the label L against the conveyor and suppress rebound.

The support plate 98 is secured to a slide member 112 while being maintained in an orientation in which its upright wall part is aligned along the vertical direction. The slide member 112 is slidably mounted on a base member 114. Further, the base member 114 is mounted on a front wall plate 4a of the bottle transport device 2 via a bracket 116 configured by bending a metal plate into a L-shape.

A guide part 113 is formed projecting from the bottom of the slide member 112. This guide part 113 engages with a guide groove 115 formed having a complementary shape in the based member 114. With this arrangement, the slide member 112 is configured slidable along the extending direction of the guide groove 115 in the base member 114, which corresponds to the bottle container B transport direction. Further, securing screws 118 are screwed into female threaded holes formed in the base member 114. By tightening these securing screws 118 to thereby place their screw tips in urging contact with the guide part 113 of the slide member 112, the position of the slide member 112 relative to the base member 114 becomes fixed. By moving the slide member 112 and adjusting its position along the bottle container transport direction as described above, the horizontal position of the rotary brush 92 can be adjusted so that the sliding contact members 96 of the rotary brush 92 make a sliding contact at the instant that the label L is fitted around the bottle container B or immediately after that instant.

Further, in the label position alignment device 90, the base member 114 is preferably configured slidable with respect to the bracket 115, as indicated by arrow D in FIG. 18. By configuring in this manner, it is possible to adjust the position of the rotary brush in the lateral direction (hereinafter also referred to as the front-to-back direction), which is orthogonal to the bottle transport direction. As a result, when the sizes of the bottle containers B and the labels L are changed, adaptations can be made by moving the rotary brush 92 along the front-to-back direction. Further, when the label L has a small thickness (for example, a thickness of 30 μm or less), by setting the sliding contact force of the rotary brush 92 to a small value, it is possible to effectively prevent a situation in which the lower end part of the label L is pressed against the conveyor 2a resulting in a buckling deformation. Prevention of such buckling deformation is made more effective when the sliding contact members are formed by embedding of fibers or hair as mentioned above.

Next, achieved effects of the label position alignment device 90 having the above-described structure are described.

The operations performed for fitting a label L around a bottle container B transported to the label-fitting position α by the bottle transport device 2 are identical to those described above.

The bottle container B fitted with the label L is continuously transported on the conveyor 2a of the bottle transport device 2 without making any temporary stop at the label-fitting position α. Accordingly, at the instant that the label L is fitted around its trunk or immediately after that instant, the bottle container B reaches a position facing the rotary brush 92.

After being fitted around the trunk of the bottle container B at the label-fitting position α, the label reaches the conveyor 2a of the bottle transport device 2, and, before rebounding and jumping up therefrom, the label L receives a downward sliding contact on its outer side part by the sliding contact members 96 of the rotationally driven rotary brush 92. Consequently, rebound of the label L is minimized or prevented by the sliding contact of the rotary brush 92. As a result, the fitted height of the label L on each bottle container B can be made substantially uniform. Accordingly, the attached height of the labels L attached by being subjected to heat shrinkage in the later heating stage can be made substantially uniform, enabling to reduce generation of appearance defect of the attached labels.

While a single rotary brush 92 is used to make a sliding contact with the label L for suppressing rebound in the above-described label position alignment device 90, the present invention is not limited by this feature. Alternatively, a pair of rotary brushes may be provided on both sides, in the front-to-back direction, of the container transport path, so as to make sliding contacts with the label L at radially opposite positions of the label L. In this way, label L rebound can be more minimized reliably. In that case, the two rotary brushes may be arranged by being slightly shifted from each other along the container transport direction (direction of arrow A).

While it is explained above that the position of the rotary brush 92 is adjustable along at least one of the container transport direction (direction of arrow A) or the front-to-back direction orthogonal thereto, the present invention is not limited by this feature. The position of the rotary brush 92 may also be configured adjustable along the vertical direction (or height direction). In that case, for example, bolt insertion holes in the bracket 116 may be formed as elongate holes extending in the vertical direction, and, the vertical adjustment can be made by changing the mounting height of the bracket 116 with respect to the front side plate 4a. With this arrangement, the rotary brush can be placed in sliding contact with the label L at a position having the most effective height for suppressing label L rebound.

Further, as shown in FIG. 17, a container detection sensor 91 for detecting arrival of a bottle container B at the label-fitting position α may additionally be provided in the label position alignment device 90. In that case, by providing a pair of container detection sensors 91 on opposite sides (in the front-to-back direction) of the container transport path, container detection can be performed more reliably. Further, the two container detection sensors 91 may be arranged by being slightly shifted from each other along the container transport direction (direction of arrow A).

Figure 21A:
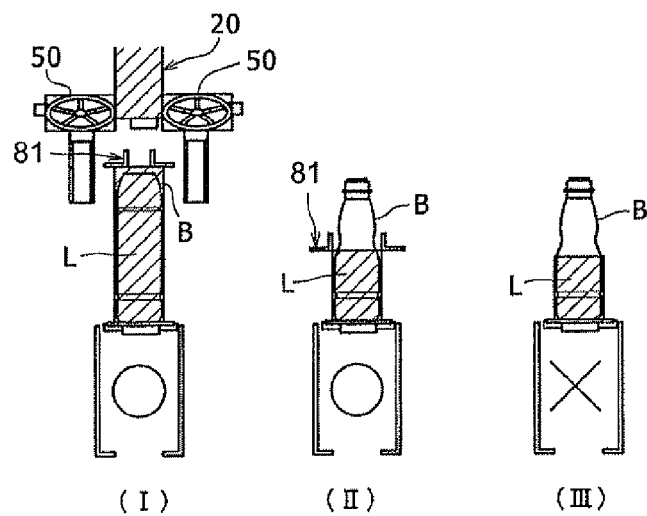
FIG. 21a is a diagram showing the label-fitting position as viewed from a side toward the downstream of the container transport direction in the case in which the label rebound prevention member shown in FIG. 16 is used.
Figure 21B:
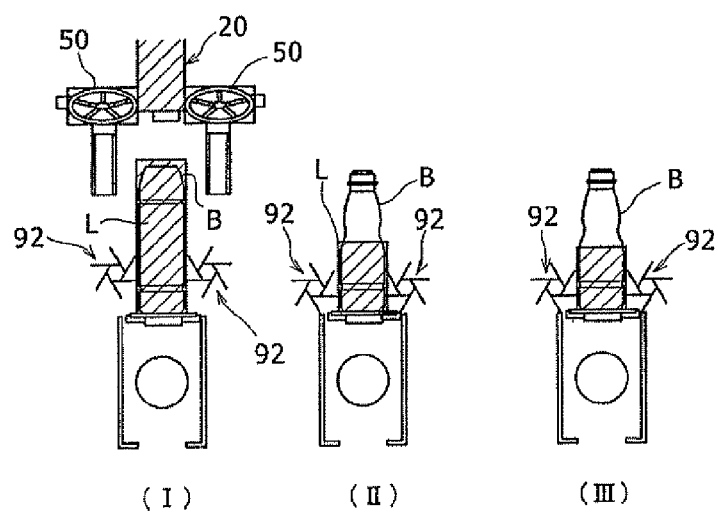
FIG. 21b is a diagram showing the label-fitting position as viewed from a side toward the downstream of the container transport direction in the case in which the rotary brush shown in FIG. 18 is used in a pair.

FIGS. 21a and 21b are diagrams showing the label-fitting position as viewed from a side toward the downstream of the container transport direction. FIG. 21a illustrates an example in which the label rebound prevention member 71 shown in FIG. 16 is used, and FIG. 21b illustrates an example in which the rotary brush 92 shown in FIG. 18 is used in a pair. In the case of using the label rebound prevention member 71 as shown in FIG. 21a, when the position of the label L top end part is higher than the crown part of the bottle container B (as shown at (I)) or higher than the maximum diameter part of the bottle container B (as shown at (II)), label L rebound can be suppressed effectively. However, when the position of the label L top end part is lower than the maximum diameter part of the bottle container B, the label rebound prevention member cannot be installed, so that it is not possible to regulate the label L fitted height. This fact is denoted in FIG. 21a at (III) by marking with an X.

In contrast, in the example shown in FIG. 18, the rotary brushes 92 are used to suppress label L rebound by pushing down on the label L side surface. Accordingly, even when the position of the label L top end part is lower than the maximum diameter part of the bottle container B, label L rebound can be suppressed effectively, enabling to regulate the label L fitted height. This fact is denoted in FIG. 21b at (III) by marking with an O.

Next, a further different form of the label rebound prevention member is described by reference to FIGS. 22a to 23. FIG. 22a is a front view of a label-fitting device provided with check members on lateral sides of the label-fitting position. FIG. 22b is a side view of the same label-fitting device. Further, FIG. 23 is an enlarged view of the check members shown in FIG. 22b.

The label rebound prevention member of this embodiment is configured as a check member 130 that, when contacted by the outer surface of a label L fitted around a bottle container B, permits label L movement in the fitting direction (in this case, in the downward direction) but inhibits label L movement in the direction opposite to the fitting direction (in this case, in the upward direction).

The check member 130 includes a substrate 132 made of resin or the like, and oblique members 134 provided on one surface of the substrate 132. When the substrate 132 is arranged facing the bottle container B in a position in at least one of the front and the back directions, the oblique members 134 extend diagonally downward relative to the horizontal direction, and the tip part of the oblique members 134 contact the outer surface of the fitted label L. The oblique members 134 are composed of soft and flexible resin hair, animal hair, resin sheet, or the like.

By configuring such that the soft and flexible oblique members 134 in a downward diagonal orientation are arranged so as to contact the label L outer surface, label L movement is permitted when the label L delivered from the mandrel 20 is fitted around the bottle container B from above and downward. However, when the label L is about to rebound from the conveyor, the oblique members 134 function to inhibit movement of the label L from below and upward. As a result, label L rebound is minimized, and the label fitted height with respect to each bottle container B can be made substantially uniform.

While FIGS. 22a and 22b show, in solid lines, an example in which the check member 130 is arranged in a position in which the oblique members 134 contact the label L side surface, the check member 130 may alternatively be arranged in a position in which the oblique members 134 engage the top edge part of the label L, as shown in dashed lines. When arranged in that position, as the oblique members 134 hook onto the top end part of the label L, it is advantageous in that the label L rebound prevention effect can be achieved more reliably.

Figure 24A:
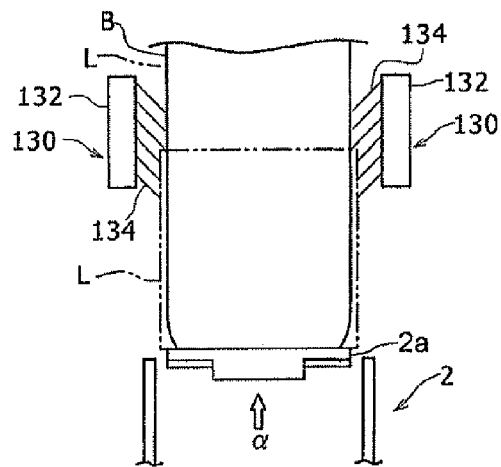
FIGS. 24a and 24b are diagrams showing variant examples of the check members.
Figure 24B:
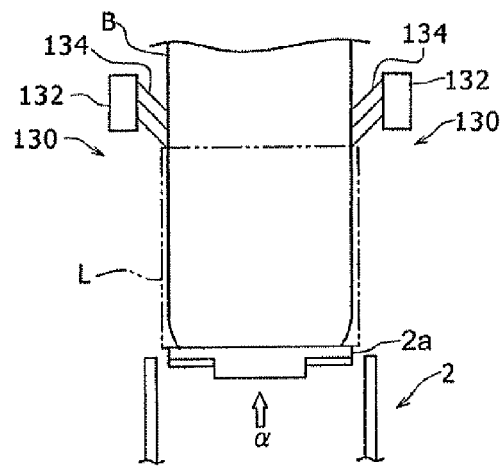

FIGS. 24a and 24b are diagrams showing variant examples of the check member 130. As shown in FIG. 24a, the check member 130 may be arranged near the top edge part of the label L fitted around the bottle container B at a predetermined label attachment position, such that, at a position facing the trunk of the bottle container B, the oblique members 134 of the check member 130 engage the label L top edge part and the label side surface in the vicinity thereof. By configuring such that, at a position facing the trunk of the bottle container B, the oblique members 134 of the check member 130 engage the label L top edge part and the label side surface in the vicinity thereof, label L rebound can be suppressed effectively. Further, as compared to the above-described label rebound prevention members 80, 81, this variant example is compact and can advantageously be installed without being influenced by the height and trunk outer diameter of the bottle container B.

Further, as shown in FIG. 24b, the check member 130 may alternatively be arranged such that the oblique members 134 of the check member 130 engage only the top edge part of the label L. When arranging in that manner, in order to avoid contacting the label L side surface, the number of the oblique members 134 may be decreased, or the installation height of the check member 130 can be adjusted. According to this arrangement, it is possible to effectively suppress label L rebound while reducing contact resistance caused by the oblique members 134 when the label L is being fitted around the bottle container 13.

While it is explained above that the above-described label rebound prevention members having various forms are particularly effective in the case in which a label is fitted around a bottle container while the label is rotated in the circumferential direction, the present invention is not limited to such a case. The present invention may be applied to a label-fitting device of a type that fits a label around the bottle container by delivering the label from the mandrel without rotating the label in the circumferential direction.

Next, a fourth embodiment of the present invention is described. A conventional label-fitting device 980 as shown in FIG. 56 carries out a method including opening the label-forming medium LM into tubular form using the mandrel 981, cutting apart a label L from the label-forming medium LM while maintaining that state, and subsequently delivering the label toward the bottle B while applying rotation using a roller 984. According to this method, the fitted position of the label L around the trunk of the bottle B becomes varied depending on the state of frictional resistance between the bottle B and the label L.

Specifically, in the case of a thin label having a thickness of 20 μm for example, even when a very small change occurs in frictional resistance between the bottle B and the label L, the fitted position of the label L around the trunk of the bottle B becomes greatly varied.

When there are water drops on the surface of a bottle B, frictional resistance between the bottle B and the label L increases, resulting in a phenomenon in which the thin film L shot out by the delivering roller 984 adheres to the bottle B before reaching the conveyor. On the other hand, when there are no water drops on the surface of a bottle B and humidity is low, frictional resistance between the bottle B and the label L decreases, resulting in a phenomenon in which the thin film L shot out by the delivering roller 984 collides against the conveyor, rebounds in counteraction, and subsequently adheres to the bottle B.

In either case, the adhering position of the label L on the bottle B (hereinafter referred to as "label-fitted position") is unstable, and the method of fitting a label L on a bottle B as described in JP 2010-516567 A is disadvantageous in that the label-fitted position of the label L around the bottle B becomes varied. When the label-fitted position around the bottle B becomes varied, the fixed position of the label L on the bottle after subjecting the label L to heat shrinkage in the later stage becomes greatly varied, resulting in very frequent generation of label attachment defects.

A label-fitting device 1 according to the present embodiment is capable of controlling the label-fitted position of a label to be fitted around a bottle to within a predetermined range as much as possible.

The mechanical configuration of the present embodiment is almost the same as the second embodiment. That is, as shown in FIG. 8, the label-fitting device 1 is a system in which a large number of bottle-type containers B (hereinafter referred to as "bottles B") are transported in a horizontal direction at a predetermined interval, and, at every time a bottle B is transported to a predetermined position (hereinafter referred to as "label-fitting position α") on its transport path, a label L opened into tubular form is shot down (i.e., delivered with momentum) from above so as to be fitted around the trunk of each bottle B. The bottle B is made of a synthetic resin such as PET (polyethylene terephthalate).

The bottle transport device 2 is constituted with a conveyor for transporting a large number of bottles B in a standing state. In FIG. 8, a large number of bottles B are transported from the left side to the right side, and, at the point when each bottle B passes the label-fitting position α, a label L opened into tubular form is shot down (i.e., delivered with momentum) from above so as to be fitted around the trunk of each bottle B. A screw (not shown) is provided on the conveyor 2a at a position upstream of the label-fitting position α, and this screw creates spaces between the large number of bottles B transported thereto in one line without any spaces in between, so as to set the respective intervals between the bottles to a predetermined bottle interval $D_B$[mm].

While a belt conveyor is used as the bottle transport device 2 in the present embodiment, a conveyor of a type other than a belt type may also be used.

Further, as shown in FIG. 4, a bottle detection sensor 62 (optical sensor) is provided at a predetermined position upstream of the label-fitting position α, on one side surface of the conveyor 2a (in FIG. 4, the side surface toward the viewer). The bottle detection sensor 62 comprises a reflective photo-interrupter, and detects a bottle B transported to the label-fitting position α. On the other side surface of the conveyor 2a, a reflection mirror 63 for reflecting light emitted from the bottle detection sensor 62 back to the bottle detection sensor 62 side is provided. The bottle detection sensor 62 emits light from its light emitter, and outputs a signal (for example, a HIGH-level signal) indicating that light reflected by the reflection mirror 63 is received at its light receiver. When a bottle B passes between the bottle detection sensor 62 and the reflection mirror 63, a signal (for example, a LOW-level signal) indicating that the emitted light from the bottle detection sensor 62 is shielded by the bottle B is output. Accordingly, a bottle B transported to a position immediately upstream of the label-fitting position α is detected when the level of the output signal $S_6$ from the bottle detection sensor 62 becomes inverted (for example, from HIGH level to LOW level).

In the present embodiment, since the side surface of the bottle B is a curved surface, the direction in which the light emitted from the photo-interrupter is reflected off of the bottle B is unstable, and for this reason, the reflection mirror 63 is used to reflect the emitted light from the photo-interrupter. When the shape of the side surface of the bottle B is such that it provides a stable light reflection direction, the reflection mirror 63 may be eliminated, and the photo-interrupter may be configured to receive light reflected off of the bottle B. In that case, as the level of the output signal $S_6$ from the bottle detection sensor 62 is in reverse to the case in which the reflection mirror 63 is used, a bottle B is detected when the level of the output signal $S_6$ from the bottle detection sensor 62 becomes inverted from LOW level to HIGH level.

The medium-delivering unit 10 feeds, from a medium roll, a tubular label-forming medium LM composed of a thin shrink film having the same prints repeatedly provided thereon and folded in band-like form, and delivers the label-forming medium LM to a medium cutting position β while imparting a constant tension force using a tensioning mechanism. At the medium cutting position β, a medium cut unit 30 cuts on each cut point $M_C$ of the label-forming medium LM to thereby form labels L sequentially. The medium cutting position β is set at a position at a predetermined height above the label-fitting position α. As the medium delivery path from the medium roll via the tensioning mechanism to the medium cutting position β is the same as in the conventional structure shown in FIG. 56, FIG. 8 does not show that part and only illustrates the part around the medium cutting position β.

As the shrink film constituting the label-forming medium LM, a thin shrink film made of a polyester resin, polystyrene resin, polyolefin resin, or the like and having a thickness in the range from 15 to 40 μm is used, for example. The cut point $M_C$ of the label-forming medium LM is provided at each boundary part between the same prints repeatedly provided on the shrink film at a predetermined pitch along its lengthwise direction.

The medium-delivering unit 10 includes a drive roller 11 and a driven roller 12 disposed at a predetermined position on the upstream of the medium cutting position β. The medium cut unit 30 includes a movable blade 32 and a fixed blade 31 disposed at the medium cutting position β. When initially setting the label-forming medium LM on the fitting device 1, the label-forming medium LM is set to be held between the drive roller 11 and the driven roller 12, and the first cut point Mc is aligned with the medium cutting position β.

The drive roller 11 of the medium-delivering unit 10 is rotationally driven by a servo motor (not shown; refer to the pitch feed motor 10a in FIG. 31), intermittently at a predetermined cycle T so as to deliver the label-forming medium LM downward (in FIG. 8, the rotational drive is performed clockwise). This predetermined cycle T is identical to a cycle $T_B$ at which the bottle transport device 2 transports the bottles B to the label-fitting position α. The amount of rotation of the drive roller 11 at one time is the amount for transporting the label-forming medium LM until the next cut point $M_C$ of the label-forming medium LM reaches the medium cutting position β (hereinafter, the distance $D_C$ between adjacent cut points of the label-forming medium LM is referred to as "label length"). As the driven roller 12 of the medium-delivering unit 10 is placed in pressure contact with the drive roller 11, the driven roller 12 intermittently rotates counterclockwise along with the rotation of the drive roller 11. By means of the intermittent rotational operation of the drive roller 11 and the driven roller 12, the label-forming medium LM is transported to the medium cutting position β at the predetermined cycle T in units of the label length $D_C$.

The medium cut unit 30 cuts the label-forming medium LM by a guillotine method. The movable blade 32 of the medium cut unit 30 is disposed at the medium cutting position β in a manner capable of reciprocating along the horizontal direction. The fixed blade 31 is fixed in a vertical orientation, with its blade tip being positionally aligned with the medium cutting position β. Every time a cut point $M_C$ of the label-forming medium LM reaches the medium cutting position β, the movable blade 32 reciprocates toward the fixed blade 31 and cuts the label-forming medium LM.

A mandrel 20 is a member for opening a label L folded in sheet form into tubular form. A label transfer mechanism 40 is a transfer mechanism for arranging, around the mandrel 20, each label L cut apart from the label-forming medium LM by the medium cut unit 30.

Figure 9A:
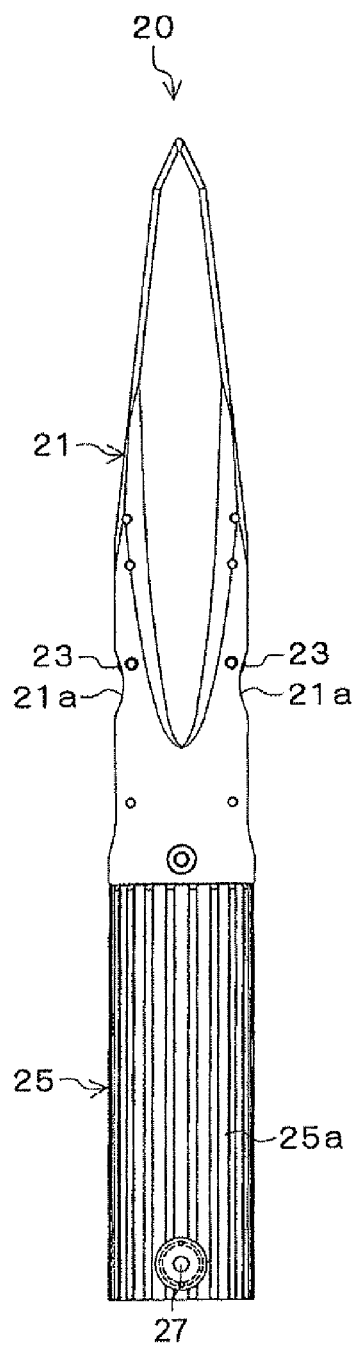
FIG. 9a is a front view of a mandrel constituting the above-noted label-fitting device.
Figure 9B:
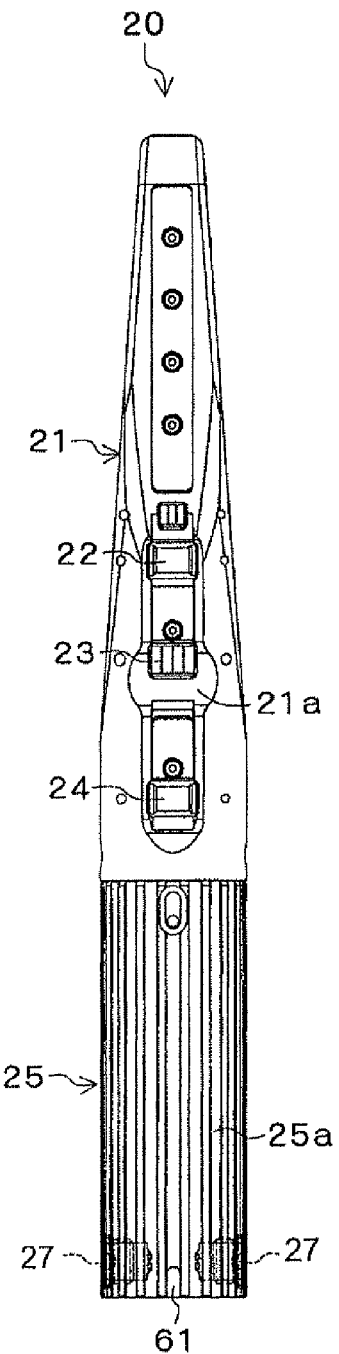
FIG. 9b is a side view of the mandrel constituting the above-noted label-fitting device.

As shown in FIGS. 9a and 9b, the mandrel 20 comprises a rod member in which one end side has a conical shape and the other end side has a cylindrical shape with a diameter slightly larger than the bottle B trunk diameter. The conical part of the mandrel 20 is a label-opening part 21 that serves a guiding function for opening the label L into tubular form, and the cylindrical part is a label-shaping part 25 that serves a function of shaping the label L into a cylinder shape having a circular cross-section. The label-opening part 21 has a square pyramid shape which, when viewed from the front, each of the four side surfaces on the front, back, left, and right sides has a tapering slope. The tip portion of the label-opening part 21 is shaped into a wedge shape by increasing the slope angles of the sloping surfaces on the left and right sides only. The reason why the tip portion of the label-opening part 21 is configured in a wedge shape is that, when the label-forming medium LM in sheet form is delivered by the medium-delivering unit 10, the bottom end of the label-forming medium LM can be collided with the wedge portion, so that the bottom end of the label-forming medium LM can be pushed open so as to cause the label-opening part 21 of the mandrel to be fitted inside the label-forming medium LM.

On the outer surface of the label-shaping part 25, a large number of vertical grooves 25a are formed for reducing the area of contact with the label L (i.e., for reducing frictional force with respect to the label L). A pair of ball rollers 27, which are freely rotatable in arbitrary directions, are mounted in the front and back side surfaces of the lower end portion of the label-shaping part 25. The ball rollers 27 are installed in a manner such that part of their outer surfaces are slightly projecting from the side surfaces of the label-shaping part 25. Each of the ball rollers 27 holds a label L between itself and a shot roller 50, and, when the shot rollers 50 rotate to shoot out the label L to a bottle B, the ball rollers 27 are driven by the rotation of the shot rollers 50 to thereby function to help carry out the shooting out operation smoothly.

A reflection mirror 61 for reflecting light emitted from an optical sensor 60 comprising a reflective photo-interrupter is attached to the left side surface of the end portion of the label-shaping part 25. The optical sensor 60 is a sensor for detecting that a label L is transferred to the label-shaping part 25 of the mandrel 20. The optical sensor 60 (hereinafter referred to as "label detection sensor 60") is fixed to a fixing member so that, when the mandrel 20 is mounted in the label transfer mechanism 40, a light receiver of the optical sensor 60 is positioned at the substantially same height as the reflection mirror 61 on the mandrel 20 and facing the reflection mirror 61.

Light emitted from a light emitter of the label detection sensor 60 is reflected off of the reflection mirror 61 and enters into the light receiver of the label detection sensor 60. For example, a signal output from the label detection sensor 60 is at HIGH level when no label L is transferred to the label-shaping part 25 of the mandrel 20, and, when a label L is transferred to the label-shaping part 25, the refection mirror is shielded by the label L, so the signal is set to LOW level. Accordingly, transfer of a label L to the label-shaping part 25 of the mandrel 20 is detected when the level of the output signal from the label detection sensor 60 becomes inverted (for example, from HIGH level to LOW level).

The mandrel 20 is detachably fitted with the label transfer mechanism 40. As shown in FIG. 8, the label transfer mechanism 40 includes four pairs of pulleys that, after the bottom end of the label-forming medium LM is pushed open by the wedge portion of the mandrel 20 and the label-forming medium LM is arranged around the label-opening part 21, transports a label L cut apart from the label-forming medium LM to the label-shaping part 25. The four pulleys 41, 45, 44, 43 are arranged in a vertically aligned manner so that, when fitted on the mandrel 20, the pulleys 41, 45, 44, 43 contact the left and right side surfaces of the label-opening part 21 via feed belts 46. The pulleys 41, 45, 44 also function as fitting members that detachably fit on the mandrel 20.

While the lowermost pair of pulleys 41 are drive pulleys for rotating the feed belts 46, the other pulleys 45, 44, 43, 42 are driven pulleys rotated by the rotation of the feed belts 46.

As shown in FIG. 9b, in the left and right side surfaces of the mandrel 20 from the lower end of the sloping surfaces to the lower end of the label-opening part 21, three pairs of rollers 22, 23, 24 are rotatably mounted while being spaced at a predetermined interval. The six rollers 22, 23, 24 are provided in a manner such that their roller circumferential surfaces are slightly exposed from the side surfaces of the mandrel 20. In the left and right side surfaces where the rollers 23 are provided, recesses 21a are formed. The recesses 21a are provided for embedding therein the pair of driven pulleys 45 of the label transfer mechanism 40 when fitting the mandrel 20 with the label transfer mechanism 40.

When the mandrel 20 is supported by embedding the pair of driven pulleys 45 in the pair of recesses 21a, the pair of drive pulleys 41 below the pair of driven pulleys 45 hold and push the feed belts 46 against the pair of rollers 24 of the mandrel 20, respectively, and the pair of driven pulleys 44 located above hold and push the feed belts 46 against the pair of rollers 22 of the mandrel 20, respectively. Further, the pair of driven pulleys 43 of the label transfer mechanism 40 hold and push the feed belts 46 against the left and right side surfaces, respectively, of the wedge portion of the upper end part of the mandrel 20. With this arrangement, the mandrel 20 is retained in vertical orientation by being held between the pair of drive rollers 41 and the two pairs of driven rollers 45, 44 of the label transfer mechanism 40, and the pair of feed belts 46 are each pushed against the left and right side surfaces of the label-opening part 21 of the mandrel 20 by the three pairs of driven rollers 45, 44, 43.

The label transfer mechanism 40 is constituted with two feed belt units 40A, 40B comprising the feed belts and having identical structures. One feed belt unit 40A is installed on the left side of the vertical line N that passes through the label-fitting position α, while the other feed belt unit 40B is installed on the right side of the same vertical line N (see FIG. 8).

Each of the feed belt units 40A, 40B includes the above-described one drive pulley 41, three driven pulleys 45, 44, 43, a feed belt 46, and one driven pulley 42. The drive pulley 41 and the two driven pulleys 43, 42 of the feed belt unit 40A are arranged forming a triangle, and the feed belt 46 is entrained around the drive pulley 41 and the four driven pulleys 45, 44, 43, 42. Similarly to in the feed belt unit 40A, in the feed belt unit 40B also, the drive pulley 41 and the two driven pulleys 43, 42 are arranged forming a triangle, and the feed belt 46 is entrained around the drive pulley 41 and the four driven pulleys 45, 44, 43, 42. The drive pulley 41 and the four driven pulleys 45, 44, 43, 42 of the feed belt unit 40A arranged in positions symmetrical, about the vertical line N, to the drive pulley 41 and the four driven pulleys 45, 44, 43, 42 of the feed belt unit 40B.

The drive pulley 41 and the driven pulleys 45, 44 of the feed belt unit 40A, which are arranged in one line, are rotatably supported on the same support member. Similarly to in the feed belt unit 40A, the drive pulley 41 and the driven pulleys 45, 44 of the feed belt unit 40B, which are arranged in one line, are also rotatably supported on the same support member. Each of the drive pulleys 41 of the feed belt units 40A, 40B is driven by a servo motor (not shown), and the feed belt 46 of the feed belt unit 40A and the feed belt 46 of the feed belt unit 40B are driven so as to transport the label L from above and downward. In other words, in FIG. 8, the feed belt 46 of the feed belt unit 40A is rotated clockwise, and the feed belt 46 of the feed belt unit 40B is rotated counterclockwise.

Near the lower end of the mandrel 20, there is provided a structure including two shot rollers 50, two shot roller motors 51 having rotors to which the respective shot rollers 50 are fixed, and support plates 52 for supporting the respective shot roller motors 51 in a manner such that the roller surface angles θ of the shot rollers 50 relative to the vertical line N can be changed. The shot roller motors 51 are drive sources that control rotation of the shot rollers 50.

In FIG. 8, in connection with the shot roller 50 arranged behind the mandrel 20, only the shot roller motor 51 is shown, and the drawing does not show the support plate 52 for mounting the servo motor or the fixing member for fixing the support plate. However, as the structure is identical to the shot roller 50, the shot roller motor 51, the support plate 52, and a fixing member 8 shown in front of the mandrel 20 in the drawing, the following description is made by reference to the shot roller 50 and its related parts shown in front of the mandrel 20.

As shown in FIG. 10, the shot roller 50 is a ring-shaped roller having a diameter slightly larger than the diameter of the label-shaping part 25 of the mandrel 20. The shot roller 50 is fixed to the tip end of the rotor of the shot roller motor 51 in a manner such that the roller surface is positioned orthogonally to the rotor shaft. The shot roller motor 51 is mounted on the support plate 52 in a manner such that the shot roller 50 contacts perpendicularly to one of the ball rollers 27 provided in the front and back side surfaces of the mandrel 20.

The mounting position of the shot roller motor 51 on the support plate 52 can be changed by pivoting, with the pivot center located at the contact position of the shot roller 50 with respect to the ball roller 27. Mounting of the shot roller motor 51 on the support plate 52 is achieved using two arc-shaped elongate holes 53, 54 created in the support plate 52, pins 55, 56 provided projecting from the upper part of a side surface of the main body 521 of the shot roller motor 51 while being spaced from each other by a predetermined interval, and a securing lever 57 that is screwed and coupled to the pin 55.

Specifically, at the tip of the rectangular support plate 52, an arc-shaped support part 52A for supporting the shot roller motor 51 is provided, and the two elongate holes 53, 54 are formed in the support part 52A. The support plate 52 is arranged with its rectangular main body oriented in a substantially horizontal direction, and is fixed on the fixing member 8 such that the support part 52A is located closely by the label-shaping part 25 of the mandrel 20.

In FIG. 8, one support plate 52 arranged on the outside (in FIG. 8, on the front side) of the mandrel 20 is fixed on the fixing member 8 with the support part 52A being oriented toward the right, and thereby the two elongate holes 53, 54 formed in the support part 52A are located along two concentric circles having the center at the ball roller 27 on the front side. Meanwhile, although not shown in FIG. 8, the other support plate 52 arranged on the inside (in FIG. 8, on the back side) of the mandrel 20 is fixed on the fixing member 8 with the support part 52A being oriented toward the left, and thereby the two elongate holes 53, 54 formed in the support part 52A are located along two concentric circles having the center at the ball roller 27 on the back side (not visible in FIG. 8).

The elongate hole 53 formed in the support part 52A is a hole for supporting the shot roller motor 51, and the elongate hole 54 is a hole for guiding when the point of support for the shot roller motor 51 on the support part 52A is moved along the elongate hole 53. The spacing between the two pins 55, 56 projecting from the shot roller motor 51 is identical to the spacing between the two elongate holes 53, 54. Accordingly, by inserting the two pins 55 and 56 projecting from the shot roller motor 51 into the elongate holes 53 and 54, respectively, and by placing the securing lever 57 in threaded engagement with the pin 55 and tightly screwing the securing lever 57, the shot roller motor 51 is fixed to the support plate 52.

When the securing lever 57 is unscrewed, the shot roller motor 51 becomes movable along the elongate hole 53. As the pin 56 (hereinafter referred to as "slide pin 56") is inserted in the elongate hole 54, even when the securing lever 57 is unscrewed, the shot roller motor 51 does not pivot about the pin 55. The shot roller motor 51 can be moved along the elongate hole 53 while maintaining the orientation in which its shaft direction is substantially orthogonal to the elongate hole 53. This movement is carried out in a state in which the shot roller 50 fixed to the tip end of the rotor of the shot roller motor 51 is maintained in contact with the ball roller 27 of the mandrel 20 so that the roller surface is rotated.

As such, by loosening the securing lever 57, moving the shot roller motor 51 along the elongate holes 53, 54 to a desired position, and subsequently tightening the securing lever 57, the roller surface angle θ of the shot roller 50 can be set to a desired angle within a predetermined angular range.

In the present embodiment, as the lengths of the elongate holes 53, 54 are set so that the angle formed by two lines extending from the position of the ball roller 27 to the two ends of the elongate hole 53 (or the elongate hole 54) becomes approximately 60 degrees, the predetermined angular range is approximately 60 degrees. By setting the mounting position of the shot roller motor 51 to the upper end of the elongate hole 53, the roller surface angle θ of the shot roller 50 relative to the vertical line N becomes zero degree. Meanwhile, by setting the mounting position of the shot roller motor 51 to the lower end of the elongate hole 53, the roller surface angle θ of the shot roller 50 relative to the vertical line N becomes 60 degrees in the counterclockwise direction.

The shot roller motor 51 is mounted on the support plate 52 so as to be positioned between the mandrel 20 and the support plate 52. In FIG. 8, with respect to the support plate 52 shown in the front left side of the mandrel 20, the shot roller motor 51 is placed behind this support plate 52. The shot roller motor 51 is installed by inserting the pin 55 and the slide pin 56 into the elongate holes 53 and 54 of the support part 52A, respectively, from the back side toward the front side of the support part 52A of the support plate 52, and subsequently screwing the securing lever 57 on the pin 55. On the support part 52A, a scale indicating the roller surface angle θ relative to the vertical line N is imprinted on the outside of the elongate hole 54 and along the elongate hole 54.

Accordingly, an operator can set the slope angle θ of the roller surface of the shot roller 50 relative to the vertical line N to a desired angle within the range from 0 to 60 degrees by adjusting the mounting position of the shot roller motor 51 on the support part 52A of the support plate 52 while looking at the scale.

Every time a label L is transferred to the label-shaping part 25 of the mandrel, the two shot roller motors 51 are each driven intermittently for only a predetermined number of rotations at a predetermined rotational speed. This drive is for causing the two shot rollers 50 to shoot downward the label L transferred to the label-shaping part 25, so as to fit the label L around a bottle B. When the roller surface angle θ of the shot rollers 50 is set to zero degree, rotational torque of the shot rollers 50 includes only a vertical direction component, so that the tubular label L is shot directly below without being rotated in the circumferential direction. When the roller surface angle θ of the shot rollers 50 is not zero degree, rotational torque of the shot rollers 50 includes not only a vertical direction component but also a horizontal component, so that the tubular label L is shot directly below while being rotated in the circumferential direction.

By decreasing the roller surface angle θ, the ratio of the horizontal component to the vertical component in the rotational torque of the shot rollers 50 becomes smaller, so that the downward advancing force for the tubular label L can be increased while reducing the circumferential rotational force. In contrast, by increasing the roller surface angle θ, the ratio of the horizontal component to the vertical component in the rotational torque of the shot rollers 50 becomes larger, so that the circumferential rotational force for the tubular label L can be increased while reducing the downward advancing force.

When the circumferential speed of the shot roller 50 is denoted by $V_S$[mm/second], the tubular label L receives, from the shot roller 50, a rotational force of (circumferential speed $V_S$)·sin θ[mm/second] and an advancing force of (speed $V_S$)·cos θ[mm/second]. When the tubular label L is imparted with a moderate amount of rotation in the circumferential direction, it is possible to suppress frictional force against the bottle B in the advancing direction when fitting the label around the bottle B. For this reason, in order to enable adjustment of the balance between the delivery force (vertical component of the rotational torque of the shot roller 50) and the circumferential rotational force (horizontal component of the rotational torque of the shot roller 50) to be applied to a label L opened into tubular form, the present embodiment is configured such that the roller surface angle θ of the shot rollers 50 can be adjusted within the predetermined angular range (60 degrees) as described above.

Figure 25:
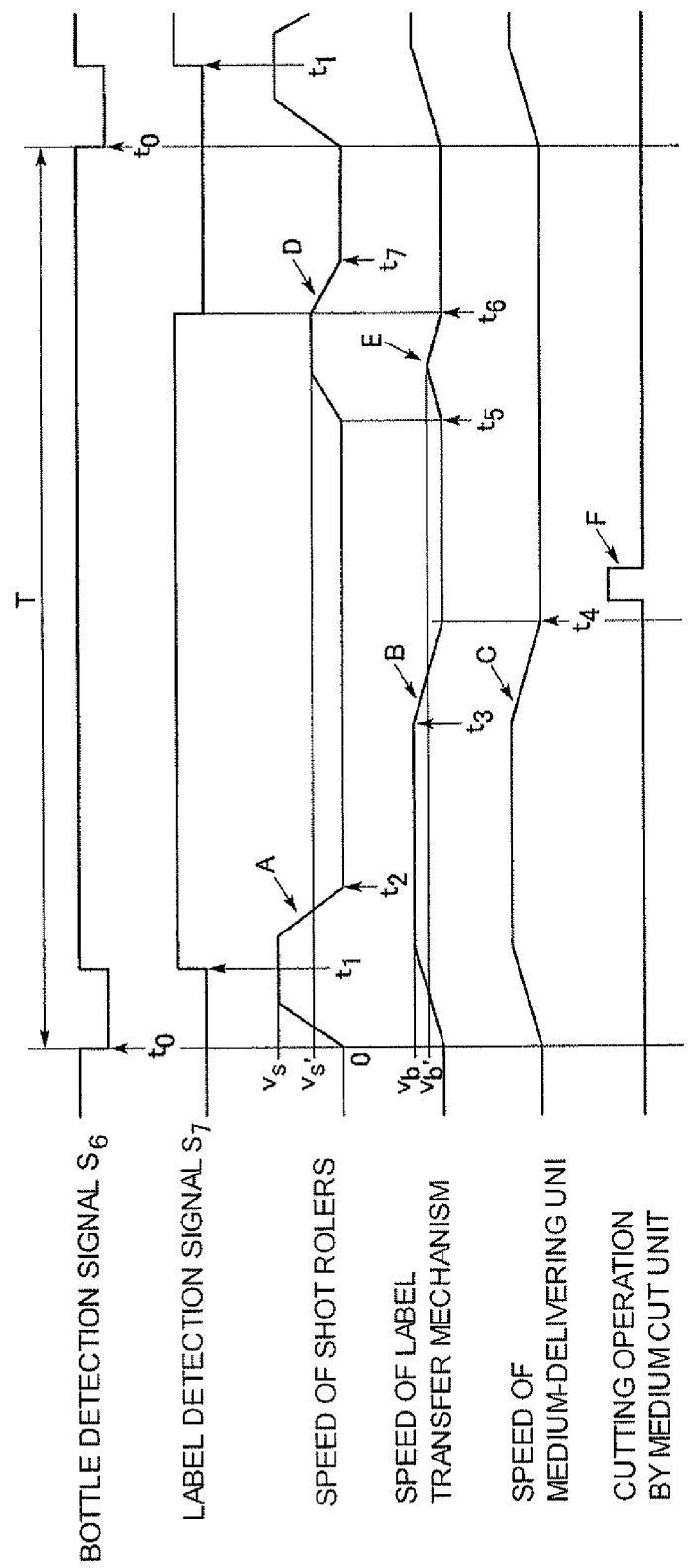
FIG. 25 is a timing chart showing the relationships among detection signals from the bottle detection sensor and the label detection sensor, control of speeds of the shot rollers, the label transfer mechanism, and the medium-delivering unit, and drive control of the medium cut unit in a label-fitting device according to a fourth embodiment of the present invention.

Next, a basic sequence of label-fitting operation of the label-fitting device is described by reference to FIGS. 25 and 26. FIG. 25 is a timing chart showing the relationships among output signals $S_6$, $S_7$ from the bottle detection sensor 62 and the label detection sensor 60, control of speeds of the shot rollers 50, the label transfer mechanism 40, and the medium-delivering unit 10, and drive control of the medium cut unit 30.

Figure 26:
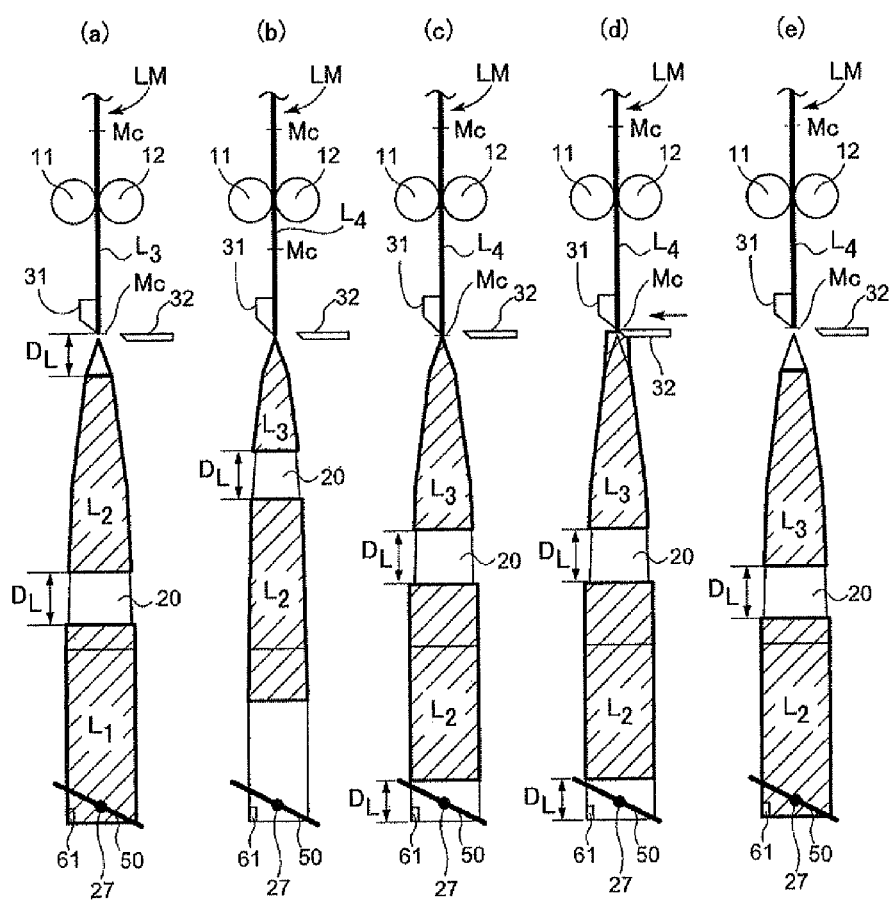
FIG. 26 is a diagram illustrating changes in positions of labels from generation to delivery in the above-noted label-fitting device.

At a point immediately before a bottle B transported by the bottle transport device 2 to the label-fitting position α is detected by the bottle detection sensor 62 (i.e., immediately before time $t_0$ in FIG. 25), two labels $L_1$, $L_2$ (the subscripts denote the order of sequence of the labels L in FIG. 26) are at a standstill while being arranged around the mandrel 20 in the positional relationship shown at (a) in FIG. 26. The stopped position of the first label $L_1$ is such that its lower end substantially aligns with the lower end of the label-shaping part 25. The position of the second label $L_2$ is such that its lower end is spaced toward the above from the upper end of the first label $L_1$ by a predetermined interval $D_L$ (hereinafter referred to as "label interval $D_L$").

Further, the label-forming medium LM is at a standstill in a state after the first cut point $M_C$ is cut by the medium cut unit 30 (see (a) in FIG. 26). The distance from the upper end of the label $L_2$ arranged around the label-opening part 21 of the mandrel 20 to the medium cut position is substantially equal to the label interval $D_L$. As such, the next label $L_3$ is waiting in line while being spaced toward the above from the label $L_2$ by the label interval $D_L$ and still being connected to the label-forming medium LM.

As the reflection mirror 61 on the label-shaping part 25 is shielded by the label $L_1$, the output signal $S_7$ from the label detection sensor 60 is at LOW level (see the waveform of $S_7$ in FIG. 25). The label $L_1$ is at a standstill with only its tip part being held between the shot roller pair 50 and the ball roller pair 27. The $L_2$ is at a standstill with its left and right side surfaces being held between the feed belt pair 46 and the left and right side surfaces of the label-opening part 21.

At time to, when the output signal $S_6$ from the bottle detection sensor 62 becomes inverted from HIGH level to LOW level indicating detection of the fact that a bottle B reached a bottle detecting position provided immediately upstream of the label-fitting position α, intermittent operations of the shot rollers 50, the label transfer mechanism 40, and the medium-delivering unit 10 are started simultaneously.

Speed control A of the shot rollers 50 shown in FIG. 25 is a control for delivering the label $L_1$ to the bottle B passing the label-fitting position α (i.e., for fitting the label $L_1$ around the bottle B). After the shot rollers 50 are quickly accelerated to a predetermined circumferential speed $V_S$ by the shot roller motors 51, at that circumferential speed $V_S$, the shot rollers 50 deliver the label $L_1$ downward while rotating the label $L_1$. Further, after the upper end of the label $L_1$ is disengaged from the nips between the shot rollers 50 and the ball rollers 27, deceleration is started at a predetermined time $t_1$, and the shot rollers 50 are stopped at time $t_2$. At time $t_1$, as the shielding of the reflection mirror 61 by the label $L_1$ is terminated, the output signal $S_7$ from the label detection sensor 60 becomes inverted to HIGH level (see the level change in $S_7$ at $t_1$ in FIG. 25).

Speed control B of the label transfer mechanism 40 shown in FIG. 25 is a control for transferring the next label $L_3$ waiting in line on the label-opening part 21 of the mandrel 20 to the label-shaping part 25. Further, speed control C of the medium-delivering unit 10 is a control for delivering the label-forming medium LM to the label-opening part 21 of the mandrel 20. In other words, the speed controls B and C are controls for transferring or delivering the label $L_2$ and the label $L_3$ at the leading part of the label-forming medium LM to their respective positions shown at (b) in FIG. 26.

In order to deliver the label-forming medium LM to the label-opening part 21 of the mandrel 20 while maintaining the label interval $D_L$ with respect to the label $L_2$, the controls of the label transfer mechanism 40 and the medium-delivering unit 10 are performed in synchronization with each other. In addition, identical speed profiles are set for the speed controls B, C for controlling the moving speed of the feed belts 46 of the label transfer mechanism 40 (i.e., the label L transfer speed) and the circumferential speed of the drive roller 11 of the medium-delivering unit 10 (i.e., the delivery speed of the label-forming medium LM). Further, in order to prevent the label $L_2$ from interfering with the label $L_1$ after starting the transfer operation, the moving speed $V_b$ in the speed controls B, C (the maximum speed in the speed profile, or a speed during a constant-speed operation) is set to a speed lower than the delivery speed $V_S$ of the shot rollers 50 in the speed control A (the maximum speed in the speed profile, or a speed during a constant-speed operation).

The feed belts 46 of the label transfer mechanism 40 are accelerated to the predetermined moving speed $V_b$ by the drive pulleys 41, and, at that moving speed $V_b$, the feed belts 46 transfer the label $L_2$ downward. Subsequently, after the upper end of the label $L_2$ is disengaged from the nips between the drive pulleys 41 and the rollers 24, deceleration is started at a predetermined time $t_3$, and the feed belts 46 are stopped at time $t_4$. The drive roller 11 of the medium-delivering unit 10 is accelerated to the predetermined moving speed $V_b$ by a servo motor, and, at that moving speed $V_b$, the drive roller 11 delivers the label-forming medium LM downward. Subsequently, deceleration is started at time $t_3$, and the drive roller 11 is stopped at time $t_4$.

From time $t_0$ to time $t_4$, the label $L_2$ and the label-forming medium LM are transferred or delivered downward while maintaining the label interval $D_L$. When the label-forming medium LM is delivered downward and its tip collides with the wedge portion of the mandrel 20, the lower end of the label-forming medium LM is pushed open by the wedge portion, and the tip part of the label-forming medium LM is arranged around the label-opening part 21 of the mandrel 20 (see (b) in FIG. 26).

When the delivery of the label-forming medium LM is stopped at time $t_4$, the first cut point $M_C$ of the label-forming medium LM is set at the medium cut position β. In this state, a portion of the label-forming medium LM from its tip to a length of the label length $D_C$ is fed downward from the medium cut position and the tip part is arranged around the label-opening part 21 of the mandrel 20. The stopped position of the label $L_2$ is a position in which the upper end of the label $L_2$ is spaced from the lower end of the label-forming medium LM by the label interval $D_L$. As can be understood by reference to (a) and (c) in FIG. 26, this position is such that the lower end of the label $L_2$ is spaced toward the above from the lower end of the mandrel 20 by substantially the label interval $D_L$.

In this state, the lower end of the label $L_2$ is not held between the shot roller pair 50 and the ball roller pair 27, and the upper end of the label $L_2$ is held between the feed belt pair 46 and the side surfaces of the label-opening part 21 of the mandrel 20. As the reflection mirror 61 on the mandrel 20 is not shielded by the label $L_2$, the level of the output signal $S_7$ from the label detection sensor 60 is maintained at H.

The label $L_2$ and the label-forming medium LM are once stopped in the state shown at (c) in FIG. 26 so that the label-forming medium LM can be cut at the cut point $M_C$. When the label-forming medium LM is stopped at time $t_4$, the movable blade 32 of the medium cut unit 30 reciprocates to carry out the process of cutting the label-forming medium LM (see cutting control F in FIG. 25 and (d) in FIG. 26).

Subsequent to completion of the label medium LM cutting process, at time $t_5$ after elapse of a predetermined time period from time $t_4$, speed control D of the shot rollers 50 and speed control E of the label transfer mechanism 40 are performed. As shown at (e) in FIG. 26, the speed control D of the shot rollers 50 is a control for achieving the state in which the lower end of the label $L_2$ is held between the shot roller pair 50 and the ball roller pair 27. Further, the speed control E of the label transfer mechanism 40 is a control for arranging the label $L_3$, which was cut apart from the label-forming medium LM, around the label-opening part 21 of the mandrel 20 while maintaining the label interval $D_L$ with respect to the label $L_2$.

According to the speed control E, at time $t_5$, transfer operation by the feed belts 46 is started, and, when the upper end of the label $L_2$ becomes disengaged from the feed belts 46 during acceleration of the moving speed, deceleration is started. Meanwhile, according to the speed control D, drive of the shot rollers 50 is started at time $t_5$, and, when the lower end of the label $L_2$ transferred from the feed belts 46 becomes engaged between the shot rollers 50 and the ball rollers 27 during acceleration of the delivery speed of the shot rollers 50, the shot rollers 50 are accelerated to a predetermined circumferential speed $V_S'$ while rotating the label $L_2$, and then the label is moved downward at the circumferential speed $V_S'$. Subsequently, deceleration is started at time $t_6$ at which the output signal $S_7$ from the label detection sensor 60 becomes inverted from HIGH level to LOW level, and the label $L_2$ is stopped at time $t_7$.

As can be understood from (e) and (a) in FIG. 26, the state in (e) of FIG. 26 is achieved by moving the labels $L_2$, $L_3$, $L_4$ to the stopped positions of the labels $L_1$, $L_2$, $L_3$ in (a) of FIG. 26. The moving speed $V_S'$ in the speed control D is approximately ½ of the delivery speed $V_S$ in the speed control A. Further, in the case in which the roller surface angle $\theta$ of the shot rollers 50 is set to 60 degrees, the transfer speed $V_b'$ in the speed control E (the peak speed in the speed profile) is set to approximately ½ of the moving speed $V_S'$.

In the case in which $\theta$ equals 60 degrees, as the speed of downward delivery $V_n$ of a label L by the shot rollers 50 is defined as $V_n = V_S' \cdot \cos(60°) = V_S'/2$, by setting $V_b'$ to $V_S'/2$, the speed of downward transfer $V_b'$ of the label $L_3$ by the label transfer mechanism 40 is set substantially equal to the speed of downward delivery $V_n$ of the label $L_3$ by the shot rollers 50. As a result, the positions of the labels $L_2$, $L_3$ around the mandrel 20 are moved from the state in (d) of FIG. 26 to the state in (e) of FIG. 26 while maintaining the label interval $D_L$.

As the state in (e) of FIG. 26 is identical to the initial state in (a) of FIG. 26, when the next bottle B is detected by the bottle detection sensor 62, the above-described sequence from time $t_0$ to time $t_7$ for carrying out the speed controls of the shot rollers 50, the label transfer mechanism 40, and the medium-delivering unit 10 and the cutting control of the medium cut unit 30 is repeated. When the speed of bottle B transport by the bottle transport device 2 is given by $V_B$[mm/second], the cycle $T_B$ at which the bottles B are transported to the label-fitting position α is defined as $T_B = D_B/V_B$[second], so that the above-described label-fitting sequence is repeated at the cycle of $D_B/V_B$.

Every time each of the large number of bottles B transported at the bottle interval $D_B$ by the bottle transport device 2 passes the label-fitting position α, each bottle B is subjected to the label L fitting process performed by the shot rollers 50 of the label-fitting device 1. Although the diameter $R_L$ of the label L opened into tubular form by the label-shaping part 25 of the mandrel 20 is larger than the diameter $R_B$ of the largest cross-section of the bottle B, the difference $\Delta R = R_L - R_B$ is very small. Accordingly, after the label L delivered by the shot rollers 50 is fitted around a bottle B when the bottle B passes the label-fitting position α, the label L may advance (move downward) while contacting the trunk of the bottle B, and stop at an arbitrary height on the bottle B.

Figure 27:
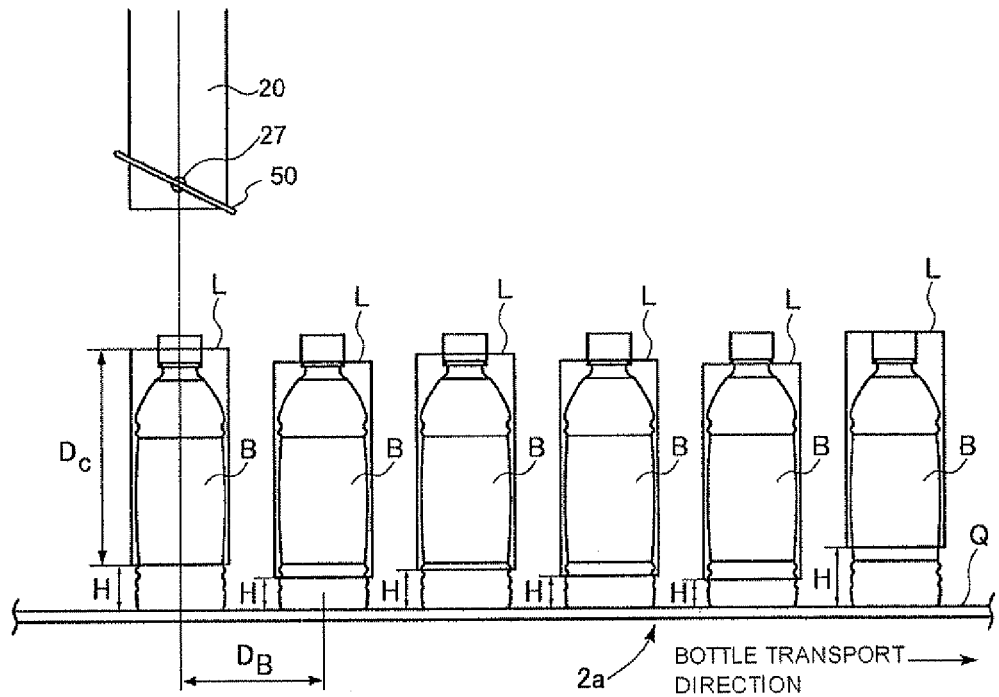
FIG. 27 is a diagram showing a state in which fitted positions of labels are varied.

As shown in FIG. 27, assuming that the label L fitted position on the bottle B is defined as the height H[mm] of the label L lower end from the bottle B bottom surface (the placement surface Q of the conveyor 2a), when the process of delivering a label L in a vertical direction to a bottle B moving in a horizontal direction to thereby fit the label L around the bottle B is repeated, the label L fitted positions H on the respective bottles B become varied because frictional resistance between the bottle B and the label L in each process is not uniform. For this reason, a positioning device (not shown) is provided on the downstream of the label-fitting position α, and the label L fitted positions H on the respective bottles B are adjusted to a predetermined position $H_R$ by the positioning device.

However, the positioning device has a limited adjustable label fitted range (from 0 to $H_{max}$[mm]). A label L fitted on a bottle B at a position H satisfying $H_{max} \leq H$ cannot be adjusted to the predetermined position $H_R$, so that, during a label attachment examination performed after the heat shrinkage process, the bottle B with a label L at such a position would be found as having a label attachment defect and be eliminated.

According to the label-fitting device 1 of the present embodiment, in order to reduce the number of label attachment defects as much as possible, the label-fitted position H on a bottle B is detected every time a bottle B is subjected to a label-fitting process at the label-fitting position α, and, when the detected value H is higher than the upper limit value $H_{max}$, control is performed to change the delivery speed $V_S$ of the shot rollers 50 during the speed control A. The control of the shot roller 50 delivery speed $V_S$ is a characteristic feature of the label-fitting device 1 of the present embodiment.

Figure 28:
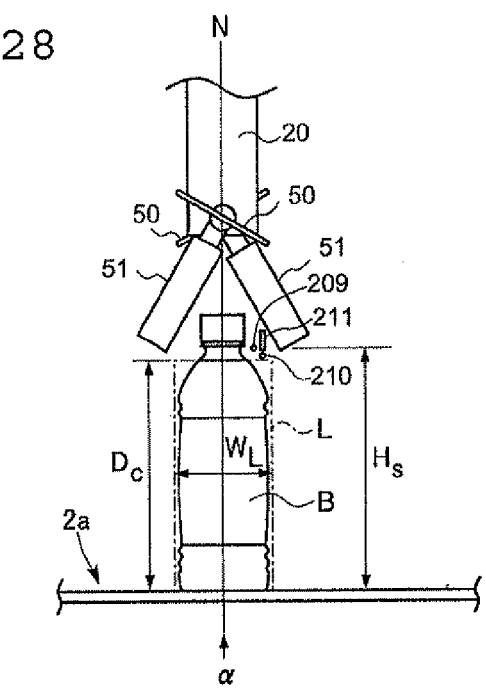
FIG. 28 is a diagram showing installed positions of a label-fitting manner detection sensor, a label-fitting movement detection sensor, and a label-fitted position detection sensor.
Figure 31:
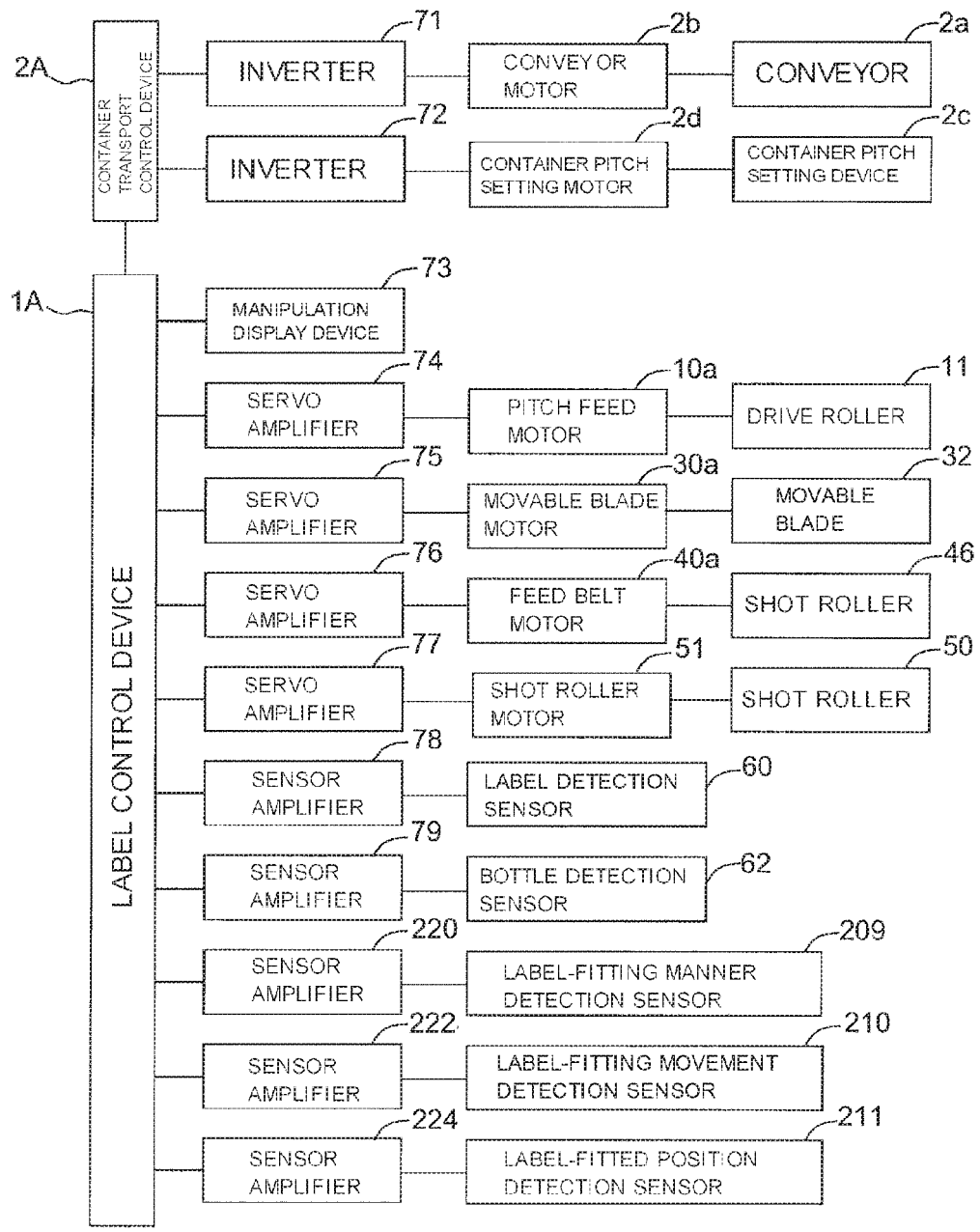
FIG. 31 is a functional block diagram showing a control system of the above-noted label-fitting device.

As shown in FIGS. 28 and 31, a control system for controlling the shot roller 50 delivery speed $V_S$ includes at least two optical sensors 209, 210 and one linear optical sensor 211, and a label control device 1A for carrying out control to increase and decrease the rotational speed of the shot roller motors 51 (i.e., the delivery speed $V_S$ of the shot rollers 50) in accordance with output signals from the optical sensors 209, 210.

There are two manners by which a label L delivered by the shot rollers 50 becomes fitted around the trunk of a bottle B. The first manner (label-fitting manner (E1)) is that the label L is fitted by stopping on the bottle B before reaching the placement surface Q of the conveyor 2a, and the second manner (label-fitting manner (E2)) is that the label L is fitted by first reaching and rebounding against the placement surface Q of the conveyor 2a and then stopping on the bottle B. The optical sensor 209 is a sensor for determining according to which of the label-fitting manners E1 or E2 the label L delivered by the shot rollers 50 was fitted. The optical sensor 211 is a sensor for determining whether or not the label-fitted position H on the bottle B is within a variable range that is adjustable by the positioning device.

According to the label-fitting device 1 of the present embodiment, the label L delivery speed $V_S$ is initially set to a predetermined speed such that the label-fitted position H of the label L fitted around the bottle B falls within the label fitted range (from 0 to $H_{max}$). When a label L is fitted around the bottle B according to the label-fitting manner E1 and its label-fitted position H becomes higher than the upper limit value $H_{max}$ of the label fitted range (i.e., a label fitting defect is generated), it is considered that the label L delivery speed $V_S$ is lower than the appropriate delivery speed. In contrast, when a label L is fitted around the bottle B according to the label-fitting manner E2 and its label-fitted position H becomes higher than the upper limit value of the label fitted range, it is considered that the label L delivery speed $V_S$ is higher than the appropriate delivery speed.

Accordingly, the label control device 1A performs a processing such that, when it is detected based on output signals from the optical sensors 209 and 211 that a label fitting defect is generated via the label-fitting manner E1, the delivery speed $V_S$ of the shot rollers 50 in the speed control A is increased by a preset amount of change $\Delta V$, and, when it is detected that a label fitting defect is generated via the label-fitting manner E2, the same delivery speed $V_S$ is decreased by the amount of change $\Delta V$. The amount of change $\Delta V$ of the delivery speed $V_S$ may be set to an arbitrary value, which may be a value corresponding to 10% of the initial set value of the delivery speed $V_S$, for example.

Every time the shot rollers 50 delivers a label L, the label control device 1A repeats the processes of determining the label-fitting manner of each label L based on the optical sensor 209 (hereinafter referred to as "label-fitting manner detection sensor 209"), detecting the label-fitted position H of each label L based on the optical sensor 211 (hereinafter referred to as "label-fitted position detection sensor 211"), and changing the delivery speed $V_S$ of the shot rollers 50 in the speed control A based on the determination result and the detection result. These processes must be performed in synchronization with each fitting movement of a label L around a bottle B.

The optical sensor 210 is a sensor for detecting a fitting movement of a label L delivered by the shot rollers 50 around a bottle B. Based on output signals from the optical sensor 210 (hereinafter referred to as "label-fitting movement detection sensor 210"), the label control device 1A detects movement of each label being fitted around a bottle B, and during this detection, the label control device 1A performs the processes of determining the label-fitting manner of the label L and detecting the label-fitted position H on the bottle B. Based on the results of these processes, the label control device 1A performs the process of changing the delivery speed $V_S$ of the shot rollers 50 in the speed control A.

The label-fitting manner detection sensor 209 comprises a reflective photo-interrupter, similarly to the label detection sensor 60. As shown in FIG. 28, the label-fitting manner detection sensor 209 is provided at a position on a line shifted from the vertical line N to the right by a predetermined distance and at a predetermined height $H_S$ from the placement surface Q of the conveyor 2a. The predetermined distance is shorter than a half of the label L width $W_L$, and the predetermined height $H_S$ is substantially the same as the upper limit value $H_{max}$ of the label fitted range. While a reflection mirror for reflecting light emitted from the label-fitting manner detection sensor 209 is provided in front of the label-fitting manner detection sensor 209, this is not shown in FIG. 28.

The label-fitted position detection sensor 211 comprises an optical sensor constituted by arranging a plurality of reflective photo-interrupters in one line. The label-fitted position detection sensor 211 is installed in vertical orientation at a predetermined position further outward from the vertical line N as compared to the label-fitting manner detection sensor 209. The distance of the installation position of the label-fitted position detection sensor 211 from the vertical line N is also shorter than a half of the label L width $W_L$. The height of the position of the label-fitted position detection sensor 211 is such that its lowermost photo-interrupter in the vertical orientation is located at substantially the same height as the label-fitting manner detection sensor 209. Further, while a reflection mirror for reflecting light emitted from the label-fitted position detection sensor 211 is similarly provided in front of the label-fitted position detection sensor 211, this is not shown in FIG. 28.

The label-fitting movement detection sensor 210 comprises a reflective photo-interrupter identical to the label-fitting manner detection sensor 209. The label-fitting movement detection sensor 210 is installed adjacent to and below the label-fitted position detection sensor 211. While a reflection mirror for reflecting light emitted from the label-fitting movement detection sensor 210 is similarly provided in front of the label-fitting movement detection sensor 210, this is not shown in FIG. 28.

Figure 29:
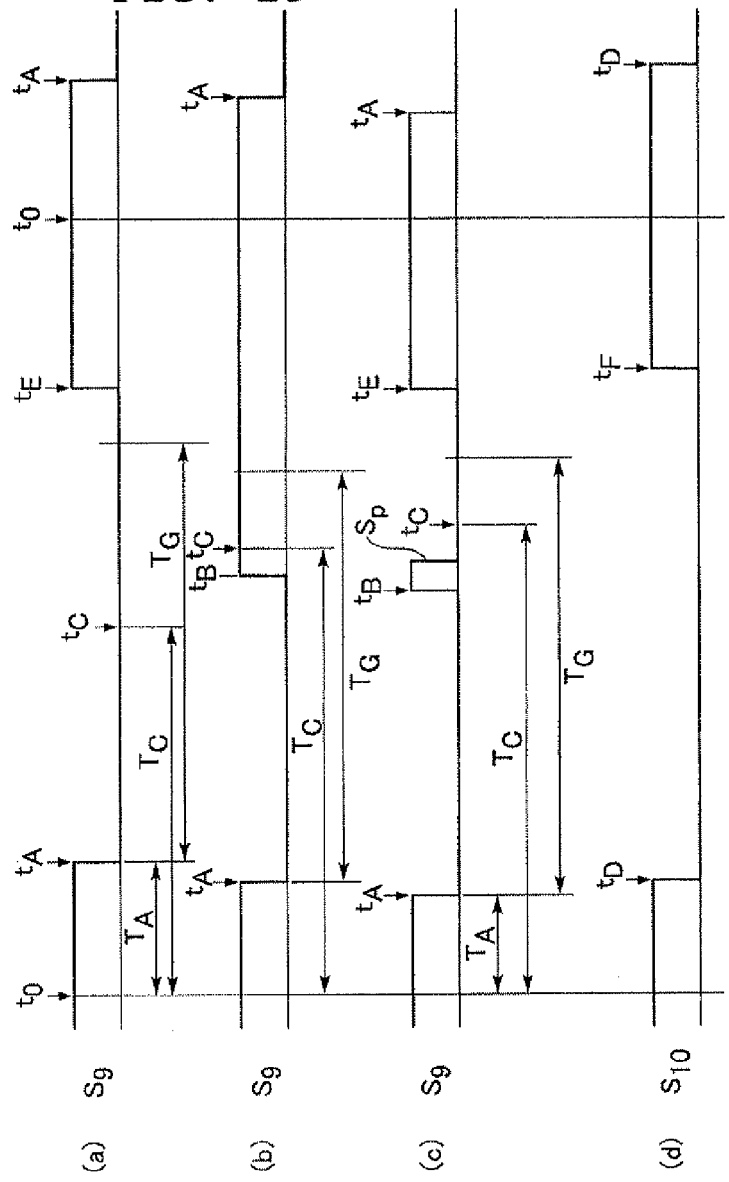
FIG. 29 is a diagram showing example waveforms of output signals obtained from the label-fitting manner detection sensor and the label-fitting movement detection sensor when a label delivered by the shot rollers is being fitted around a bottle.

FIG. 29 is a diagram showing example waveforms of output signals obtained from the label-fitting manner detection sensor 209 and the label-fitting movement detection sensor 210 when a label L delivered by the shot rollers 50 is being fitted around a bottle B.

(a) in FIG. 29 shows a waveform of output signal $S_9$ obtained from the label-fitting manner detection sensor 209 when a label L is fitted around a bottle B according to the label-fitting manner E2 and results in a "label fitting defect" (satisfying $H \geq H_{max}$). (b) in FIG. 29 shows a waveform of the output signal $S_9$ obtained from the label-fitting manner detection sensor 209 when a label L is fitted around a bottle B according to either of the label-fitting manners E1 and E2 and results in "correct label fitting" (satisfying $H < H_{max}$). (c) in FIG. 29 shows a waveform of the output signal $S_9$ obtained from the label-fitting manner detection sensor 209 when a label L is fitted around a bottle B according to the label-fitting manner E1 and results in a "label fitting defect" (satisfying $H \geq H_{max}$). Further, (d) in FIG. 29 shows a waveform of corresponding output signal $S_{10}$ obtained from the label-fitting movement detection sensor 210 in the case of (c) in FIG. 29, Timings in FIG. 29 are explained below by reference to the example shown in FIG. 26. In (a) through (c) of FIG. 29, time $t_0$ is the time at which drive of the shot rollers 50 is started (i.e., delivery of the label $L_1$ is started). Time $t_C$ is the time at which the delivered label $L_1$ stops. Since the drive of the shot rollers 50 is started when a bottle B is detected according to the output $S_6$ from the bottle detection sensor 62 (see time $t_0$ in FIG. 25), time $t_0$ occurs at the same cycle as the bottle B detection cycle $T_B = D_B/V_B$ of the bottle detection sensor 62.

Time $t_A$ is the time at which the lower end of the delivered label $L_1$ starts shielding light of the label-fitting manner detection sensor 209. At this time $t_A$, the output signal $S_9$ of the label-fitting manner detection sensor 209 becomes inverted from HIGH level to LOW level. Time $t_B$ is the time at which the upper end of the delivered label $L_1$ passes the label-fitting manner detection sensor 209 and terminates the shielding of light of the label-fitting manner detection sensor 209. At this time $t_B$, the output signal $S_9$ of the label-fitting manner detection sensor 209 becomes inverted from LOW level to HIGH level.

In the case of (b) in FIG. 29, as the upper end of the delivered label $L_1$ stops at a position H satisfying $H < H_{max}$ after passing the label-fitting manner detection sensor 209, the state in which light of the label-fitting manner detection sensor 209 is unshielded continues until next time $t_0$. Accordingly, the output signal $S_9$ remains at HIGH level during the period from time $t_B$ to next time $t_0$.

In the case of (c) in FIG. 29, as the label $L_1$ that reaches the placement surface Q of the conveyor 2a rebounds therefrom and the upper end of the label $L_1$ again shields light of the label-fitting manner detection sensor 209 immediately following time $t_B$, a pulse-like signal $S_P$ is output between time $t_A$ and time $t_C$. In contrast, in either of the cases (a) and (b) of FIG. 29, no pulse-like signal Sp is output between time $t_A$ and time $t_0$ because, in the case of (a), the upper end of the delivered label $L_1$ never passes the label-fitting manner detection sensor 209, and, in the case of (b), the upper end of the delivered label $L_1$ stops at a position H satisfying $H < H_{max}$ after passing the label-fitting manner detection sensor 209 and rebounding from the placement surface Q of the conveyor 2a.

Time $t_E$ is the time at which the shielding of light emitted from the label-fitting manner detection sensor 209 is terminated by the horizontal movement of the bottle B effected by the bottle transport device 2. At this time $t_E$, the output signal $S_9$ of the label-fitting manner detection sensor 209 becomes inverted from LOW level to HIGH level. After time $t_E$, HIGH level of the output signal $S_9$ is maintained until the next label $L_2$ is delivered and the lower end of that label $L_2$ starts shielding light of the label-fitting manner detection sensor 209 (i.e., until next time $t_A$).

In FIG. 29, time $t_0$ is the time at which the lower end of the delivered label $L_1$ starts shielding light of the label-fitting movement detection sensor 210. At this time $t_D$, the output signal $S_{10}$ becomes inverted from HIGH level to LOW level. Time $t_F$ is the time at which the shielding of light emitted from the label-fitting movement detection sensor 210 is terminated by the horizontal movement of the bottle B effected by the bottle transport device 2. At this time $t_E$, the output signal $S_{10}$ becomes inverted from LOW level to HIGH level. After time $t_E$, the HIGH level of the output signal $S_{10}$ is maintained until the next label $L_2$ is delivered and the lower end of that label $L_2$ starts shielding light of the label-fitting movement detection sensor 210 (i.e., until next time $t_0$). As the label-fitting movement detection sensor 210 is located at a position slightly lower than the label-fitting manner detection sensor 209, times $t_D$, $t_E$ are delayed from times $t_A$, $t_E$ by a very small amount of time.

When the output signal $S_9$ becomes inverted from HIGH level to LOW level at time $t_A$, the label control device 1A monitors the level of the output signal $S_9$ for a predetermined period of time $T_G$. When the LOW level continues over more than the predetermined period of time $T_G$ (in the case of (a) in FIG. 29), the delivery speed $V_S$ of the label $L_1$ is lower than an appropriate speed range from $V_AL$ to $V_AH$ (a range of speed that enables to control the label-fitted position $H_1$ of the label $L_1$ on the bottle B to within the label fitted range (from 0 to $H_{max}$) for the positioning device). When the pulse-like signal $S_P$ is output before elapse of the predetermined period of time $T_0$ (in the case of (c) in FIG. 29), the delivery speed $V_S$ of the label $L_1$ is higher than the appropriate speed range.

When the label L delivery speed $V_S$ is lower or higher than the appropriate speed range, the label control device 1A detects the label-fitted position $H_1$ of the label $L_1$ using the label-fitted position detection sensor 211, and, according to the detected result, performs control for increasing or decreasing the label L delivery speed $V_S$ in two speed levels.

Figure 30:
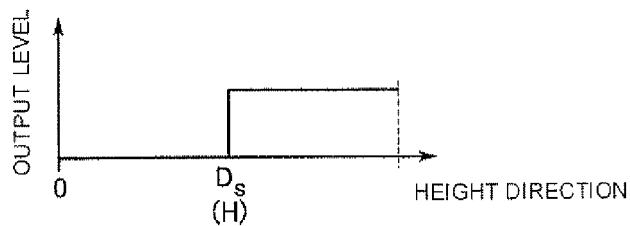
FIG. 30 is a diagram showing an example waveform of an output signal obtained from the label-fitted position detection sensor when a label is fitted around a bottle.

FIG. 30 is a diagram showing an example waveform of an output signal obtained from the label-fitted position detection sensor 211 when a label L is fitted around a bottle B.

In FIG. 30, on the horizontal axis, the direction of arrangement of the plurality of photo-interrupters is given, with "0" indicating the lowermost photo-interrupter in the label-fitted position detection sensor 211. On the vertical axis, output levels of the respective photo-interrupters are given. FIG. 30 illustrates an example in which the upper end of the label $L_1$ stopped at the position having height $H_1$ from the placement surface of the conveyor 2a.

In the example of FIG. 30, as the photo-interrupters of the label-fitted position detection sensor 211 located in a portion over length $D_S$[mm] from its bottom end are shielded by the label $L_1$, output levels in that portion are at LOW level. When all of the output levels from the label-fitted position detection sensor 211 are at HIGH level, the fitted position of the label $L_1$ is such that the lower end of the label L is substantially aligned with the placement surface Q of the conveyor 2a (i.e., H=0), as shown in FIG. 28. As such, length $D_S$[mm] of the portion in which the output levels from the label-fitted position detection sensor 211 are at LOW level corresponds to the height H of the lower end of the label L from the placement surface Q of the conveyor 2a.

By means of the photo-interrupters of the label-fitted position detection sensor 211 that provide output signals $S_{11}$ having LOW level, the label control device 1A detects the label-fitted position $H_1$ of the label $L_1$.

Assuming that the label $L_1$ is delivered according to the label-fitting manner E1 or E2, the label-fitted position $H_1$ becomes higher as speed difference $\Delta V_S$ of the delivery speed $V_S$ with respect to the appropriate delivery speed $V_SC$ increases ($\Delta V_S = |V_SC - V_S|$). Accordingly, when the detected value of label-fitted position $H_1$ is larger, it is necessary to further increase the amount of change $\Delta V$ of the delivery speed $V_S$ so as to enable prompt correction to the appropriate delivery speed $V_SC$.

In the label control device 1A, a threshold value $H_{TH}$[mm] is set for evaluating the speed difference $\Delta V_S$ of the delivery speed $V_S$ into two levels based on the label-fitted position $H_1$. With respect to the result of evaluation of the speed difference $\Delta V_S$ based on the threshold value $H_{TH}$, two different amounts of change $\Delta V_1$, $\Delta V_2$ ($\Delta V_2 > \Delta V_1$) are set for correcting the delivery speed $V_S$. Upon detecting the label-fitted position $H_1$ of the label $L_1$, the label control device 1A compares the detected value with the threshold value $H_{TH}$. When $H_1 < H_{TH}$, the label control device 1A changes the delivery speed $V_S$ of the shot rollers 50 by the first amount of change $\Delta V_1$, and, when $H_{TH} \leq H_1$, the label control device 1A changes the delivery speed $V_S$ of the shot rollers 50 by the second amount of change $\Delta V_2$.

In other words, in cases in which the label $L_1$ is delivered according to the label-fitting manner E1, when the detected value of label-fitted position $H_1$ satisfies $H_1 < H_{TH}$, the label control device 1A increases the delivery speed $V_S$ of the shot rollers 50 to $(V_S + \Delta V_1)$, and, when $H_{TH} \leq H_1$, the label control device 1A increases the delivery speed $V_S$ to $(V_S + \Delta V_2)$. Further, in cases in which the label $L_1$ is delivered according to the label-fitting manner E2, when the detected value of label-fitted position $H_1$ satisfies $H_1 < H_{TH}$, the label control device 1A decreases the delivery speed $V_S$ of the shot rollers 50 to $(V_S - \Delta V_1)$, and, when $H_{TH} \leq H_1$, the label control device 1A increases the delivery speed $V_S$ to $(V_S - \Delta V_2)$. The label control device 1A also performs speed control for the labels $L_2$, $L_3$, and so on in the same manner, so that the delivery speed $V_S$ of the shot rollers 50 in the speed control A is automatically adjusted to the appropriate delivery speed $V_SC$.

Next, an electrical configuration of the label-fitting device 1 is described by reference to the block diagram shown in FIG. 31. In FIG. 31, elements identical to those shown in other drawings are labeled with the same reference numerals. As those elements are already explained above, to avoid redundant explanation, only supplementary descriptions are given in below regarding those elements.

The label control device 1A is a control unit for controlling the label L feeding and fitting operations in the label-fitting device 1. The container transport control device 2A is a control unit for controlling the bottle B transport operations in the label-fitting device 1. The label control device 1A and the container transport control device 2A are each constituted with a microcomputer including a CPU (central processing unit), ROM (read-only memory), and RAM (random access memory). The label control device 1A and the container transport control device 2A are connected to each other, and it is configured such that data, control signals, and the like related to the bottle transport operations and the label-fitting operations are transmitted and received reciprocally between the two control devices 1A, 2A.

The container pitch setting device 2c is a member for providing each bottle interval $D_B$ between the large number of bottles B placed and transported on the conveyor 2a. The container pitch setting device 2c is a member produced by helically forming recessed grooves at the interval $D_B$ on a side surface of a cylindrical rod member. The conveyor motor 2b is a motor for applying rotational force to the conveyor 2a, and the container pitch setting motor 2d is a motor for applying rotational force to the container pitch setting device 2c. As the conveyor motor 2b and the container pitch setting motor 2d, induction motors are employed. The inverter 71 is a power source for supplying AC power to the conveyor motor 2b, while the inverter 72 is a power source for supplying AC power to the container pitch setting motor 2d. The conveyor 2a, container pitch setting device 2c, conveyor motor 2b, container pitch setting motor 2d, and inverters 71, 72 are constituent elements of the bottle transport device 2.

The inverters 71, 72 are connected to the container transport control device 2A that controls the bottle B transport operations in the label-fitting device 1. Based on a bottle transport control program stored in a ROM, the container transport control device 2A controls AC power supplied via the inverters 71, 72 to the conveyor motor 2b and the container pitch setting motor 2d, and thereby controls start/stop of drive and rotational speeds during the drive of the conveyor 2a and the container pitch setting device 2c. The container transport control device 2A performs control such that the bottle B transport speed of the conveyor 2a and the bottle B transport speed of the container pitch setting device 2c become equal. The rotational speeds of the conveyor motor 2b and the container pitch setting motor 2d are changeable. By changing the rotational speeds of the two motors 2b, 2d in a coordinated manner, the container transport control device 2A changes the bottle B transport speed of the bottle transport device 2.

The pitch feed motor 10a is a motor for applying rotational force to the drive roller 11, and the movable blade motor 30a is a motor for applying drive force to the movable blade 32. Further, the feed belt motor 40a is a motor for applying moving force to the feed belt 46, while the shot roller motor 51 is a motor for applying rotational force to the shot roller 50. The shot roller motor 51 corresponds to the above-described motor 51. Servo motors are employed as the pitch feed motor 10a, movable blade motor 30a, feed belt motor 40a, and shot roller motor 51. The four servo amplifiers 74-77 are controllers for controlling drive of the pitch feed motor 10a, movable blade motor 30a, feed belt motor 40a, and shot roller motor 51, respectively.

The pitch feed motor 10a, movable blade motor 30a, feed belt motor 40a, and shot roller motor 51 perform rotational operations in accordance with drive signals output from the servo amplifiers 74, 75, 76, 77, respectively. The four servo amplifiers 74-77 are connected to the label control device 1A. Based on a label feed control program stored in a ROM, the label control device 1A controls respective drive signals output from the servo amplifiers 74-77, and thereby controls start/stop of drive and rotational speeds during the drive of the pitch feed motor 10a, movable blade motor 30a, feed belt motor 40a, and shot roller motor 51.

Five sensor amplifiers 79, 78, 220, 222, 224 are amplifiers for amplifying levels of the output signals $S_6$, $S_7$, $S_9$, $S_{10}$, $S_{11}$ from the bottle detection sensor 62, label detection sensor 60, label-fitting manner detection sensor 209, label-fitting movement detection sensor 210, and label-fitted position detection sensor 211 to predetermined levels. The five sensor amplifiers 79, 78, 220, 222, 224 are connected to the label control device 1A. The output signals $S_6$, $S_7$, $S_9$, $S_{10}$, $S_{11}$ from the bottle detection sensor 62, label detection sensor 60, label-fitting manner detection sensor 209, label-fitting movement detection sensor 210, and label-fitted position detection sensor 211 are amplified to predetermined levels by the sensor amplifiers 79, 78, 220, 222, 224, respectively, and subsequently input into the label control device 1A.

Based on the output signal $S_6$ input from the sensor amplifier 79, the label control device 1A detects that a bottle B is transported to immediately upstream of the label-fitting position α. Based on the output signal $S_7$ input from the sensor amplifier 78, the label control device 1A detects that a label L is set around the label-shaping part 25 of the mandrel 20. Further, the label control device 1A determines the fitting manner of the label L delivered by the shot rollers 50 based on the output signal $S_9$ input from the sensor amplifier 220, detects the label L fitting movement based on the output signal $S_{10}$ input from the sensor amplifier 222, and detects the label L fitted position H on the bottle B based on the output signal $S_{11}$ input from the sensor amplifier 224.

The manipulation display device 73 is a device that combines an input device, via which a user sets data necessary for the label control device 1A and the container transport device 2A to carry out the bottle feed control and the label-fitting control, with a display device which displays data indicating the state of label-fitting processing during operation and data set by the user. A user sets, via the manipulation display device 73, data such as production capacity (number of label-fitting processes per minute) of the label-fitting device 1, the initial values of the speeds $V_S$, $V_S'$, $V_b$, $V_b'$ for the speed controls A, B, C, D, the threshold value $H_{TH}$, and the amounts of change $\Delta V_1$, $\Delta V_2$ of the delivery speed $V_S$. Further, the user can cause the manipulation display device 73 to display the state of change of the delivery speed $V_S$ during operation.

Next, processing steps for speed control of the shot rollers 50 performed by the label control device 1A are described by reference to the flowcharts shown in FIGS. 32 and 33.

Figure 32:
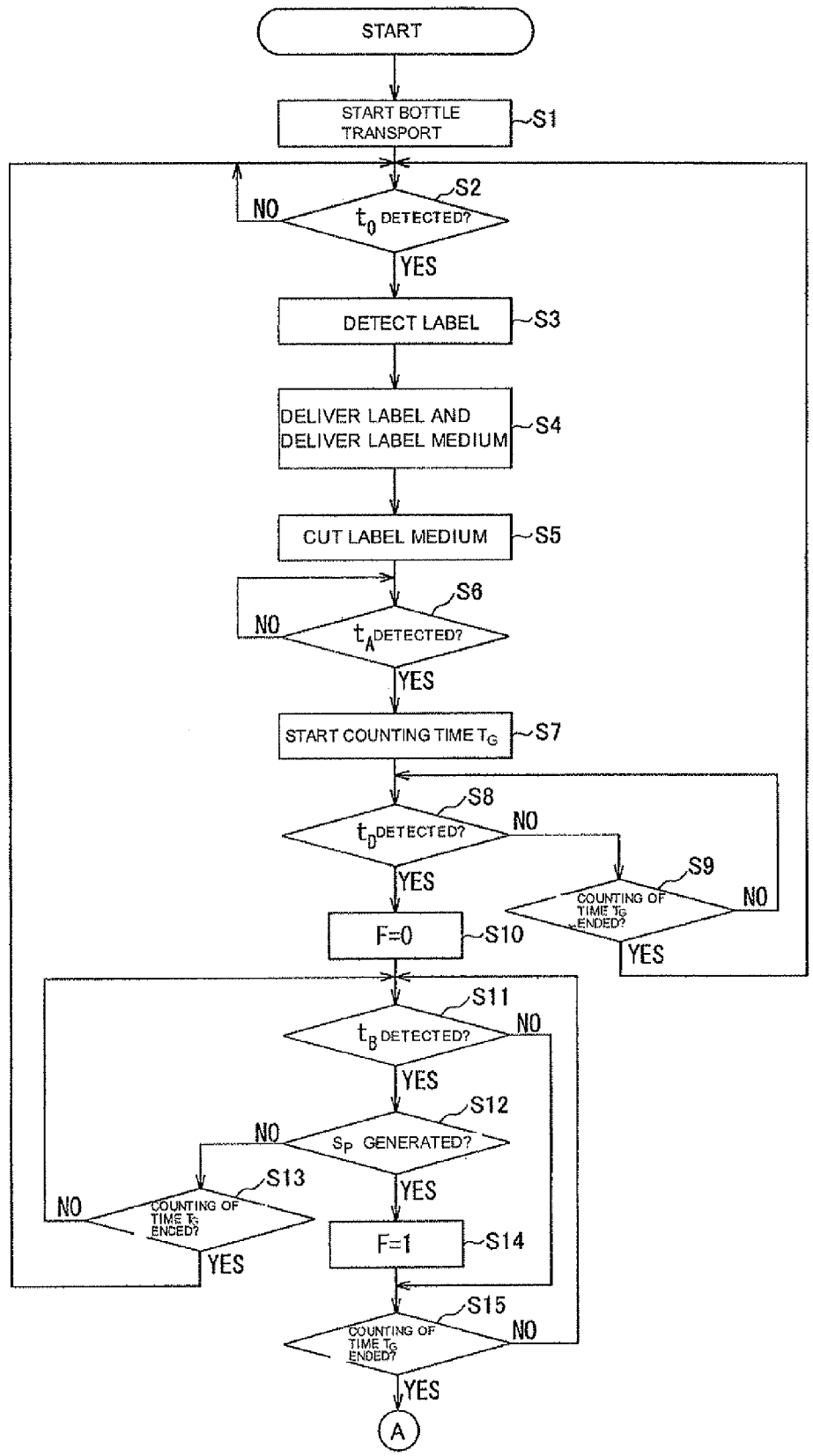
FIG. 32 is a flowchart showing steps (step S1-S15) of a shot roller speed control procedure performed by a control device.
Figure 33:
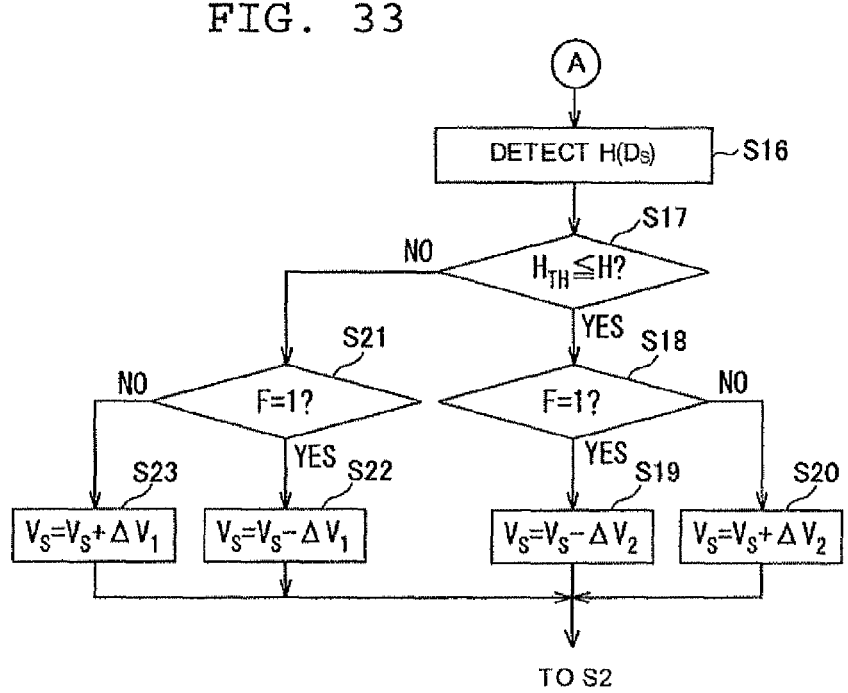
FIG. 33 is a flowchart showing steps (step S16-S23) of the shot roller speed control procedure performed by the control device.

The flowcharts of FIGS. 32 and 33 show processing steps performed when a full operation of the label-fitting device 1 is started after preparations for transporting bottles B and feeding labels are completed by carrying out a test operation. At the start of a full operation, a large number of bottles B are at a standstill in a state transportable by the bottle transport device 2 to the label-fitting position α at the bottle interval $D_B$, and a label L is at a standstill while being set around the label-shaping part 25 of the mandrel 20. Further, initial values of the speeds $V_S$, $V_S'$, $V_b$, $V_b'$ for the speed controls A, B, C, D are set in the label control device 1A.

When a manipulation signal for full operation is received from the manipulation display device 73, the container transport control device 2A outputs a drive control signal to the inverters 71, 72 so as to cause AC power to be output from the inverters 71, 72 to the conveyor motor 2b and the container pitch setting motor 2d, respectively, thereby driving the conveyor 2a and the container pitch setting device 2c at predetermined speeds (S1). As a result, the conveyor 2a transports the large number of bottles B at the predetermined transport speed $V_B$, and the container pitch setting device 2c sets the predetermined bottle interval $D_B$ between the transported large number of bottles B. Accordingly, the large number of bottles B are transported to the label-fitting position α at the cycle $T_B=D_B/V_B$ [second].

When the output signal $S_6$ of the bottle detection sensor 62 received from the sensor amplifier 79 becomes inverted from HIGH level to LOW level (detection of time $t_0$; "YES" in S2), the label control device 1A outputs a drive signal to the shot roller motors 51 via the servo amplifier 77, so as to cause the shot roller motors 51 to rotationally drive the shot rollers 50 according to the speed profile of the speed control A. As a result, the label L set around the label-shaping part 25 of the mandrel 20 is delivered to the label-fitting position α (S3).

Further, when time $t_0$ is detected ("YES" in S2), the label control device 1A outputs a drive signal to the feed belt motor 40a via the servo amplifier 76, so as to cause the feed belt motor 40a to rotationally drive the feed belts 46 according to the speed profile of the speed control B. At the same time, the label control device 1A outputs a drive signal to the pitch feed motor 10a via the servo amplifier 74, so as to cause the pitch feed motor 10a to rotationally drive the drive roller 11 according to the speed profile of the speed control C. As a result, a label L arranged around the label-opening part 21 of the mandrel 20 is transferred to the label-shaping part 25, and the label-forming medium LM is delivered so that its tip is arranged around the label-opening part 21 (S4).

At a predetermined time after completion of the delivery of the label-forming medium LM according to the speed control C, the label control device 1A outputs a drive signal to the movable blade motor 30a via the servo amplifier 75, so as to cause the movable blade motor 30a to reciprocate the movable blade 32. As a result, a label L is cut apart from the tip of the label-forming medium LM (S5).

After the delivery of the label L, when the output signal $S_9$ of the label-fitting manner detection sensor 209 received from the sensor amplifier 220 becomes inverted from HIGH level to LOW level (detection of time $t_A$; "YES" in S6), the label control device 1A starts counting time over the predetermined period of time $T_G$ (S7), and monitors the output signal $S_{10}$ of the label-fitting movement detection sensor 210 received from the sensor amplifier 222 until the counting of the predetermined period of time $T_G$ ends (the loop shown in S8 and S9).

When the counting of the predetermined period of time $T_G$ ends without the output signal $S_{10}$ being inverted from HIGH level to LOW level ("YES" in S9), the label control device 1A determines an error, and the process returns to step S2. On the other hand, when the output signal $S_{10}$ becomes inverted from HIGH level to LOW level before the counting of the predetermined period of time $T_G$ ends (detection of time $t_D$; "YES" in S8), the label control device 1A resets a flag F indicating the label-fitting manner to "0" (S10), and subsequently monitors the output signal $S_9$ of the label-fitting manner detection sensor 209 received from the sensor amplifier 220 until the counting of the predetermined period of time $T_G$ ends (the loop of S11, S12, and S13, or the loop of S11, S12, S14, and S15).

The flag F is an information indicating which of the label-fitting manner E1 or E2 was followed by the delivered label L. In the present embodiment, it is set such that F=0 denotes the label-fitting manner E1 and F=1 denotes the label-fitting manner E2. It is alternatively possible to configure such that F=0 corresponds to the label-fitting manner E2 and F=1 corresponds to the label-fitting manner E1.

In the monitoring process according to the loop of S11 through S13, when the output signal $S_9$ becomes inverted from LOW level to HIGH level before the counting of the period of time $T_G$ ends (detection of time $t_B$; "YES" in S11), and when this HIGH level continues until the end of the period of time $T_G$ ("NO" in S12 and "YES" in S13), the label control device 1A judges that correction of the label L delivery speed $V_S$ is unnecessary, and the process returns to step S2.

Meanwhile, in the monitoring process according to the loop of S11, S12, S14, and S15, when the output signal $S_9$ becomes inverted from LOW level to HIGH level and then immediately back to LOW level before the counting of the period of time $T_G$ ends (detection of the pulse-like signal $S_F$; "YES" in S12), the label control device 1A judges that the label L delivery speed $V_S$ is too high, and also sets the flag F to "1" (S14).

In the monitoring process according to the loop of S11, S12, S14, and S15, after the counting of the period of time $T_G$ ends ("YES" in S15), the process advances to step S16. In S16, the label control device 1A detects the fitted position H (=$D_S$) of the label L based on the output signal $S_{11}$ of the label-fitted position detection sensor 211 received from the sensor amplifier 224, and distinguishes whether or not the detected value H is greater than or equal to the predetermined threshold value $H_{TH}$ (S17).

When $H_{TH} \leq H$ ("YES" in S17), the label control device 1A distinguishes the state of the flag F (S18). When F=1 ("YES" in S18), the label control device 1A decreases the current delivery speed $V_S$ value in the speed control A by the amount of change $\Delta V_2$ (S19), and subsequently the process returns to S2. This processing corresponds to the case in which the label L was delivered according to the label-fitting manner E2 at the delivery speed $V_S$ higher than the appropriate delivery speed $V_S C$, and the height H at which the label L stopped after rebounding from the placement surface Q of the belt conveyor 2a was higher than the threshold value $H_{TH}$. Accordingly, among the two amounts of change $\Delta V_1$, $\Delta V_2$, the decrease in the label L delivery speed $V_S$ is effected by the larger amount of change $\Delta V_2$.

When F=0 in S18 ("NO" in S18), the label control device 1A increases the current delivery speed $V_S$ value in the speed control A by the amount of change $\Delta V_2$ (S20), and subsequently the process returns to S2. This processing corresponds to the case in which the label L was delivered according to the label-fitting manner E1 at the delivery speed $V_S$ lower than the appropriate delivery speed $V_S C$, and the height H at which the label L stopped without reaching the placement surface Q of the belt conveyor 2a was higher than the threshold value $H_{TH}$. Accordingly, the increase in the label L delivery speed $V_S$ is effected by the larger amount of change $\Delta V_2$.

When $H < H_{TH}$ in S17 ("NO" in S17), the label control device 1A distinguishes the state of the flag F (S21). When F=1 ("YES" in S21), the label control device 1A decreases the current delivery speed $V_S$ value in the speed control A by the amount of change $\Delta V_1$ (S22), and subsequently the process returns to S2. This processing corresponds to the case in which the label L was delivered according to the label-fitting manner E2 at the delivery speed $V_S$ higher than the appropriate delivery speed $V_S C$, but the height H at which the label L stopped after rebounding from the placement surface Q of the belt conveyor 2a was lower than the threshold value $H_{TH}$. Accordingly, among the two amounts of change $\Delta V_1$, $\Delta V_2$, the decrease in the label L delivery speed $V_S$ is effected by the smaller amount of change $\Delta V_1$.

When F=0 in S21 ("NO" in S21), the label control device 1A increases the current delivery speed $V_S$ value in the speed control A by the amount of change $\Delta V_1$ (S23), and subsequently the process returns to S2, This processing corresponds to the case in which the label L was delivered according to the label-fitting manner E1 at the delivery speed $V_S$ lower than the appropriate delivery speed $V_S C$, but the height H at which the label L stopped without reaching the placement surface Q of the belt conveyor 2a was lower than the threshold value $H_{TH}$. Accordingly, the increase in the label L delivery speed $V_S$ is effected by the smaller amount of change $\Delta V_1$.

In steps S19 through S23, along with the correction of the delivery speed $V_S$ in the speed control A, the moving speed $V_b$ in the speed control B and the transfer speed $V_S'$ in the speed control D are also corrected to speeds in accordance with the corrected delivery speed $V_S$ value.

According to the speed control of the shot rollers 50 in the label-fitting device 1 of the present embodiment, in cases in which the label-fitted position H of the label L fitted around the bottle B is lower than the threshold value $H_{TH}$, when the label L is delivered according to the label-fitting manner E1 and fitted on the bottle B without rebounding from the placement surface Q of the belt conveyor 2a, the delivery speed $V_S$ of the shot rollers 50 is increased by the smaller amount of change $\Delta V_1$, and, when the label L is delivered according to the label-fitting manner E2 and fitted on the bottle B after rebounding from the placement surface Q of the belt conveyor $2a$, the delivery speed $V_S$ of the shot rollers 50 is decreased by the smaller amount of change $\Delta V_1$. With this arrangement, the delivery speed $V_S$ of the shot rollers 50 can be stabilized to the appropriate delivery speed $V_S C$ as quickly as possible.

Furthermore, in cases in which the label-fitted position H of the label L fitted around the bottle B is higher than the threshold value $H_{TH}$, when the label L is delivered according to the label-fitting manner E1 and fitted on the bottle B without rebounding from the placement surface Q of the belt conveyor $2a$, the delivery speed $V_S$ of the shot rollers 50 is increased by the larger amount of change $\Delta V_2$, and, when the label L is delivered according to the label-fitting manner E2 and fitted on the bottle B after rebounding from the placement surface Q of the belt conveyor $2a$, the delivery speed $V_S$ of the shot rollers 50 is decreased by the larger amount of change $\Delta V_2$. With this arrangement, the delivery speed Vs of the shot rollers 50 can be stabilized to the appropriate delivery speed $V_S C$ as quickly as possible.

As such, when a phenomenon occurs in which the label-fitted position H of a label L fitted around a bottle B exceeds the label fitted range (from 0 to $H_{max}$), the label L delivery speed $V_S$ is corrected by the predetermined amount of change $\Delta V_1$ or $\Delta V_2$ such that the label-fitted position H falls within the label fitted range (from 0 to $H_{max}$). Accordingly, the delivery speed $V_S$ of the shot rollers 50 can be automatically controlled to the appropriate delivery speed $V_S C$ while generating the minimum possible number of label fitting defects. As a result, fraction defective of the label-fitting processing can be reduced, and decrease in operating rate of the label-fitting device 1 can be prevented.

While the amount of change of the delivery speed $V_S$ of the shot rollers 50 is switched to two levels depending on the label-fitted position H in the present embodiment, only one amount of change may be provided, or the amount of change may be switched to three or more levels. Further, while the delivery speed $V_S$ is changed in a stepwise manner in the present embodiment, the change may alternatively be effected in a continuous manner. Concerning the means for determining the necessity for correcting the label L delivery speed $V_S$ of the label-fitting device based on the label-fitted position H detected by the label-fitted position detection sensor, while the above description refers to an example in which the delivery speed $V_S$ is corrected successively in response to each detected value of the label-fitted position H, the present invention is not limited by this feature. To enable appropriate determination of the current state, it is possible to wait until a predetermined number of detected values of the label-fitted position H are obtained, and then proceed to correct the delivery speed $V_S$ in accordance with the detected tendency.

While the present embodiment is configured such that the inclination angle θ of the roller surface of the shot rollers 50 is fixed and the amounts of change $\Delta V_1$, $\Delta V_2$ of the shot roller delivery speed $V_S$ are preset relative to the fixed inclination angle θ, the present invention is not limited by this feature. It is alternatively possible to configure such that different amounts of change $\Delta V(\theta)$ of the shot roller delivery speed $V_S$ are assigned for the respective main inclination angles θ of the roller surface of the shot rollers 50 within the adjustable range, and, when an operator makes an adjustment to the inclination angle θ, the amount of change $\Delta V(\theta)$ is also changed and set to an amount of change $\Delta V(\theta)$ corresponding to the adjusted angle value In that case, it is possible to have the operator directly input the amount of change $\Delta V(\theta)$ via the manipulation display device 73. Also, it may be configured such that, when the operator inputs an inclination angle θ via the manipulation display device 73, an amount of change $\Delta V(\theta)$ correlated to that inclination angle θ is read out from a memory and automatically set in the label control device 1A. Further, for an inclination angle θ that does not have an assigned amount of change $\Delta V(\theta)$, a corresponding amount of change $\Delta V(\theta)$ may be calculated by interpolation calculation using the amounts of change $\Delta V(\theta)$ assigned to other inclination angles θ, and the calculated value may be automatically set.

While the mounting position of the shot roller motors 51 (or the inclination angle θ of the roller surface of the shot rollers 50) is manually changed in the present embodiment, this change may be carried out using a motor as a drive source. In that case, it is possible to configure such that, when the operator manipulates a button to cause the motor to drive, the inclination angle θ of the roller surface of the shot rollers 50 (or the mounting position of the shot roller motor 51) is calculated based on the amount of drive, and an amount of change $\Delta V(\theta)$ corresponding to that inclination angle θ is automatically set. When adopting such an arrangement, it may also be configured such that the inclination angle θ is changed in accordance with a change in the rotational speed of the shot roller motors 51. According to this configuration, the ratio between the delivery speed $V_S$ and rotational speed of the label L can be changed freely as appropriate, so that, for example, only the delivery speed $V_S$ may be changed without changing the label L rotational speed, or in reverse, only the rotational speed may be changed without changing the label L delivery speed $V_S$.

Figure 59:
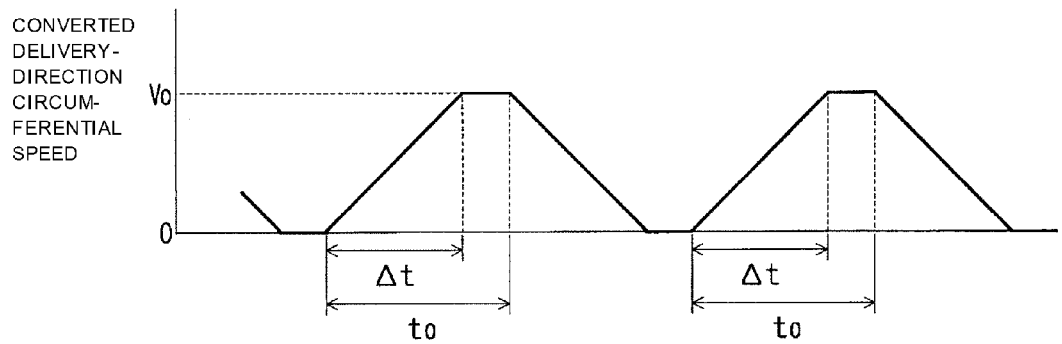
FIG. 59 is a timing chart showing an operation of a shot roller in a conventional label-fitting device.

Next, a fifth embodiment of the present invention is described. In a conventional label-fitting device 980 as shown in FIG. 56, a label L transferred to the lower end of the mandrel 981 is placed in a standby state with its lower end being held between the roller 984 and the mandrel 981, and, when a bottle container B passes the label-fitting position, in synchronization with the passing timing, the roller 984 is rotated so as to deliver the label L toward the area below the mandrel 981 while rotating the label L in the circumferential direction. Since the roller 984 is driven intermittently in this manner, as shown in FIG. 59, a certain amount of acceleration time At is necessary from the start of rotation of the roller 984 until attaining the final delivery circumferential speed V0 corresponding to the fitting speed (the downward moving speed of the label L). The final delivery circumferential speed V0 is a value of circumferential speed in the label delivery direction obtained by converting the downward moving speed of the label L.

As such, during the period from the start of rotation of the roller 984 until attaining the final delivery circumferential speed V0, the label L cannot be delivered downward at the fitting speed (final delivery circumferential speed V0). For this reason, there is a limit to possible reduction of time period t0 (fitting period) required from when label L delivery is started to when the label L is fitted around the trunk of a bottle container B.

Figure 60A:
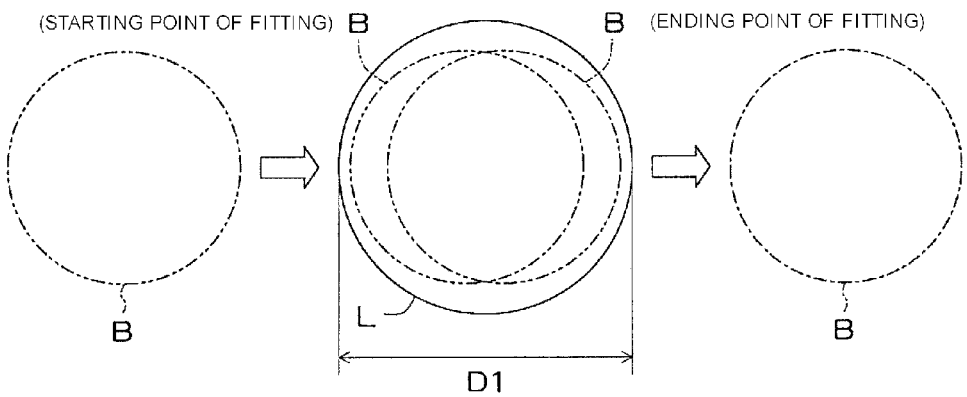
FIG. 60a is a diagram for explaining the relationship between the label-fitting period and the folded size (diameter) of the label.
Figure 60B:
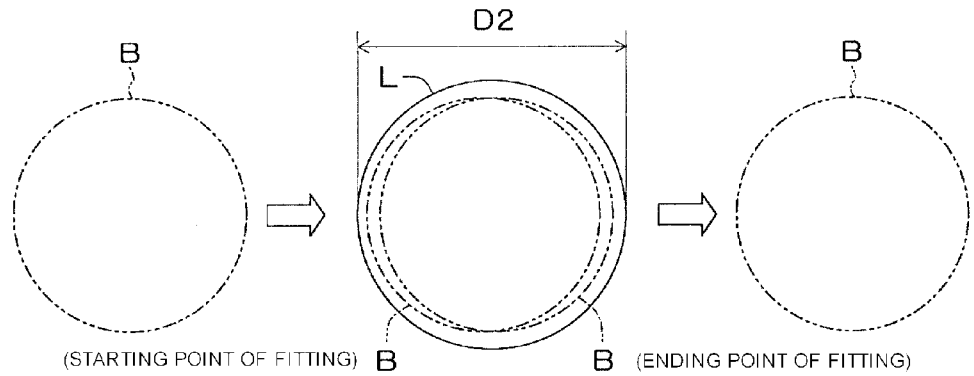
FIG. 60b is a diagram for explaining the relationship between the label-fitting period and the folded size (diameter) of the label.

In cases in which a bottle container B is to be fitted with a label L while being moved and without being stopped at the label-fitting position as described above, when the label L fitting period becomes longer, distance moved by the bottle container B from start to completion of the fitting of the label L around the bottle container B becomes greater. Therefore, in order to ensure fitting of the label L around the bottle B, the folded size (diameter D1) of the label L must be made larger as shown in FIG. 60a. In contrast, when the label L fitting period is shorter, distance moved by the bottle container B from start to completion of the fitting of the label L around the bottle container B becomes shorter. Accordingly, the label L can be reliably fitted around the bottle B even when the folded size (diameter D2) of the label L is made smaller as shown in FIG. 60b. However, with the configuration of the label-fitting position as described above, there is a limit to possible reduction of the fitting period, and therefore there is also a limit to possible reduction of the folded size.

A label-fitting device 1 according to the present embodiment reduces the fitting period required for fitting a tubular film around a body to be subjected to fitting. The basic mechanical structure of the label-fitting device 1 of the present embodiment is almost identical to the first embodiment, except for the feature that two sets of shot rollers 50 are arranged vertically. Accordingly, the following description is made focusing on this difference from the first embodiment.

Figure 34:
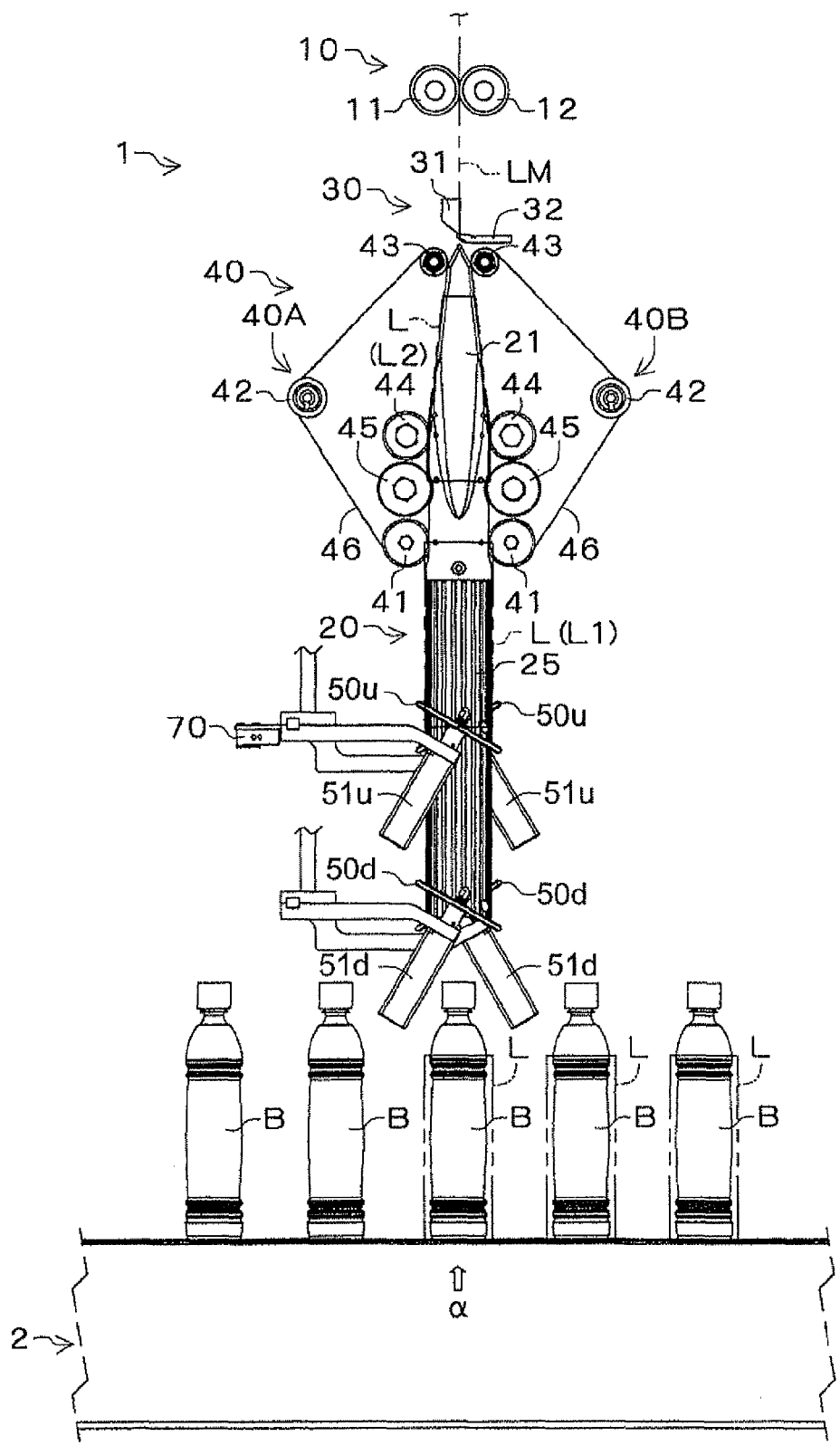
FIG. 34 is a front view showing a label-fitting device according to a fifth embodiment of the present invention.
Figure 35:
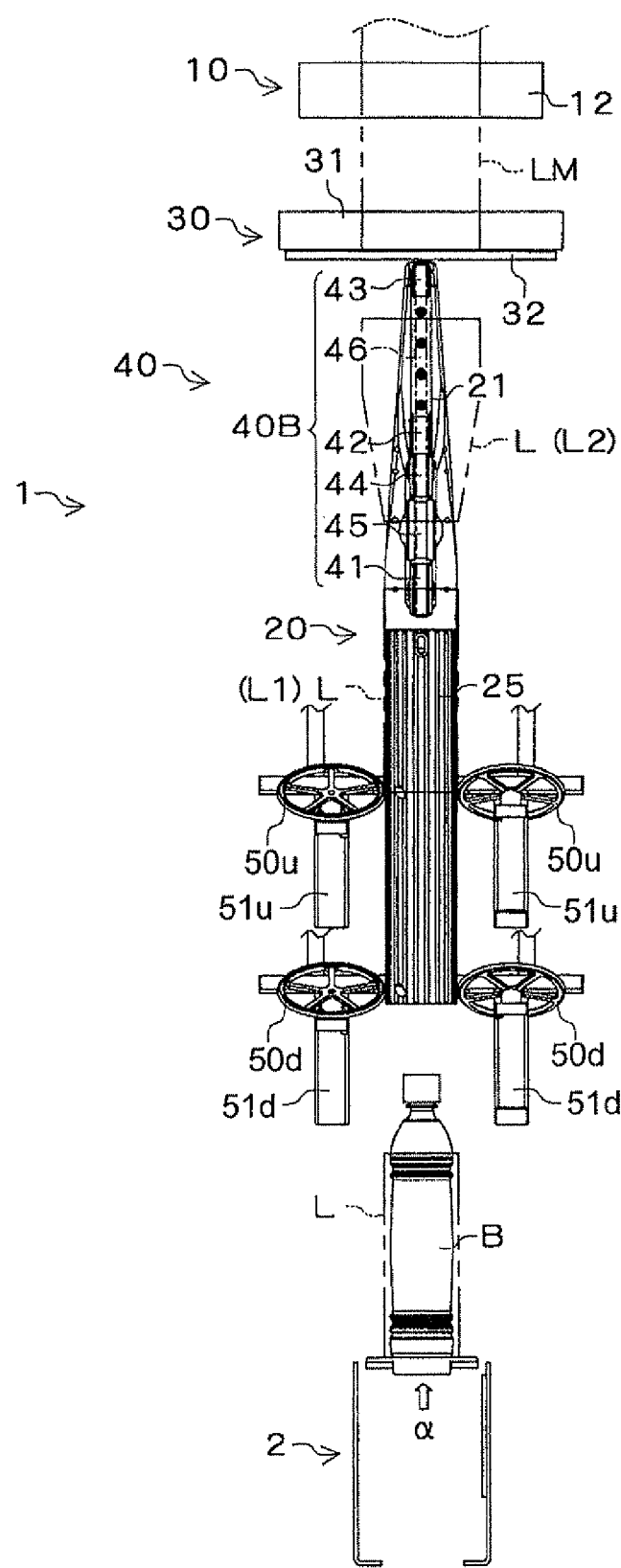
FIG. 35 is a side view showing the above-noted label-fitting device.

As shown in FIGS. 34 and 35, the label-fitting device 1 of the present embodiment includes a pair of upper shot rollers 50u which receive a label L transferred from the label transfer mechanism 40 and deliver the label L to the lower end side of the mandrel 20, and a pair of lower shot rollers 50d which receive the label L delivered by the upper shot rollers 50u and deliver the label L to the label-fitting position α.

As shown in FIGS. 36a and 36b, at the lower end of the upper half 25u of the label-shaping part 25, at positions orthogonal to the bottle container B transport direction, a pair of rollers 26u, against which the pair of upper shot rollers 50u hold the labels L, are rotatably mounted in a manner such that their circumferential surfaces are slightly projecting. Further, at the lower end of the lower half 25d of the label-shaping part 25, at positions orthogonal to the bottle container B transport direction, a pair of rollers 26d, against which the pair of lower shot rollers 50d hold the labels L, are rotatably mounted in a manner such that their circumferential surfaces are slightly projecting.

The spacing between the rollers 26u and the rollers 26d is set slightly greater than the label L length, so that the upper shot rollers 50u and the lower shot rollers 50d do not simultaneously hold the same label L.

In each of the upper shot roller pair 50u and the lower shot roller pair 50d, as shown in FIGS. 34 and 35, two shot rollers are arranged on opposite sides of the bottle container B transport path by having their rotational shafts being slanted at 30 degrees with respect to the axis core of the mandrel 20; i.e., by having the shot rollers being slanted at 60 degrees with respect to the axis core of the mandrel 20, with one of the shot rollers in a downward slant toward the downstream side along the bottle container B transport direction and the other shot roller in a downward slant toward the upstream side along the bottle container B transport direction. As shown in FIG. 36a, the rollers 26u and rollers 26d at the label-shaping part 25 of the mandrel 20 are mounted on the label-shaping part 25 with their rotational shafts being slanted at 30 degrees with respect to the axis core of the mandrel 20 while being sloped in the same direction as the respective corresponding shot rollers in the upper shot roller pair 50u and the lower shot roller pair 50d.

Each shot roller in the upper shot roller pair 50u and the lower shot roller pair 50d is directly coupled to a rotational shaft of a corresponding shot roller motor 51u, 51d comprising a servo motor. By supporting the respective shot roller motors 51u, 51d with their rotational shafts being slanted at 30 degrees with respect to the axis core of the mandrel 20 in opposite directions from each other, the respective shot rollers in the upper and lower shot roller pairs 50u, 50d are configured such that, while being slanted in opposite directions from each other, their outer surfaces substantially contact the outer surfaces of the corresponding rollers 26u, 26d in the label-shaping part 25.

With the above-described arrangement, by rotating the upper shot rollers 50u and the lower shot rollers 50d when the label L arranged around the mandrel 20 is held between the upper or lower shot rollers 50u, 50d and the mandrel 20, the label L is delivered downward while being rotated in the circumferential direction.

Figure 37:
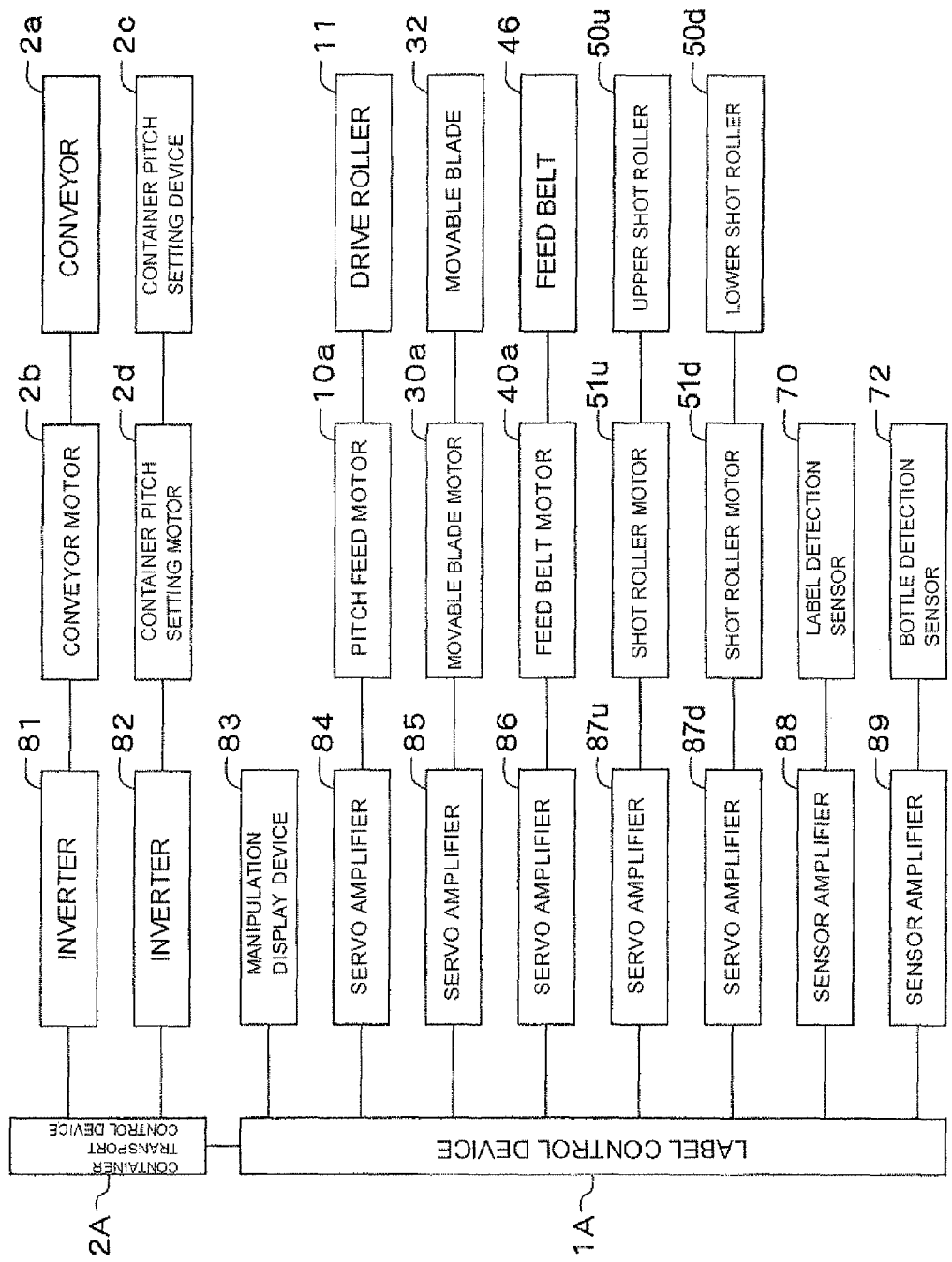
FIG. 37 is a functional block diagram showing a control system of the above-noted label-fitting device.

FIG. 37 is a functional block diagram showing a control system of the label-fitting device 1. In the control system of the label-fitting device 1, the configuration of the container transport control device 2A is identical to that of the first embodiment, and therefore its explanation is not repeated in below. Further, the label control device 1A is almost identical to that of the first embodiment, except that the label control device 1A includes shot roller motors 51u, 51d and servo amplifiers 77u, 77d, which correspond to the upper and lower shot rollers 50u, 50d.

A servo amplifier 77u for controlling the shot roller motor 51u that performs rotational drive of the upper shot roller 50u is connected to the label control device 1A. When the label control device 1A outputs to the servo amplifier 77, based on a label detection signal and a bottle detection signal output from the label detection sensor 60 and the bottle detection sensor 62, a control signal for performing rotational operation of the upper shot roller 50u, the servo amplifier 77u outputs a drive signal to the shot roller motor 51u. The shot roller motor 51u is thereby rotationally driven, and the shot roller 50u is rotated.

A servo amplifier 77d for controlling the shot roller motor 51d that performs rotational drive of the lower shot roller 50d is also connected to the label control device 1A. When the label control device 1A outputs to the servo amplifier 77d a control signal for performing rotational operation of the lower shot roller 50d, the servo amplifier 77d outputs a drive signal to the shot roller motor 51d. The shot roller motor 51d is thereby rotationally driven, and the lower shot roller 50d is rotated.

Figure 38:
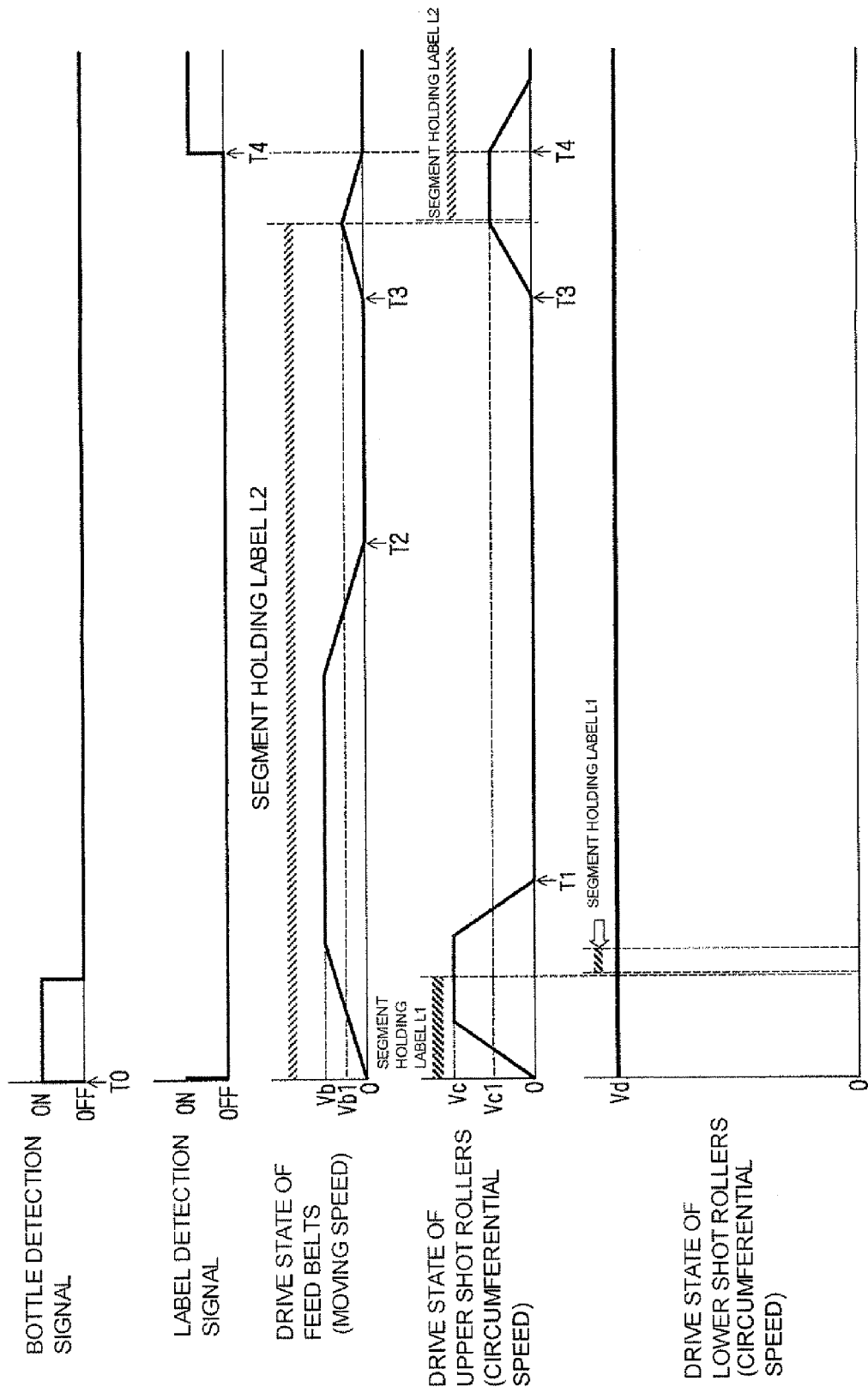
FIG. 38 is a timing chart showing operations of feed belts, upper shot rollers, and lower shot rollers in the above-noted label-fitting device.

Operations of the label-fitting device 1 are next described by reference to the timing chart shown in FIG. 38. First, while in the standby state shown in FIGS. 34 and 35, when a bottle container B is detected by the above-described bottle detection sensor (T0), the upper shot rollers 50u start rotating, to thereby rotate a label L(L1) arranged around the upper half 25u of the label-shaping part 25 in the circumferential direction and to simultaneously deliver the label to the lower half 25d of the label-shaping part 25. During this operation, the upper shot rollers 50u are quickly accelerated to a final circumferential speed Vc and then rotated at the final circumferential speed Vc for a predetermined period of time. Subsequently, after the label L is located away from the upper shot rollers 50u, the rotation is stopped (T1).

During operation of the label-fitting device 1, the lower shot rollers 50d are rotated at all times at a constant speed, which is a circumferential speed Vd that is approximately three times the final circumferential speed Vc of the upper shot rollers 50u. At the instant that the upper end of the label L(L1) is disengaged from the upper shot rollers 50u, the lower shot rollers 50d receive the label L(L1) by holding the label against the mandrel 20. Then, while rotating the label in the circumferential direction, the lower shot rollers 50d deliver the label downward at a timing at which the bottle container B passes the label-fitting position α, resulting in fitting the label around the trunk of the bottle container B.

When a bottle container B is detected by the bottle detection sensor 62 (T0), drive of the label transfer mechanism 40 is also started so as to start transferring a subsequent label L(L2), which is held between the label transfer mechanism 40 and the label-opening part 21 of the mandrel 20, to the label-shaping part 25 of the mandrel 20. When the label L(L2) reaches a position immediately upstream of the position at which its lower end portion becomes held by the upper shot rollers 50u, the label L transfer operation is temporarily stopped (T2). At this point, the upper end portion of the label L(L2) is still being held between the feed belts 46 of the label transfer mechanism 40 and the label-opening part 21.

During the period (T0-T2) from the point after the drive of the label transfer mechanism 40 is started until the label L transfer operation is temporarily stopped, the medium-delivering unit 10 delivers the label-forming medium LM downward. The label-forming medium LM is thereby arranged around the label-opening part 21 of the mandrel 20, and is transferred by the label transfer mechanism 40 so that its lower end portion extends approximately to the lower half portion of the label-opening part 21. In this state, the distance from the cutting position to the lower end of the label-forming medium LM equals the label length. During the time when drive of the label transfer mechanism 40 is stopped, the medium cut unit 30 cuts the label-forming medium LM, so that a label L is cut apart while being held between the feed belts 46 of the label transfer mechanism 40 and the label-opening part 21.

At a time (T3) after elapse of a predetermined period of time from the point when the drive of the label transfer mechanism 40 is stopped, drive of both the label transfer mechanism 40 and the upper shot rollers 50u is restarted, so that both the upper and lower labels L arranged around the mandrel 20 are transferred slightly downward, and the lower label L(L2) is handed over from the label transfer mechanism 40 to the upper shot rollers 50u. During this operation, it is set such that the moving speed Vb1 of the feed belts 46 of the label transfer mechanism 40 is substantially equal to a half of the circumferential speed Vc of the upper shot rollers 50u.

As described above, when the upper shot rollers 50u installed in a slanted state at an angle θ of 60 degrees with respect to the axis core of the mandrel 20 are rotated, the label L held between the mandrel 20 and the upper shot rollers 50u is delivered downward at a speed of (the circumferential speed Vc1 of the upper shot rollers 50u)·(cos θ)=Vc1/2. Accordingly, the handing over and receiving of the label L between the label transfer mechanism 40 and the upper shot rollers 50u is executed at equal speeds at the label transfer mechanism 40 and the upper shot rollers 50u.

Here, it should be noted that, in this label-fitting device 1, when the label L is being handed over from the feed belts 46 of the label transfer mechanism 40 to the upper shot rollers 50u, the feed belts 46 and the upper shot rollers 50u do not simultaneously hold the label L. The spacing between the label transfer mechanism 40 and the upper shot rollers 50u is set such that the upper shot rollers 50u can receive the label L after the label L leaves the feed belts 46.

While the label transfer mechanism 40 executes a stopping operation (deceleration and stop) at once when the label L leaves the feed belts 46, the upper shot rollers 50u continue their constant-speed rotation until the lower end portion of the label L is detected by the label detection sensor 60. At a time (T4) when the label L is detected by the label detection sensor 60, a stop signal for the upper shot rollers 50u is output, and the upper shot rollers 50u execute a stopping operation (deceleration and stop).

In this way, the label-fitting device 1 returns to the standby state shown in FIGS. 34 and 35. Operations as described above are subsequently repeated.

As the inclination angle of the upper shot rollers 50u and the lower shot rollers 50d with respect to the central axis of the mandrel 20 is 60 degrees as described above, when the circumferential speed of the upper and lower shot rollers 50u, 50d is denoted by V, the speed of downward delivery of a label L by the upper and lower shot rollers 50u, 50d is given by Vf=V·cos(60°), and the label L rotational speed (circumferential speed) is given by Vr=V·sin(60°). Hereinafter, the circumferential speed V which allows to attain the downward delivery speed Vf is referred to as the "converted delivery-direction circumferential speed" of the upper shot rollers 50u and the lower shot rollers 50d.

Figure 39:
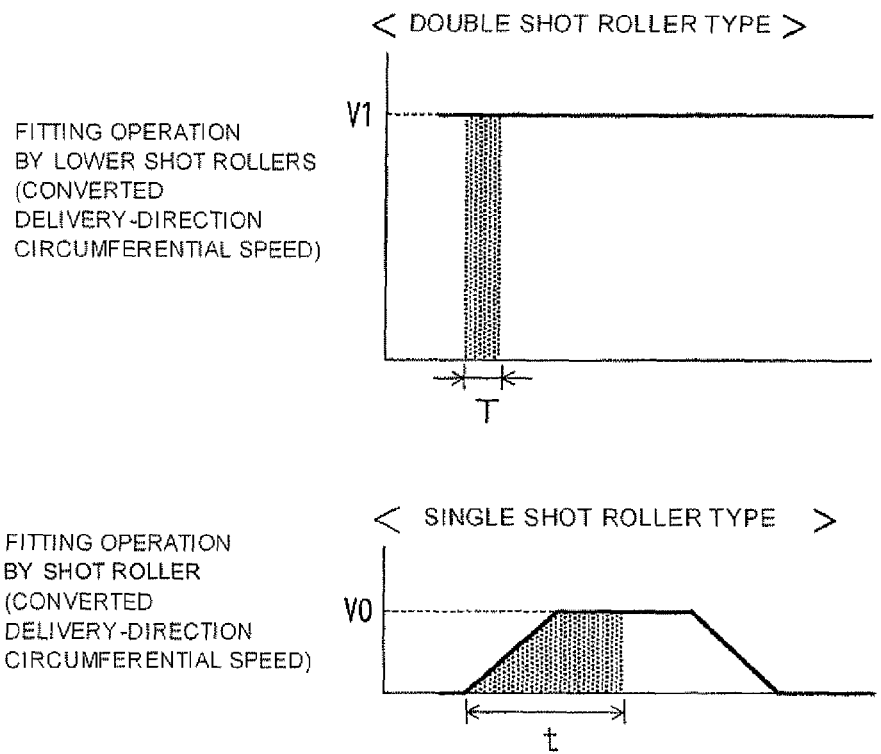
FIG. 39 is a timing chart showing label periods in label-fitting devices.

As shown in FIG. 39, in the present label-fitting device 1, a label L arranged around the mandrel 50 is fitted around the trunk of a bottle container B by means of the lower shot rollers 50d that are uniformly rotated at all times at the fitting circumferential speed V1 (or converted delivery-direction circumferential speed), which is higher than the final delivery circumferential speed V0 (or converted delivery-direction circumferential speed, which corresponds to a fitting speed) of a shot roller in a label-fitting device of a single shot roller type. In a label-fitting device of a single shot roller type, because a single shot roller is driven intermittently, a certain amount of time is required from the start of rotation of the shot roller until attaining the predetermined fitting speed (final delivery circumferential speed V0 of the shot roller), as can be seen in the lower graph in FIG. 39. In contrast, according to the present embodiment, a label L can be delivered at the fitting speed (fitting circumferential speed V1 of the lower shot rollers 50d) from the very start of the label L fitting step. Accordingly, as compared to the fitting period t of a label-fitting device of a single shot roller type, the fitting period T of the present label-fitting device 1 can be reduced greatly, and, along with that, the folded size of the label L can advantageously be reduced. More specifically, for example, when a label L having a length of 160 mm is fitted using a label-fitting device of a single shot roller type, the fitting period t is 40.5 ms and the distance moved by the bottle container during that period is 8.3 mm. When the same label L is fitted around a bottle container B using the present label-fitting device 1, the fitting period T is 7.6 ms and the distance moved by the bottle container during that period is 1.57 mm. Accordingly, by using the present label-fitting device 1, the folded size of the label L can be reduced by approximately 3.5 mm as compared to when a label-fitting device of a single shot roller type is used. In each of the graphs shown in FIG. 39, the area of the hatched portion denotes the distance moved by the label during the label-fitting step. It is noted that the hatched portion in the upper graph regarding the present label-fitting device 1 has the same area as the hatched portion in the lower graph regarding a label-fitting device of a single shot roller type.

When an intermittently-rotated single shot roller is used to cause a label L to be fitted around the trunk of a bottle container B as in a label-fitting device of a single shot roller type, it is impossible to drastically increase the rotational speed of the intermittently-rotated shot roller, which corresponds to the final delivery circumferential speed V0. However, the present label-fitting device 1 adopts the double shot roller scheme in which a label L delivered by the intermittently-rotated upper shot roller 50u is received by the continuously-rotated lower shot roller 50d, which cause the label L to be fitted around the trunk of a bottle container B. Accordingly, the rotational speed of the continuously-rotated lower shot roller 50d can be increased up to approximately three times the rotational speed of the intermittently-rotated upper shot roller 50u. Therefore, as compared to when a label-fitting device of a single shot roller type is used, the label L fitting period can be shortened drastically.

Further, in the present label-fitting device 1, since both of the upper shot rollers 50u and the lower shot rollers 50d are slanted at the same angle with respect to the axis core of the mandrel 20, the label L is handed over from the upper shot rollers 50u to the lower shot rollers 50d while being rotated in the circumferential direction. As such, the handing over of the label L from the upper shot rollers 50u to the lower shot rollers 50d can be carried out smoothly.

Figure 40:
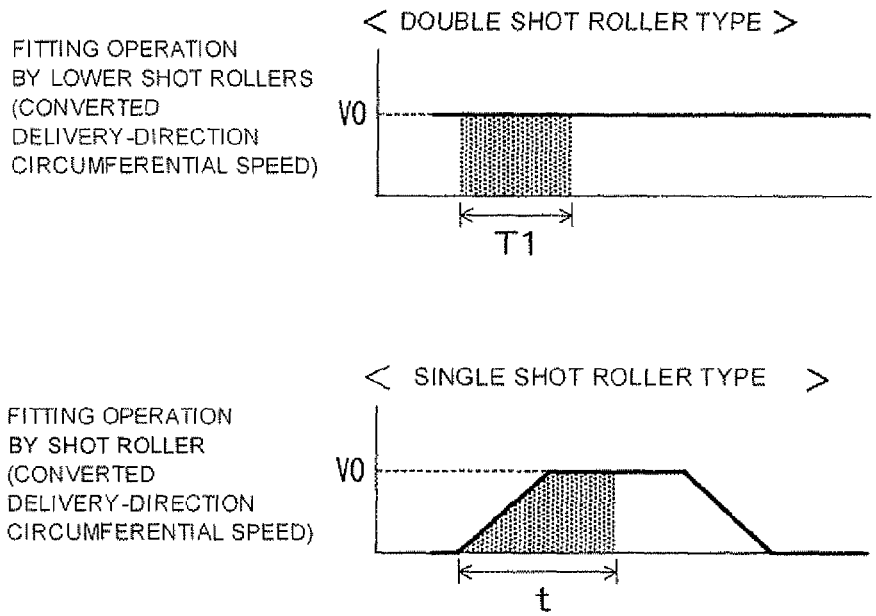
FIG. 40 is a timing chart showing label-fitting periods in label-fitting devices.

While, in the above-described embodiment, the lower shot rollers 50d are uniformly rotated at all times at the fitting circumferential speed V1 that is approximately three times the final delivery circumferential speed V0 (corresponding to the fitting speed) of a shot roller in a label-fitting device of a single shot roller type, the present invention is not limited by this feature. As shown in FIG. 40, it is also possible to configure such that the circumferential speed of the lower shot rollers 50d matches the final delivery circumferential speed V0 of a shot roller in a label-fitting device of a single shot roller type. Even in that case, the fitting period T1 can be shortened as compared to the fitting period t of the label-fitting device of a single shot roller type, and, along with that, the folded size of the label L can advantageously be reduced. In each of the graphs shown in FIG. 40, the area of the hatched portion denotes the distance moved by the label during the label-fitting step. It is noted that the hatched portion in the upper graph regarding the label-fitting device of the present invention has the same area as the hatched portion in the lower graph regarding a label-fitting device of a single shot roller type.

Figure 41:
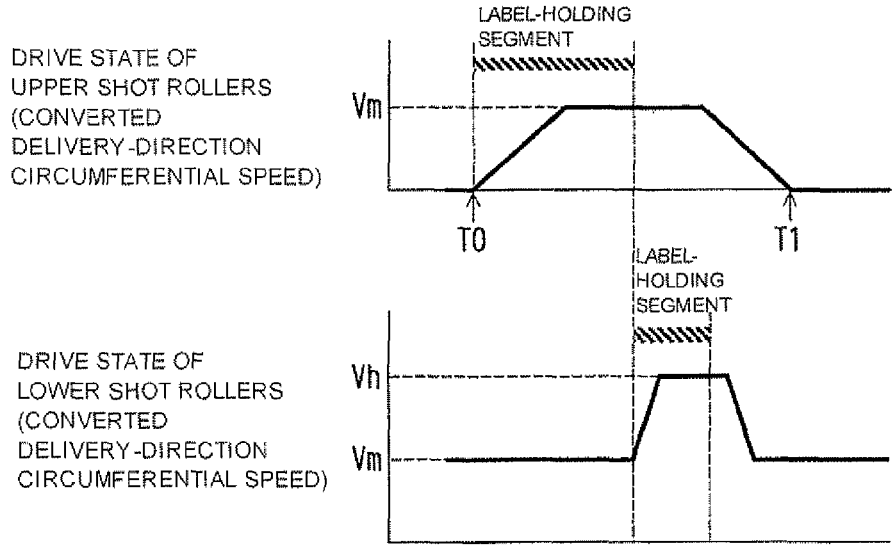
FIG. 41 is a timing chart showing another example fitting operation by the upper shot rollers and the lower shot rollers in the label-fitting device.

While, in the above-described embodiments, the lower shot rollers 50d are uniformly rotated at all times at the fitting circumferential speed V1 or V0 corresponding to the fitting speed, the present invention is not limited by this feature. As shown in FIG. 41, it may be configured such that, after the lower shot rollers 50d receive a label L while being rotating at a converted delivery-direction circumferential speed that is substantially equal to the final delivery circumferential speed Vm of the upper shot rollers 50u, the lower shot rollers 50d is accelerated to the final circumferential speed Vh, which is the converted delivery-direction circumferential speed corresponding to the fitting speed. Subsequently, after fully completing the fitting of the label L, the lower shot rollers 50d may be gradually decelerated to the circumferential speed that is substantially equal to the final delivery circumferential speed Vm of the upper shot rollers 50u.

Figure 42:
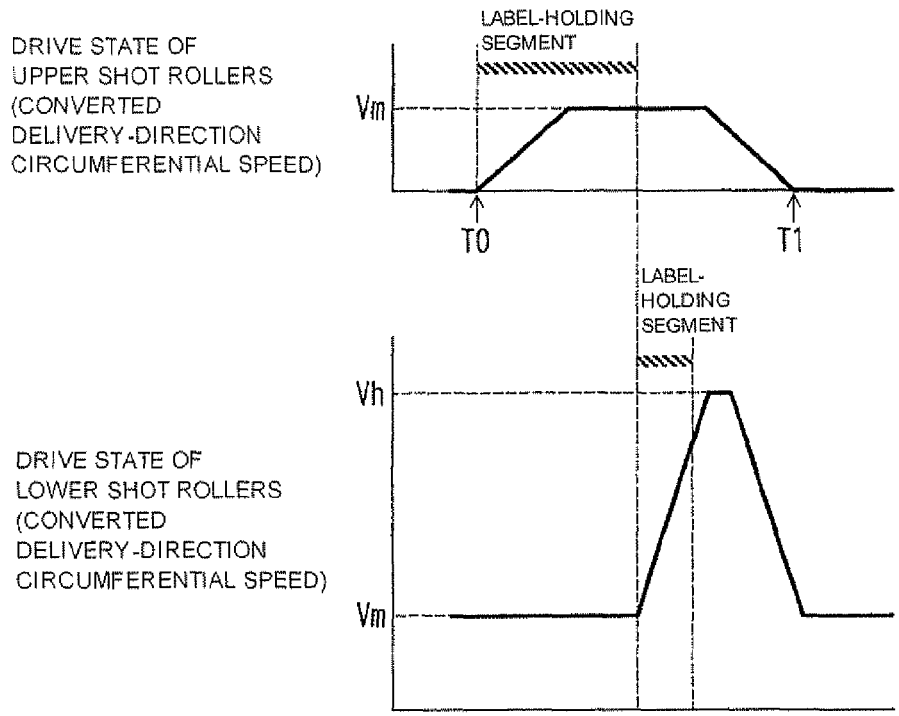
FIG. 42 is a timing chart showing a further example fitting operation by the upper shot rollers and the lower shot rollers in the label-fitting device.

Furthermore, as shown in FIG. 42, after the lower shot rollers 50d receive a label L while being rotating at a converted delivery-direction circumferential speed that is substantially equal to the final delivery circumferential speed Vm of the upper shot rollers 50u, the fitting operation may be completed midway through the acceleration of the lower shot rollers 50d to the final circumferential speed Vh.

By configuring as described above to accelerate the lower shot rollers 50d after the lower shot rollers 50d receive a label L while being rotating at a converted delivery-direction circumferential speed that is substantially equal to the final delivery circumferential speed Vm of the upper shot rollers 50u, acceleration time required for attaining the predetermined fitting speed becomes reduced, which is in contrast to a film-fitting device of a single shot roller type in which a shot roller is accelerated from a standstill state to the fitting speed. As a result, the fitting period can be made shorter than the case of a film-fitting device of a single shot roller type, and, along with that, the folded size of the tubular film can advantageously be made smaller.

In the above-described embodiments, a label leaves the upper shot rollers 50u at the same time of being received by the lower shot rollers 50d, and then the lower shot rollers 50d start accelerating immediately. Alternatively, during a period in which the upper shot rollers 50u and the lower shot rollers 50d are rotated at substantially identical circumferential speeds, the lower shot rollers 50d may receive the label L slightly before the label L leaves the upper shot rollers 50u, and, after the label L is disengaged from the upper shot rollers 50u, acceleration of the lower shot rollers 50d may be started.

Figure 43:
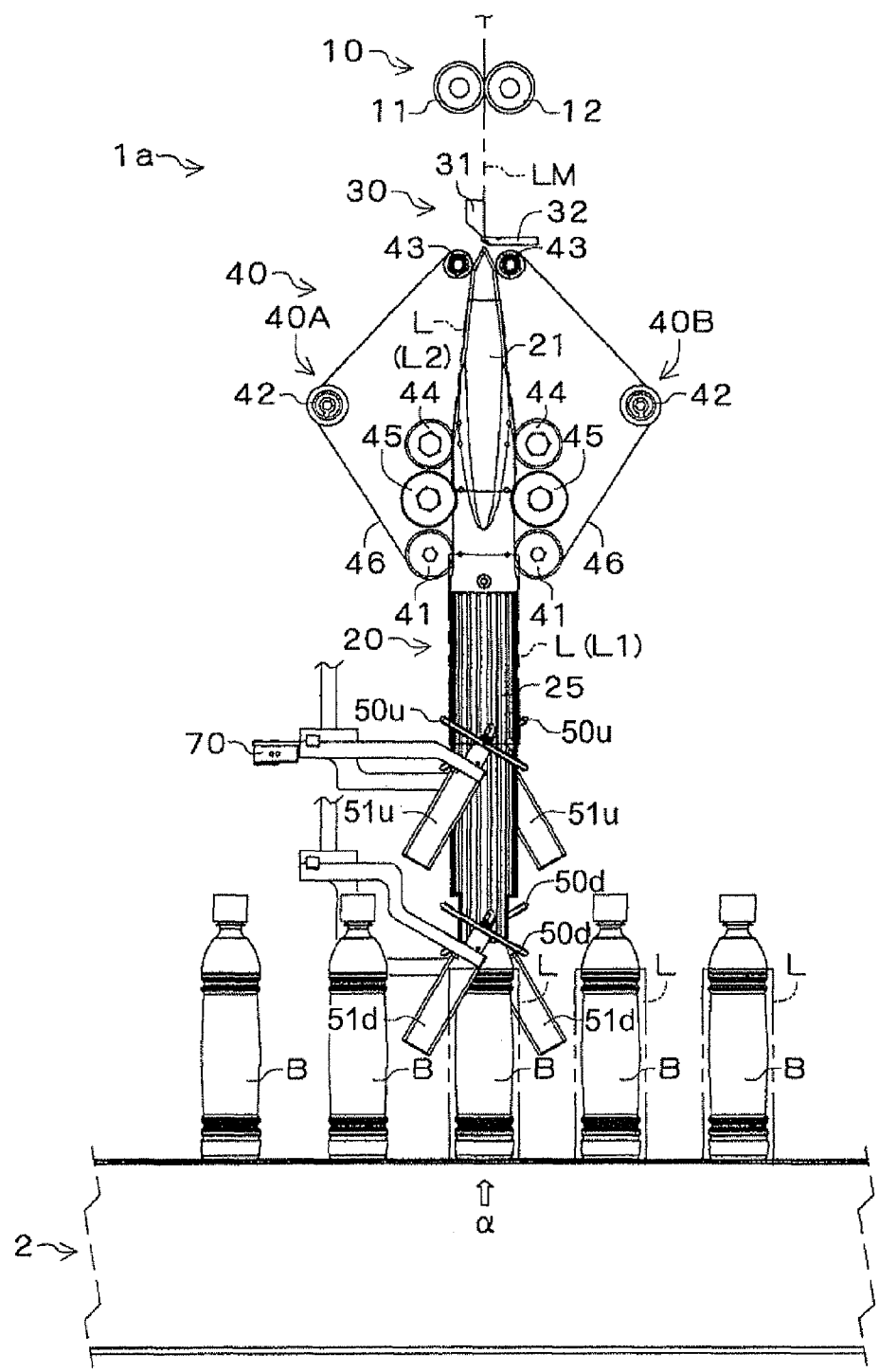
FIG. 43 is a front view showing another example of the label-fitting device.
Figure 44:
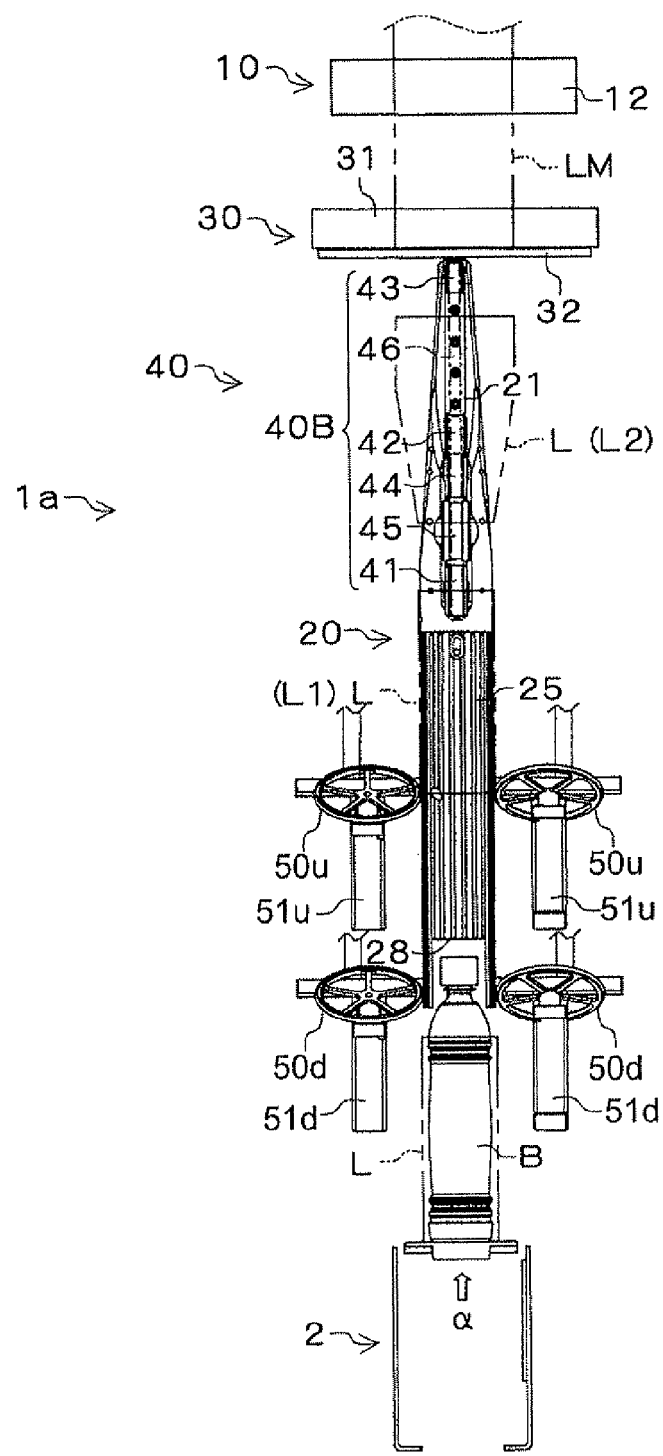
FIG. 44 is a side view showing the above-noted label-fitting device.

Further, in the above-described embodiments, since a label L folded in sheet form is opened by being arranged around the mandrel 20, and the label L arranged around the mandrel 20 is delivered downward by the lower shot rollers 50d while being rotated in the circumferential direction, the tubular label L spreads in the radially outward direction, such that the lower end part of the label L ejected from the mandrel 20 is prevented from deflating. Meanwhile, as in the label-fitting device 1a shown in FIGS. 43 and 44, in the lower end portion (in the lower half 25d) of the label-shaping part 25 of the mandrel 20, a grooved part 28 may be formed extending along the bottle container B transport direction, through which the head part of a bottle container B can pass. With this arrangement, when a bottle container B passes directly below the mandrel 20, the small-sized head part of the bottle container B becomes inserted in the grooved part 28. Accordingly, at the point that the bottle container B is passing immediately below the mandrel 20, the lower end of the mandrel 20 (or the label-shaping part 25) and the large-sized trunk part of the bottle container B are placed in close proximity to each other, so that the label L ejected from the mandrel 20 starts to be fitted around the trunk of the bottle container B without being deflated at all. The label L can therefore be fitted around the bottle container B further reliably.

Figure 45:
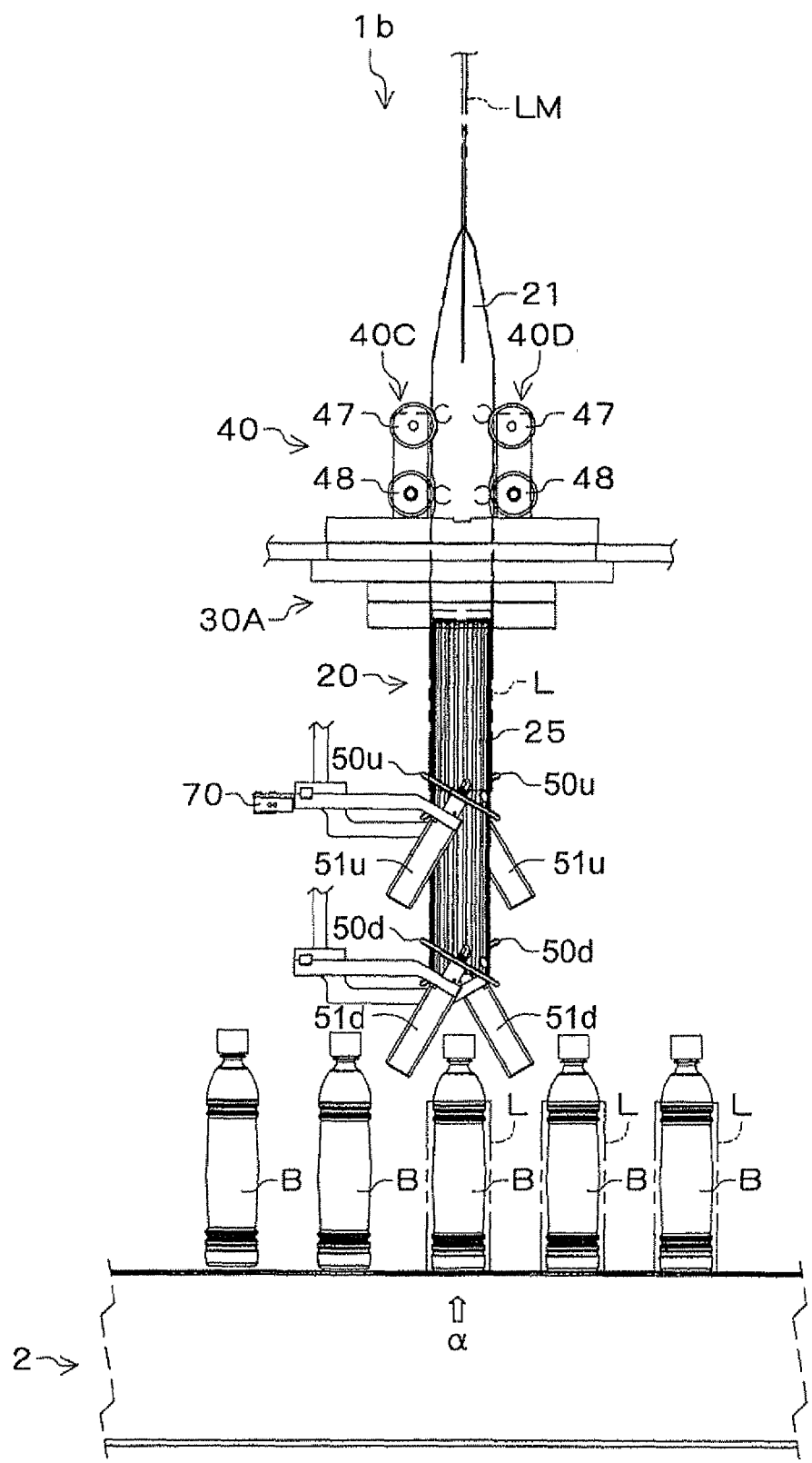
FIG. 45 is a front view showing a further example of the label-fitting device.
Figure 46:
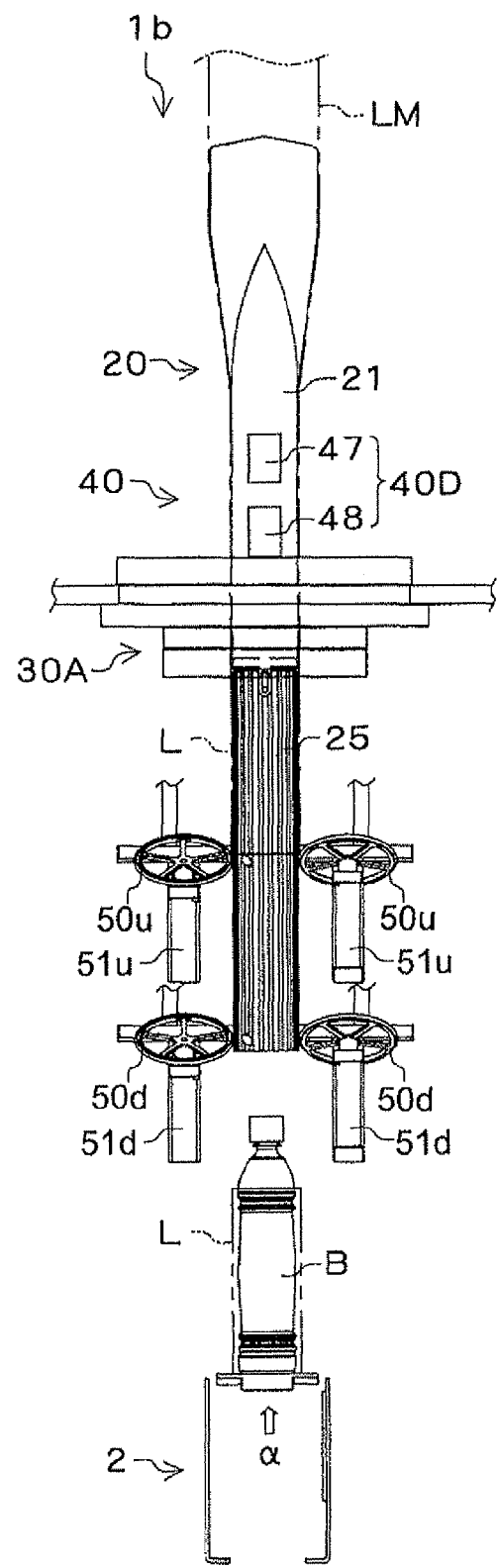
FIG. 46 is a side view showing the above-noted label-fitting device.

While a guillotine-type medium cut unit 30 is provided upstream of the mandrel 20 in the above-described embodiments, the present invention is not limited by this feature. For example, as in the label-fitting device 1b shown in FIGS. 45 and 46, a circle cutter 30A for cutting, into a predetermined length, the label-forming medium LM opened by means of the mandrel 20 may be installed surrounding the mandrel 20.

In this label-fitting device 1b, instead of the label transfer mechanism 40 installed in the above-described label-fitting device 1 for transporting a label L by means of belts, a label transfer mechanism 40 comprising roller units 40C, 40D each constituted with upper and lower rollers 47, 48 is employed. The height of the position of the upper shot roller 50u is set such that, when the label transfer mechanism 40 delivers the label-forming medium LM so that the distance from the lower end of the label-forming medium LM to the cutting position becomes equal to the label L length, a small spacing (for example, approximately 5 mm) is provided between the lower end of the label-forming medium LM and the upper shot roller 50u.

In this label-fitting device 1b, a label L is handed over to the upper shot roller 50u as described below. First, the label transfer mechanism 40 delivers the label-forming medium LM by a predetermined amount so that the distance from the lower end of the label-forming medium LM to the cutting position becomes equal to the label L length, and then stops the delivering operation. Next, the circle cutter 30A cuts apart a label L from the label-forming medium LM. Subsequently, the label transfer mechanism 40 delivers the label-forming medium LM by a small amount so that the cut-apart label L is pushed slightly downward. Simultaneously with this restart of the delivering operation by the label transfer mechanism 40 after the cutting, rotational drive of the upper shot rollers 50u is started, and the label L is held by the upper shot rollers 50u to thereby complete the handing over of the label L. After receiving the label L, the upper shot rollers 50*u* stop rotating, and, until the subsequent timing for the fitting operation, remain in a standby state while holding the label L.

While, in the above-described embodiments, the upper shot rollers 50*u* and the lower shot rollers 50*d* are slanted at an angle of 60 degrees with respect to the axis core of the mandrel 20, the present invention is not limited by this feature. Although the inclination angles of the upper shot rollers 50*u* and the lower shot rollers 50*d* may be set in the range from approximately 5 to 85 degrees, in order to obtain sufficient centrifugal force while also attaining sufficient delivery speed, an angle in the range from 30 to 70 degrees is preferred, and an angle in the range from 45 to 70 degrees is more preferred.

While the inclination angles of both the upper shot rollers 50*u* and the lower shot rollers 50*d* are set to the same angle in the above-described embodiments, the present invention is not limited by this feature. Alternatively, the inclination angles may be changed between the upper shot rollers 50*u* and the lower shot rollers 50*d*. However, by setting the inclination angles of the upper shot rollers 50*u* and lower shot rollers 50*d* to identical angles, and by also setting the circumferential speeds of the upper shot rollers 50*u* and lower shot rollers 50*d* to identical speeds during the handing over and receiving of the label L from the upper shot rollers 50*u* to the lower shot rollers 50*d*, the handing over and receiving of the label L from the upper shot rollers 50*u* to the lower shot rollers 50*d* can naturally be carried out smoothly and reliably.

While, in the above-described embodiments, both the upper shot rollers 50*u* and the lower shot rollers 50*d* are slanted with respect to the axis core of the mandrel 20, the present invention is not limited by this feature. As to the upper shot rollers 50*u*, these rollers 50*u* may be disposed in a state with no slant; i.e., a state in which the rotational shaft of each upper shot roller 50*u* forms an angle of 90 degrees with respect to the axis core of the mandrel 20.

While the upper shot rollers 50*u* and the lower shot rollers 50*d* have identical diameters in the above-described embodiments, the present invention is not limited by this feature. In order to increase the circumferential speed of the lower shot rollers 50*d*, the diameter of the lower shot rollers 50*d* may be made larger than the diameter of the upper shot rollers 50*u*.

While the lower shot rollers 50*d* are installed at the lower end part of the mandrel 20 in the above-described embodiments, so long as the lower shot rollers 50*d* are located toward the lower part of the mandrel 20, their installation positions are not limited to the lower end part of the mandrel 20.

Further, the entire mandrel need not be formed with a rigid metal body. For example, it is possible to adopt a configuration in which a leaf spring is connected hanging down from the lower end of the label-shaping part 25 in the above-described embodiments, and the lower shot roller holds a label against the leaf spring. In that case, the leaf spring corresponds to a constituent element of the mandrel.

Next, a sixth embodiment of the present invention is described. As explained above by reference to FIGS. 59, 60*a*, and 60*b*, in a conventional label-fitting device as shown in FIG. 56, it is extremely difficult to shorten the fitting period required for fitting a tubular film around a body to be subjected to fitting. A label-fitting device 1 according to the sixth embodiment is an embodiment specifically addressing this problem, and enables to reduce the fitting period required for fitting a tubular film around a body to be subjected to fitting.

Figure 47:
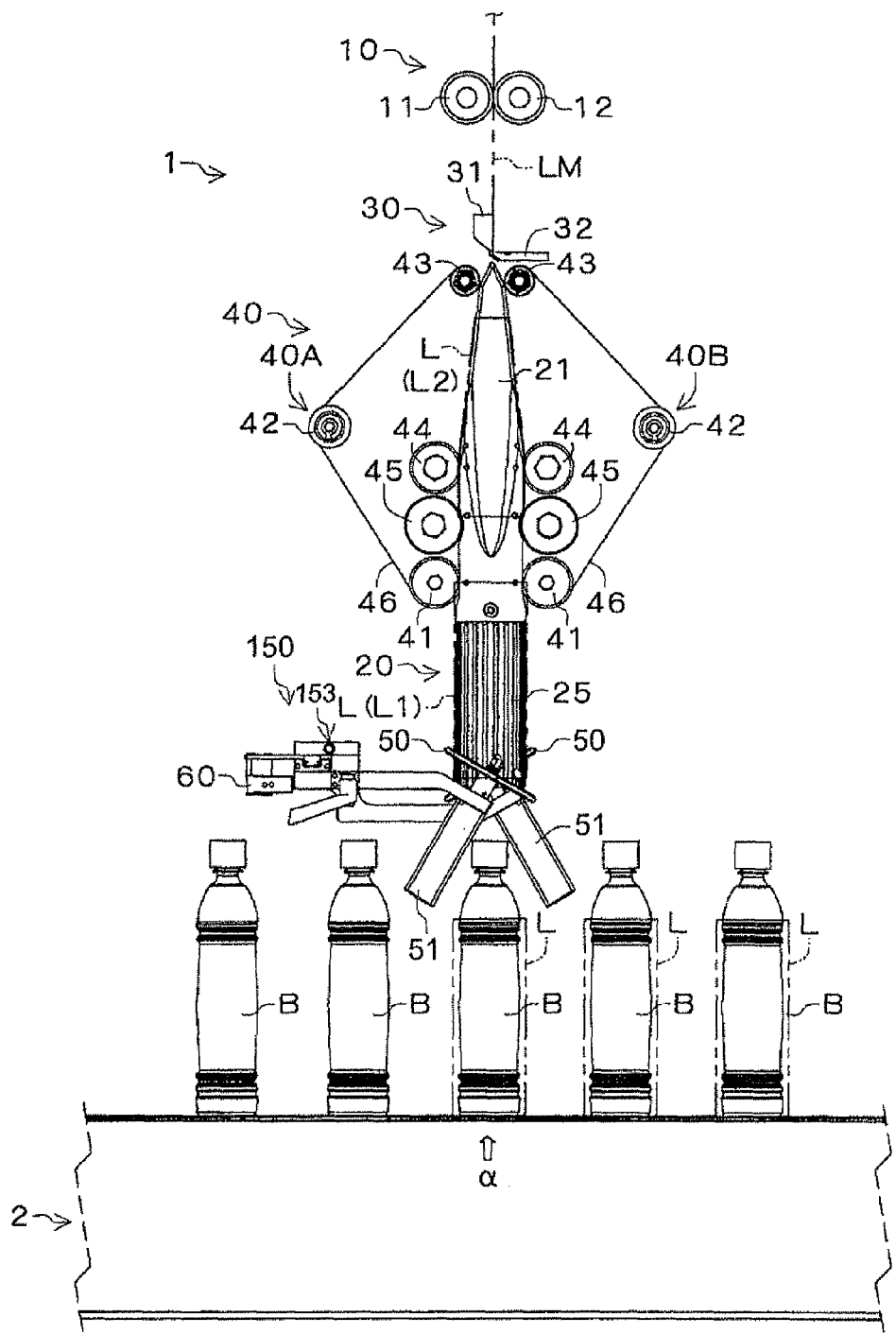
FIG. 47 is a front view showing a label-fitting device according to a sixth embodiment of the present invention.
Figure 48:
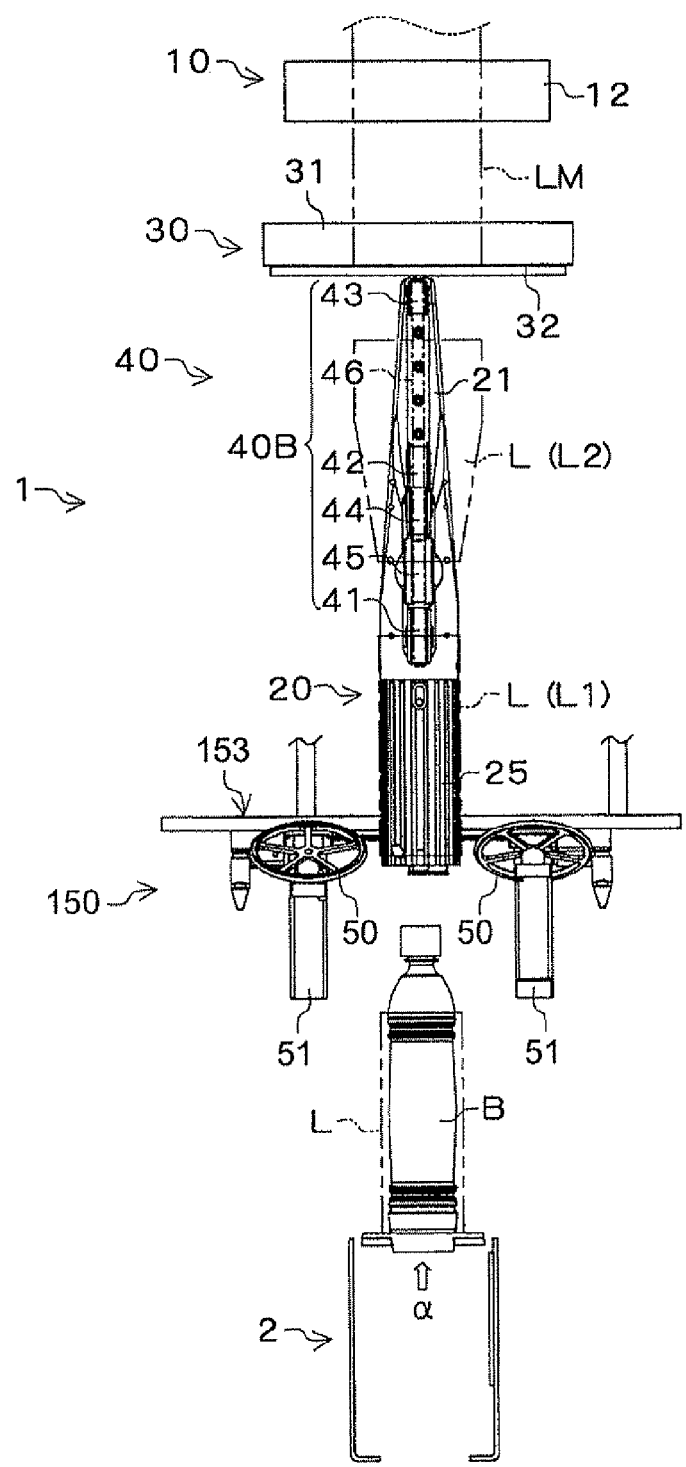
FIG. 48 is a side view showing the above-noted label-fitting device.
Figure 49A:
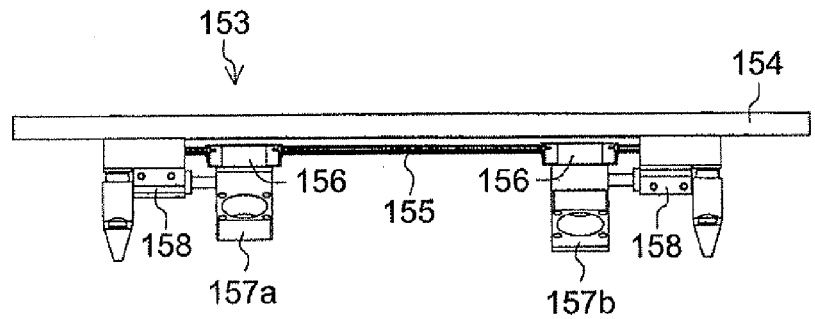
FIG. 49a is a side view showing a spacing adjustment mechanism constituting the above-noted label-fitting device.
Figure 49B:
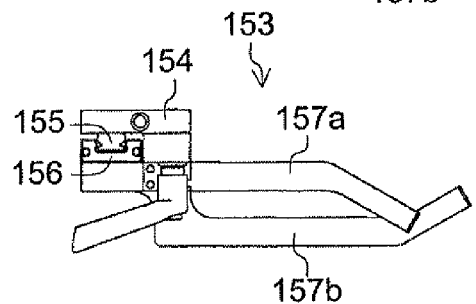
FIG. 49b is a front view showing the spacing adjustment mechanism constituting the above-noted label-fitting device.
Figure 49C:
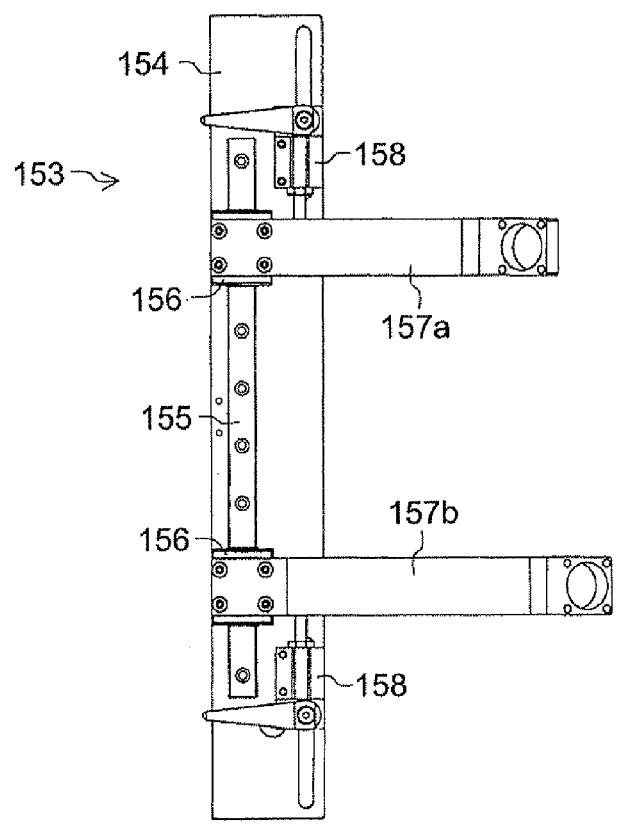
FIG. 49c is a bottom view showing the spacing adjustment mechanism constituting the above-noted label-fitting device.

FIGS. 47 and 48 are diagrams showing the label-fitting device 1 of the sixth embodiment. The mechanical structure of this label-fitting device 1 is almost identical to the mechanical structure of the first embodiment, except for the feature that a spacing adjustment mechanism 153 is provided. In the following description, a unit comprising the spacing adjustment mechanism 153, shot rollers 50, and shot roller motors 51 is referred to as a "shot unit 49". Since the structures of the shot rollers 50 and the shot roller motors 51 are almost the same as in the first embodiment, the structure of the spacing adjustment mechanism 153 is described below. As shown in FIG. 49*a* through 49*c*, the spacing adjustment mechanism 153 comprises: a support plate 154 which is provided on the upstream side of the mandrel 20 in the bottle container B transport direction and which extends in a direction orthogonal to the bottle container B transport direction; a slide rail 155 mounted on the bottom surface of the support plate 154; a pair of sliders 156 that move along the slide rail 155; support arms 157*a*, 157*b* which are mounted on the respective sliders 156 and which support the respective shot roller motors 51; and a pair of drive cylinders 158 which are mounted on the bottom surface of the support plate 154 and which cause the respective support arms 157*a*, 157*b* to approach and depart from the mandrel 20. The support arms 157*a*, 157*b* support the respective shot roller motors 51 with the rotational shafts of the shot roller motors 51 being slanted at 30 degrees with respect to the axis core of the mandrel 20 in opposite directions from each other.

Figure 50A:
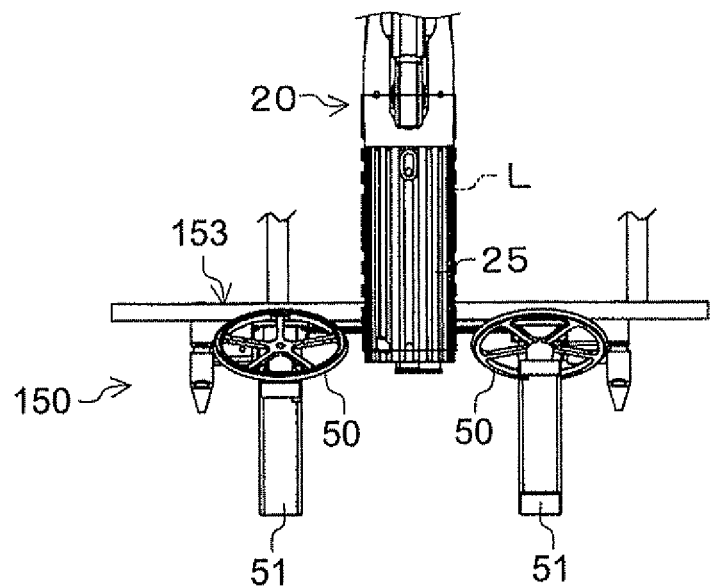
FIG. 50a is a partial side view showing an operation of the above-noted spacing adjustment mechanism.
Figure 50B:
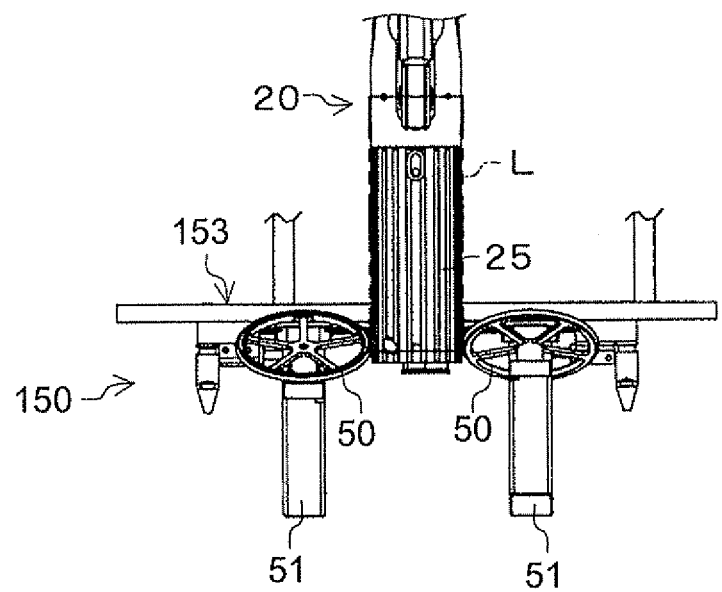
FIG. 50b is a partial side view showing an operation of the above-noted spacing adjustment mechanism.

As shown in FIGS. 50*a* and 50*b*, the pair of drive cylinders 158 cause the pair of shot rollers 50 (shot roller motors 51) to move in directions approaching and departing with respect to each other; i.e., to simultaneously move in opposite directions from each other. By causing the pair of shot rollers 50 to approach each other (i.e., to close), the pairs of shot rollers hold a label L against the corresponding rollers 26 in the label-shaping part 25 of the mandrel 20. Further, by causing the pair of shot rollers 50 to depart from each other (i.e., to open), the pairs of shot rollers release holding of the label L.

Figure 51:
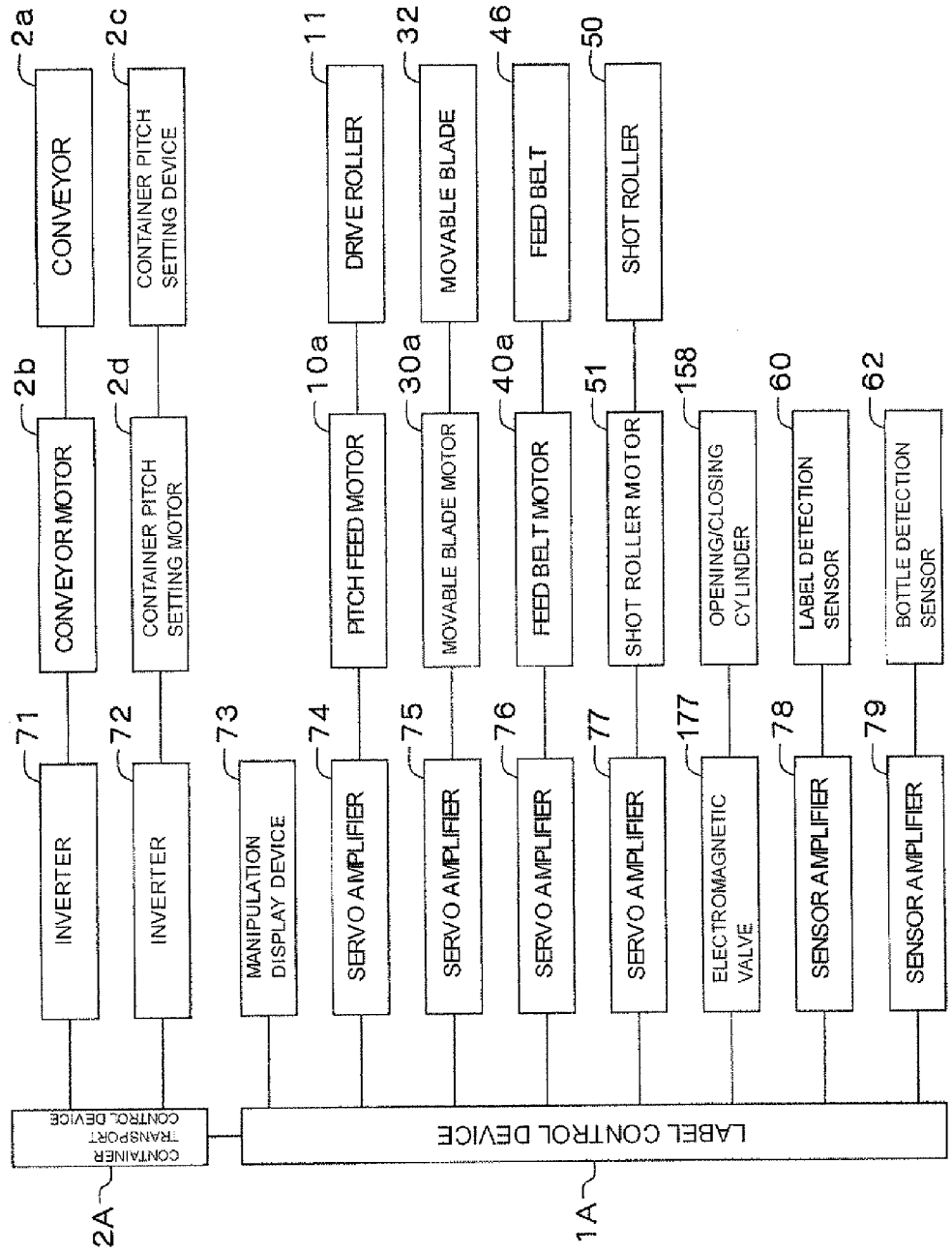
FIG. 51 is a functional block diagram showing a control system of the above-noted label-fitting device.

FIG. 51 is a functional block diagram showing a control system of the label-fitting device 1. As the configuration of the container transport control device 2A is identical to that of the first embodiment, its explanation is not repeated in below. The label control device 1A differs from that of the first embodiment in that an electromagnetic valve 177 and the drive cylinders 158 are provided.

The electromagnetic valve 177 controls supply of air to the drive cylinders 158 of the spacing adjustment mechanism 153. When the label control device 1A outputs to the electromagnetic valve 177 a signal for controlling supply of air to the drive cylinders 158, the electromagnetic valve 177 opens or closes, and along with that, the drive cylinders 158 are driven so as to cause the support arms 157*a*, 157*b* to advance or retract. As a result, the shot rollers 50 approach or depart from the mandrel 20.

Figure 52:
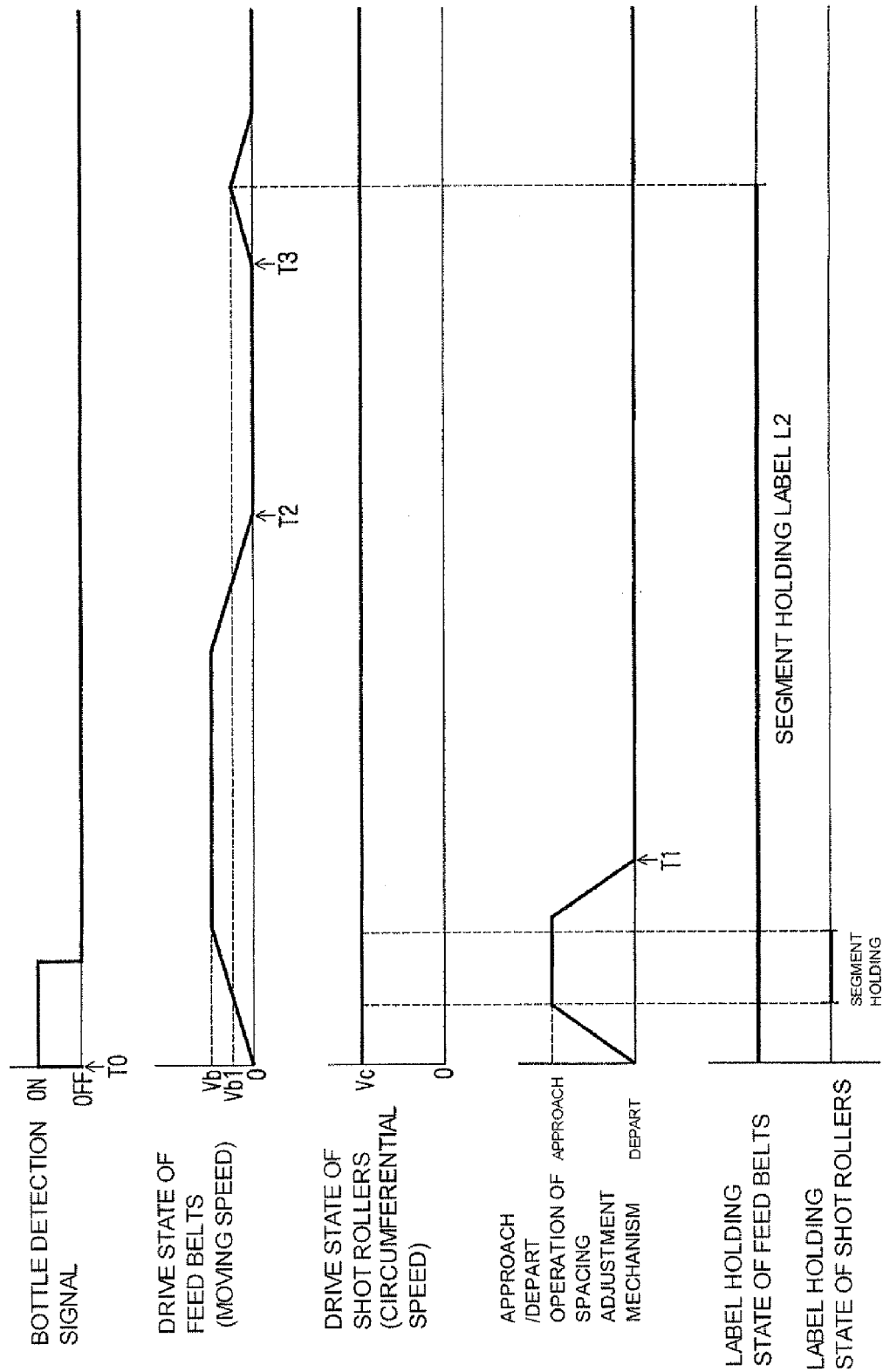
FIG. 52 is a timing chart showing operations of feed belts, shot rollers, and the spacing adjustment mechanism in the above-noted label-fitting device.

Operations of this label-fitting device 1 are next described by reference to the timing chart shown in FIG. 52. First, while in the standby state shown in FIGS. 47 and 48, when a bottle container B is detected by the above-described bottle detection sensor (T0), the spacing adjustment mechanism 153 of the shot unit 49 causes the shot rollers 50 to approach the mandrel 20, so that a label L(L1) in a standby state while being arranged around the label-shaping part 25 of the mandrel 20 is held between the shot rollers 50 and the mandrel 20. As the shot rollers 50 are rotated at a constant rotational speed corresponding to the fitting speed, by holding the label L(L1) against the mandrel 20, the shot rollers 50 rotate the label L(L1) in the circumferential direction and simultaneously deliver the label downward, thereby fitting the label around the trunk of the bottle container B passing the label-fitting position α. Subsequently, after the label L(L1) is located away from the shot rollers 50, the spacing adjustment mechanism 153 causes the shot rollers 50 to depart from the mandrel 20 (T1).

When a bottle container B is detected by the bottle detection sensor 62 (T0), drive of the label transfer mechanism 40 is also started so as to start transferring a subsequent label L(L2), which is held between the label transfer mechanism 40 and the label-opening part 21 of the mandrel 20, to the label-shaping part 25 of the mandrel 20. When the label L(L2) reaches a position immediately upstream of the position at which its lower end portion becomes held by the shot rollers 50, the label L transfer operation is temporarily stopped (T2), At this point, the upper end portion of the label L(L2) is still being held between the feed belts 46 of the label transfer mechanism 40 and the label-opening part 21.

During the period (T0-T2) from the point after the drive of the label transfer mechanism 40 is started until the label L transfer operation is temporarily stopped, the medium-delivering unit 10 delivers the label-forming medium LM downward. The label-forming medium LM is thereby arranged around the label-opening part 21 of the mandrel 20, and is transferred by the label transfer mechanism 40 so that its lower end portion extends approximately to the lower half portion of the label-opening part 21. In this state, the distance from the cutting position to the lower end of the label-forming medium LM equals the label length. During the time when drive of the label transfer mechanism 40 is stopped, the medium cut unit 30 cuts the label-forming medium LM, so that a label L is cut apart while being held between the feed belts 46 of the label transfer mechanism 40 and the label-opening part 21.

At a time (T3) after elapse of a predetermined period of time from the point when the drive of the label transfer mechanism 40 is stopped, drive of the label transfer mechanism 40 is restarted, so that both the upper and lower labels L arranged around the mandrel 20 are transferred slightly downward. As a result, the lower label L(L2) leaves the label transfer mechanism 40 and stops at the standby position (the position at which the lower end of the label L(L2) is located slightly lower than the rollers 26 on the mandrel 20).

In this way, the label-fitting device 1 returns to the standby state shown in FIGS. 47 and 48. Operations as described above are subsequently repeated.

FIG. 53 is a diagram showing a comparison between the label-fitting device 1 of the present embodiment and a label-fitting device of a continuous-contact type in which the shot rollers 50 contact the mandrel 20 continuously. As shown in FIG. 53, in the label-fitting device 1 of the present embodiment, the shot rollers 50 are rotated constantly at the fitting circumferential speed V0, which is the converted delivery-direction circumferential speed identical to the final delivery speed V0 of the shot rollers in a label-fitting device of a continuous-contact type. While the shot rollers 50 are rotated, the spacing adjustment mechanism 153 causes the shot rollers 50 to approach the mandrel 20 in synchronization with the timing for fitting a label L, so that the shot rollers 50 hold the label L against the mandrel 20 and deliver the label L downward. After the shot rollers 50 have delivered the label L, the spacing adjustment mechanism 153 causes the shot rollers 50 to depart from the mandrel 20. In contrast, in a label-fitting device of a continuous-contact type, the shot rollers are driven intermittently, by having the shot rollers initially in a standby state while holding the label against the mandrel, and then rotating the shot rollers at the timing for fitting so that the label is delivered downward while being rotated in the circumferential direction. Accordingly, in a label-fitting device of a continuous-contact type, a certain amount of acceleration time t1 is required from the start of rotation of the shot rollers until attaining the predetermined fitting speed (final delivery circumferential speed of the shot rollers). The present label-fitting device 1 differs in that a label L can be delivered at the fitting speed from the very start of the label L fitting step.

Accordingly, as compared to the fitting period t of a label-fitting device of a continuous-contact type, the fitting period T of the present label-fitting device 1 can be reduced greatly, and, along with that, the folded size of the label L can advantageously be reduced. More specifically, for example, when a label L having a length of 160 mm is fitted using a label-fitting device of a continuous-contact type, the fitting period t is 40.5 ms and the distance moved by the bottle container during that period is 8.3 mm. When the same label L is fitted around a bottle container B using the present label-fitting device 1, the fitting period T is 17.0 ms and the distance moved by the bottle container during that period is 3.5 mm. Accordingly, by using the present label-fitting device 1, the folded size of the label L can be reduced by approximately 7.5 mm (the diameter can be reduced by approximately 4.8 mm) as compared to when a label-fitting device of a continuous-contact type is used. In each of the graphs shown in FIG. 53, the area of the hatched portion denotes the distance moved by the label during the label-fitting step. It is noted that the hatched portion in the upper graph regarding the present label-fitting device 1 has the same area as the hatched portion in the lower graph regarding a label-fitting device of a continuous-contact type.

When intermittently-rotated shot rollers are used to cause a label L to be fitted around the trunk of a bottle container B as in a label-fitting device of a continuous-contact type, it is impossible to drastically increase the rotational speed of the intermittently-rotated shot rollers, which corresponds to the final delivery circumferential speed V0. However, in the present label-fitting device 1, as the shot rollers 50 are continuously rotated at a uniform speed, the rotational speed can be increased up to approximately 1.5 times the maximum rotational speed of the shot rollers in a label-fitting device of a continuous-contact type. Therefore, as compared to when a label-fitting device of a continuous-contact type is used, the label L fitting period can be shortened drastically. Further, in the present label-fitting device 1, when a label L is handed over from the label transfer mechanism 40 to the shot rollers 50, the label L is prevented from being held simultaneously by both the feed belts 46 of the label transfer mechanism 40 and the shot rollers 50 that cause the label L to rotate in the circumferential direction. Accordingly, twisting of and damaging to the label L can be avoided.

Figure 54:
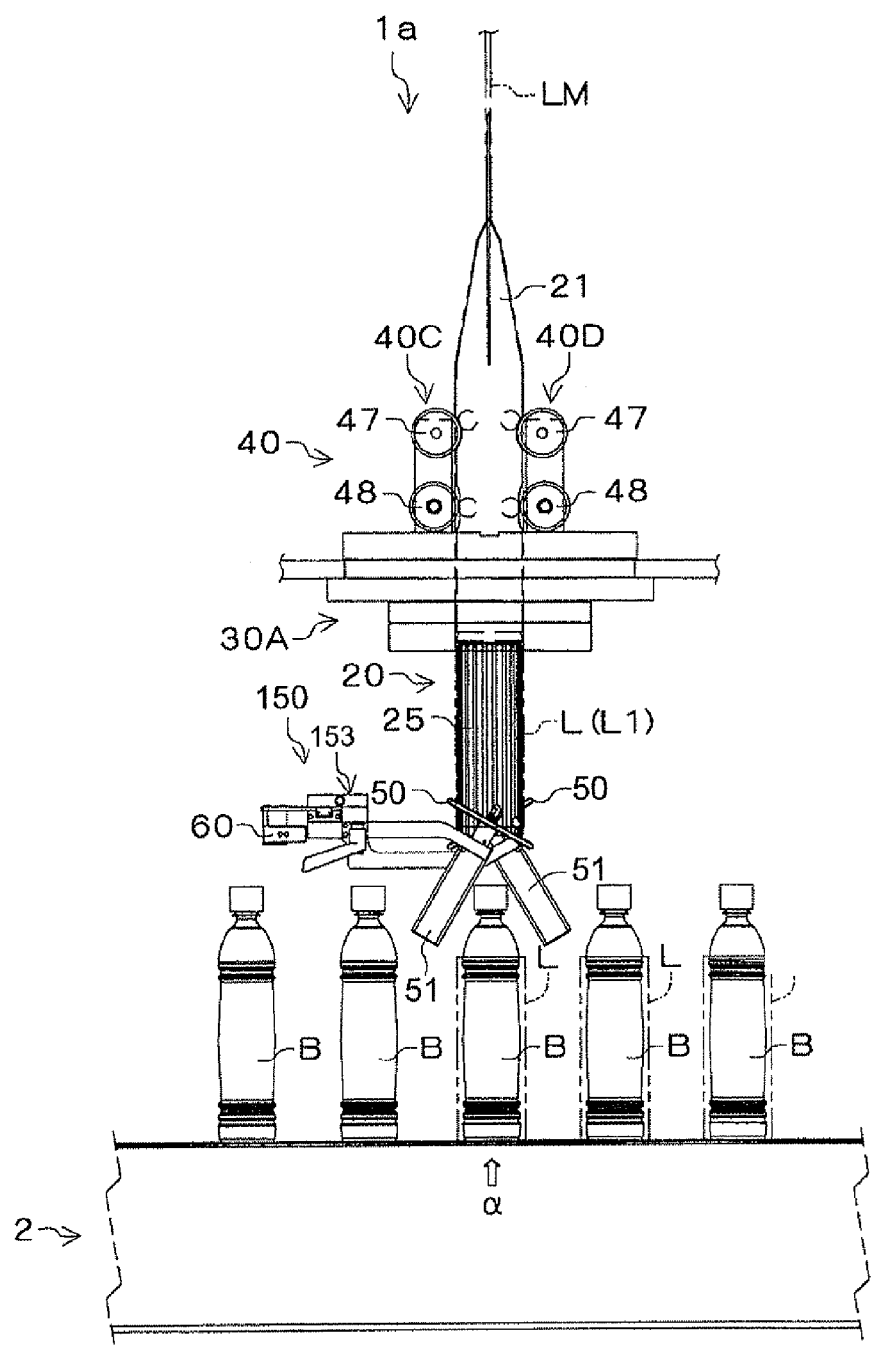
FIG. 54 is a front view showing another example of the label-fitting device.
Figure 55:
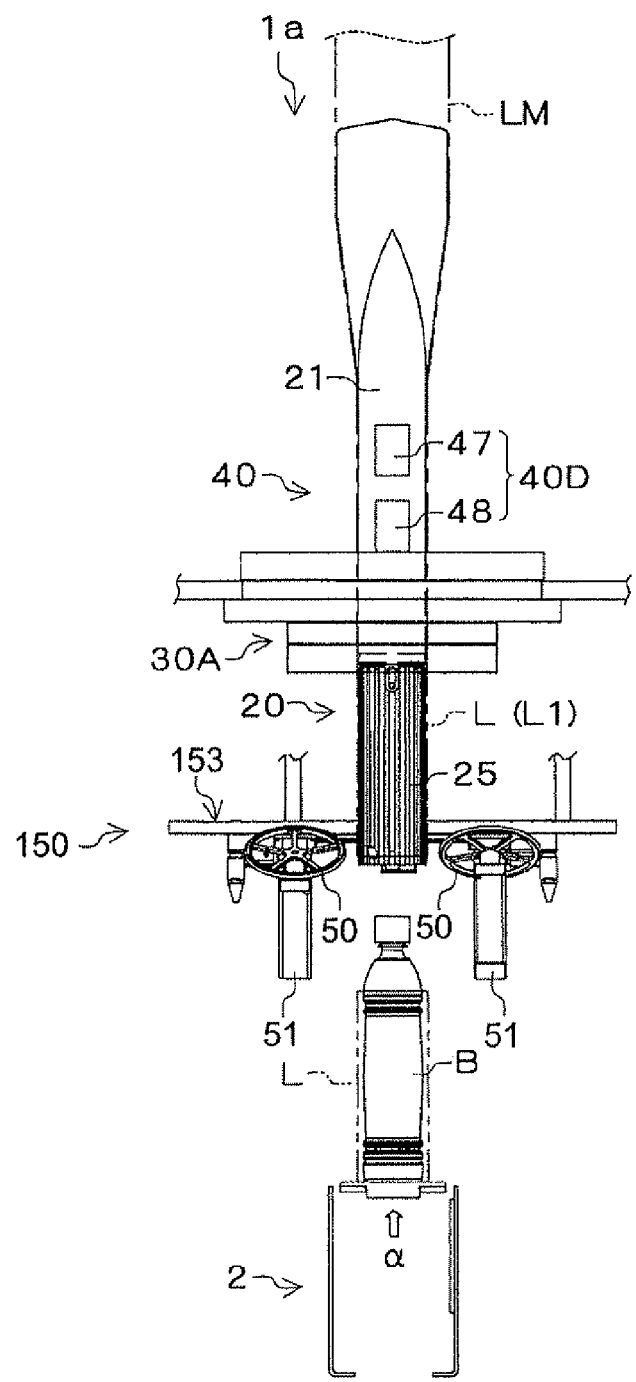
FIG. 55 is a side view showing the above-noted label-fitting device.

While a guillotine-type medium cut unit 30 is installed upstream of the mandrel 20 in the above-described embodiment, the present invention is not limited by this feature. For example, as in the label-fitting device 1a shown in FIGS. 54 and 55, a circle cutter 30A may be installed surrounding the mandrel 20 for cutting, into a predetermined length, the label-forming medium LM in the state of being opened by the mandrel 20, by rotating along the outer surface of the label-forming medium LM.

In this label-fitting device 1a, instead of the label transfer mechanism 40 installed in the above-described label-fitting device 1 for transporting labels L by means of belts, there is adopted a label transfer mechanism 40 comprising roller units 40C, 40D including two sets of upper and lower rollers 47, 48. When the label transfer mechanism 40 has delivered the label-forming medium LM so that the distance from the cutting position to the lower end of the label-forming medium LM equals the label length, the operation of delivery of the label-forming medium LM by the label transfer mechanism 40 is stopped, and the circle cutter 30A cuts apart a label L. At this point, the lower end of the label L is located slightly lower than the rollers 26 on the mandrel 20.

Subsequently, the spacing adjustment mechanism 153 causes the shot rollers 50 to approach the mandrel 20 in synchronization with the timing for fitting the label L, so that the shot rollers 50 hold the label L against the mandrel 20 and deliver the label L downward. After the shot rollers 50 have delivered the label L, the spacing adjustment mechanism 153 causes the shot rollers 50 to depart from the mandrel 20.

In a conventional label-fitting device as described above and having a medium cut unit of a circle cutter type, in order to enable the shot roller to deliver downward a label cut apart from the label-forming medium, it is necessary to have the lower end of the label-forming medium held between the shot roller and the mandrel before cutting apart the label from the label-forming medium. However, as explained above, since the shot roller rotates the end portion of the label-forming medium in the circumferential direction when the shot roller holds the end portion of the label-forming medium against the mandrel, at the point of cutting apart the label from the label-forming medium, the label-forming medium LM is in a twisted state, such that, disadvantageously, the cut edge formed by cutting with the circle cutter cannot be provided with a smooth finish.

To overcome this problem in a conventional label-fitting device, in order to hand over the label to the shot roller after the circle cutter has cut apart the label from the label-forming medium, it is necessary to provide, between the circle cutter and the shot roller, a label-transferring delivery roller that delivers the label downward without rotating the label in the circumferential direction.

In contrast to the above, in the present label-fitting device 1a, only after the circle cutter 30A has cut apart a label L, the shot rollers 50 hold the lower end of the label L against the mandrel 20 and fit the label L around the bottle container B while rotating the label L in the circumferential direction. As such, no twisting occurs in the label-forming medium LM, and, even without separately providing a label-transferring delivery roller, the cut edges of the two ends of each label L can be provided with a smooth finish.

While the above-described embodiments adopt the spacing adjustment mechanism 153 that causes the shot rollers 50 to approach and depart from the mandrel 20 along a horizontal direction by means of the drive cylinders 158, the present invention is not limited by this feature. For example, it is alternatively possible to adopt a spacing adjustment mechanism which causes the shot rollers 50 to swing and thereby approach and depart from the mandrel 20. Further, the shot rollers 50 may be replaced with drive belts, and parts of those drive belts may be caused to approach and depart from the mandrel 20.

Further, the entire mandrel need not be formed with a rigid metal body. For example, it is possible to adopt a configuration in which a leaf spring is connected hanging down from the lower end of the label-shaping part 25 in the above-described embodiments, and the shot roller holds a label against the leaf spring. In that case, the leaf spring corresponds to a constituent element of the mandrel.

As explained above, in all of the first through sixth embodiments, the distance from the medium cut unit 30 for cutting the labels L into a predetermined length to the shot roller 50 and the distance from the label transfer mechanism 40 to the shot roller 50 are both greater than the length of the cut-apart labels L. Accordingly, twisting of the labels L can be prevented effectively.

The configurations of the first through sixth embodiments may be combined as appropriate. For example, the label-fitting device 1 of the second embodiment may be combined with at least one of the rebound prevention member 80 or the label position alignment device 90 explained in the third embodiment, the control device for controlling the label delivery speed as explained in the fourth embodiment, the vertically-arranged upper and lower shot roller pairs explained in the fifth embodiment, and the spacing adjustment mechanism 153 explained in the sixth embodiment. When combining the second embodiment and the fifth embodiment, the angle adjustment mechanism for adjusting the inclination angle of the shot rollers may be provided for only one of the upper shot roller pair 50u or the lower shot roller pair 50d, or may be provided for both of the shot roller pairs. The label-fitting device 1 of the third embodiment may be combined with at least one of the control device for controlling the label delivery speed as explained in the fourth embodiment, the vertically-arranged upper and lower shot roller pairs explained in the fifth embodiment, and the spacing adjustment mechanism 153 explained in the sixth embodiment. Further, the label-fitting device 1 of the fourth embodiment may be combined with at least one of the vertically-arranged upper and lower shot roller pairs explained in the fifth embodiment and the spacing adjustment mechanism 153 explained in the sixth embodiment. Furthermore, the label-fitting device 1 of the fifth embodiment may be combined with the spacing adjustment mechanism 153 explained in the sixth embodiment. In this case, the spacing adjustment mechanism 153 may be provided for only one of the upper shot roller pair 50u or the lower shot roller pair 50d, or may be provided for both of the shot roller pairs.

While a servo motor is used as the shot roller motor 51 serving as the means for driving the shot roller 50 in the above-described embodiments, the present invention is not limited by this feature. Various drive means, including a stepping motor for example, can be employed, so long as those means are capable of attaining a rotational speed corresponding to the final fitting speed in a very short time after starting the rotational drive of the shot roller 50. It is particularly desirable to use a servo motor having high accuracy in controlling speed changes at times of high-speed rotation.

While, in the above-described first through fifth embodiments, the label L transfer speed at the point when the label transfer mechanism 40 hands over the label L to the shot rollers 50 and the downward moving speed of the label L at the point when the label L is received by the shot rollers 50 are preferably set to substantially identical speeds, the present invention is not limited by this feature. So long as there is no extreme speed difference, the speed of label L transfer by the label transfer mechanism 40 when handing over the label L may differ, by approximately 3%, for example, with respect to the speed of label L downward movement by the shot rollers 50.

Further, while the above-described embodiments are configured such that, when the shot rollers 50 hold a label L against the mandrel 20, the label L is located apart from the label transfer mechanism 40, the present invention is not limited by this feature. So long as the time incurred for handing over the label L is short, the label transfer mechanism 40 and the shot rollers 50 may simultaneously hold the label L. However, in the case in which the label transfer mechanism 40 and the shot rollers 50 simultaneously hold a label L when handing over the label L, in order to avoid damaging the label L by pulling the label in the vertical direction at the time of handing over, it is desirable to set the speed of label L transfer by the label transfer mechanism 40 when handing over the label L to a speed substantially identical to the speed of label L downward movement caused by the shot rollers 50.

While the above-described first through fifth embodiments are configured such that the label L leaves the shot rollers 50 after the shot rollers 50 have attained their constant-speed rotation, the present invention is not limited by this feature. It may be configured such that the label L leaves the shot rollers 50 during the acceleration stage leading to the constant-speed rotation.

While, in the above-described first through fifth embodiments, the circumferential speed of the shot rollers 50 is changed in a trapezoid form having an acceleration region, a constant-speed region, and a deceleration region at the time of label L delivery by the shot rollers 50, the present invention is not limited by this feature. The circumferential speed of the shot rollers 50 may alternatively be changed in a peaked form having almost no constant-speed region.

Further, while the above-described first through fifth embodiments are configured such that the drive of the shot rollers 50 is temporarily stopped after the shot rollers 50 have delivered a label L, and then re-started at the stage of handing over of a subsequent label L, the present invention is not limited by this feature. Rotational drive of the shot rollers 50 may alternatively be continued from the point of label L delivery to the point of label L hand-over.

While the inclination angle of the shot rollers 50 may be set in the range from approximately 5 to 85 degrees, in order to obtain sufficient centrifugal force while also attaining sufficient delivery speed, an angle in the range from 30 to 70 degrees is preferred, and an angle in the range from 45 to 70 degrees is more preferred.

While, in the above-described embodiments, the shot roller motors 51 are installed on opposite sides of the bottle container B transport path so as to avoid interference with members, the present invention is not limited by this feature. The shot roller motors 51 may be mounted above the transport path if no interference with members is caused. Further, while it is preferred to provide a pair of shot rollers 50, three or four shot rollers 50 may alternatively be provided around the label-shaping part 25 of the mandrel 20.

While in the above-described embodiments a roller 26 or a ball 27 is installed in the label-shaping part 25 of the mandrel 20 in a position corresponding to each shot roller 50, the present invention is not limited by this feature, and it is possible to omit the roller 26 and the ball 27. However, in consideration of possible damages to the labels L, it is naturally preferred to provide the roller 26 or the ball 27.

While in the above-described embodiments the label transfer mechanism 40 includes the feed belt units 40A, 40B, the present invention is not limited by this feature. It is possible to form the label transfer mechanism 40 using simple roller units including only a plurality of rollers for holding the label-forming medium LM and the label L against the mandrel 20.

While a guillotine-type medium cut unit 30 is provided above the mandrel 20 in the above-described embodiments, the present invention is not limited by this feature. Instead of using a guillotine-type cut unit, the label-forming medium LM folded in sheet form may be cut along the width direction by means of a rotating blade. Further, a circle cutter may be installed surrounding the mandrel 20. Specifically, in the case of using a circle cutter, it is necessary to increase the length of the mandrel and install the label transfer mechanism and the shot rollers downstream of the circle cutter.

While the shot rollers 50 are mounted at a position at the lower end of the mandrel 20 in the above-described embodiments, the shot rollers 50 may be mounted at other positions so long as those positions are located below the mandrel, and the position of the shot rollers 50 is not necessarily limited to the position at the lower end of the mandrel 20.

While, in the above-described embodiments, a large number of vertical grooves are formed on the label-shaping part 25 of the mandrel 20 so as to reduce the area of contact with the label L and to facilitate unfolding of the label L in the radial direction, the present invention is not limited by this feature. Instead, slanted grooves or grid-like grooves may be formed. Alternatively, it is possible to not provide any grooves.

Further, while the above-described embodiments refer to a label-fitting device 1 that cuts apart a label L from a long label-forming medium LM and fits the label L around the trunk of a bottle container B, the present invention is not limited by this feature. A film-fitting device according to the present invention may be applied to various devices for fitting a tubular film around a container or other bodies to be subjected to fitting while opening the tubular film folded in sheet form, such as a cap seal fitting device that arranges a tubular cap seal around an opening portion of a container.

While, in the above-described second and fourth embodiments, two arc-shaped elongate holes 53, 54 in the support plate 52 for mounting a shot roller motor 51 are formed along concentric circles having the center at the ball roller 27, and the inclination angle of a shot roller 50 is changed by sliding the slide pins 55, 56, which are attached to the shot roller motor 51, along the respective elongate holes 53, 54, the present invention is not limited by this feature. Various structures may be employed so long as those structures can support the shot roller 50 in a manner pivotable about the axis that extends in a radial direction of the shot roller 50 from the ball roller 27.

While the above-described second and fourth embodiments are configured such that the inclination angle of the shot rollers 50 is in the range from 0 to 60 degrees and such that the label-fitting device can be used also when no inclination is required, it is alternatively possible to configure such that the inclination angle of the shot rollers 50 can be set in the range from 5 to 85 degrees. In order to obtain sufficient centrifugal force while also attaining sufficient delivery speed, the angle may be adjustable in the range from 30 to 70 degrees.

Furthermore, the sensors for detecting labels and bottles are not limited to optical sensors, Other types of sensors such as ultrasonic sensors may alternatively be used.

What is claimed is:

1. A film-fitting device which sequentially delivers tubular films downstream while opening each tubular film by arranging the tubular film around a mandrel, and thereby causes the tubular film to be fitted around a body to be subjected to fitting that is transported to a position facing the mandrel, the film-fitting device comprising:
   a cutting mechanism that cuts a tube-forming medium into a predetermined length so as to form a tubular film having the predetermined length;
   a film transfer mechanism that transfers downstream the tubular film arranged around the mandrel; and
   at least one shot roller installed with its rotational shaft being slanted with respect to an axis core of the mandrel, the shot roller receiving the tubular film transferred by the film transfer mechanism, by causing the tubular film to be held between the shot roller and the mandrel, and delivering the tubular film downstream while rotating the tubular film in a circumferential direction, wherein
- a distance from the cutting mechanism to the shot roller and a distance from the film transfer mechanism to the shot roller are both greater than the length of the tubular film formed by the cutting; and
- rotational drive of the shot roller is carried out by an independent servo motor or stepping motor.

2. The film-fitting device as defined in claim 1, wherein the shot roller is provided in a pair, and the pair of shot rollers are arranged on opposite sides of a transport path of the body to be subjected to fitting.

3. The film-fitting device as defined in claim 1, wherein a transfer speed of the tubular film at a point when the film transfer mechanism hands over the tubular film to the shot roller and a downstream moving speed of the tubular film at a point when the tubular film is received by the shot roller are set to substantially identical speeds.

4. The film-fitting device as defined in claim 1, wherein the cutting mechanism is provided upstream of the mandrel and forms the tubular film having the predetermined length by cutting, into the predetermined length, the tube-forming medium folded in sheet form.

5. The film-fitting device as defined in claim 1, further comprising an angle adjustment mechanism that supports the shot roller in a manner pivotable about an axis that extends in a radial direction of the shot roller from a portion on the mandrel against which the shot roller holds the tubular film, the angle adjustment mechanism serving to adjust an angle of inclination of the shot roller.

6. The film-fitting device as defined in claim 5, wherein
- a ball roller that is freely rotatable in arbitrary directions is mounted on the mandrel; and
- the tubular film is to be held between the ball roller and the shot roller.

7. The film-fitting device as defined in claim 1, wherein
- the tubular film is formed to have a tubular shape by overlapping two side edge portions of a film in a width direction with each other and joining the overlapped part, and the tubular film has a non-joint part on a tip side of the joint part at a first side edge portion which is located on an inner side of the overlapped part; and
- the shot roller rotates the tubular film in a circumferential direction toward a tip of a second side edge portion of the tubular film which is located on an outer side of the overlapped part.

8. The film-fitting device as defined in claim 7, wherein
- the mandrel includes a tapered and wedge-shaped tubular film opening part toward an upstream side, and a tubular film shaping part that has a circular cross-section and is connected to a downstream part of the tubular film opening part; and
- a plurality of longitudinal grooves are provided on an outer surface of the tubular film shaping part.

9. The film-fitting device as defined in claim 1, further comprising a rebound prevention member that is provided near a fitting position at which a tubular film is fitted around a body to be subjected to fitting, and that abuts a tubular film that jumps up while surrounding a body to be subjected to fitting.

10. The film-fitting device as defined in claim 9, wherein the rebound prevention member has an abutting portion that abuts a trailing edge part of the tubular film, and this abutting portion is arranged on an upstream side or a lateral side of each sequentially-transported body to be subjected to fitting, the upstream side and the lateral side defined in terms of a direction in which the tubular film is fitted.

11. The film-fitting device as defined in claim 9, wherein the rebound prevention member comprises a rotary brush that is placed in sliding contact with an outer surface of the tubular film.

12. The film-fitting device as defined in claim 9, wherein the rebound prevention member is a check member that, when contacted by an outer surface or an edge part of the tubular film fitted around the body to be subjected to fitting, permits movement of the tubular film in a fitting direction but inhibits movement of the tubular film in a direction opposite to the fitting direction.

13. The film-fitting device as defined in claim 1, wherein the at least one shot roller comprises:
- an upper shot roller that holds a tubular film arranged around the mandrel against the mandrel and delivers the tubular film downstream; and
- a lower shot roller that receives the tubular film delivered downstream by the upper shot roller, by holding the tubular film against the mandrel, and directly delivers the tubular film downstream so as to fit the tubular film around the body to be subjected to fitting that is transported to the position facing the mandrel,
wherein, when the lower shot roller is holding the tubular film against the mandrel, the lower shot roller is rotating at a rotational speed which equals a converted delivery-direction circumferential speed obtained by converting a fitting speed into a circumferential speed in the tubular film delivery direction.

14. The film-fitting device as defined in claim 13, wherein a speed of downstream delivery of the tubular film by the lower shot roller is set higher than a speed of downstream delivery of the tubular film by the upper shot roller.

15. The film-fitting device as defined in claim 1, wherein the at least one shot roller comprises:
- an upper shot roller that holds a tubular film arranged around the mandrel against the mandrel and delivers the tubular film downstream; and
- a lower shot roller that receives the tubular film delivered downstream by the upper shot roller, by holding the tubular film against the mandrel, and directly delivers the tubular film downstream so as to fit the tubular film around the body to be subjected to fitting that is transported to a position facing the mandrel,
wherein, at a point at which the lower shot roller receives the tubular film from the upper shot roller, a converted delivery-direction circumferential speed of the upper shot roller, which indicates a circumferential speed in the tubular film delivery direction, substantially equals a converted delivery-direction circumferential speed of the lower shot roller, which indicates a circumferential speed in the tubular film delivery direction, and the lower shot roller is accelerated after the received tubular film is disengaged from the upper shot roller.

16. The film-fitting device as defined in claim 1, wherein
- in the body to be subjected to fitting, its head part has a smaller diameter than its trunk part;
- a grooved part extending along a transport direction of the body to be subjected to fitting is formed in a downstream end part of the mandrel; and
- when the body to be subjected to fitting passes the position facing the mandrel, the head part having the smaller diameter in the body to be subjected to fitting passes through the grooved part.

17. The film-fitting device as defined in claim 1, further comprising:
- a fitting manner detection mechanism that detects according to which of a first or second fitting manner the tubular film was fitted, the first fitting manner being that a tubular film delivered from the mandrel by the shot roller is fitted around the body to be subjected to fitting by stopping before reaching a placement surface on which the body to be subjected to fitting is placed, the second fitting manner being that a tubular film delivered from the mandrel by the shot roller is fitted around the body to be subjected to fitting by first reaching and rebounding against the placement surface and then stopping;

a fitted position detection mechanism that detects a fitted position of the tubular film delivered from the mandrel by the shot roller and fitted around the body to be subjected to fitting, the fitted position being a position from the placement surface;

a judging unit that judges, based on the fitted position of the tubular film detected by the fitted position detection mechanism, whether or not correction of a tubular film delivery speed of the shot roller is necessary; and a delivery speed changing mechanism that, when the judging unit judges that correction of the tubular film delivery speed is necessary, changes the tubular film delivery speed of the shot roller based on the fitting manner of the tubular film detected by the fitting manner detection mechanism and the fitted position of the tubular film detected by the fitted position detection mechanism, wherein the delivery speed changing mechanism increases the tubular film delivery speed when the tubular film is fitted according to the first fitting manner and its fitted position is beyond a predetermined fitted range, and decreases the tubular film delivery speed when the tubular film is fitted according to the second fitting manner and its fitted position is beyond a predetermined fitted range.

18. The film-fitting device as defined in claim 17, wherein the fitting manner detection mechanism includes:
   a first sensor installed along a moving path of the tubular film delivered by the shot roller, at a predetermined position close to but outside the predetermined fitted range defined relative to the placement surface; and
   a distinguishing unit that distinguishes the fitting manner of the tubular film delivered by the shot roller based on a waveform of an output signal from the first sensor, and
the fitted position detection mechanism includes:
   a second sensor having a predetermined length, the second sensor being installed adjacent to the first sensor and extending upward from a height at which the first sensor is located; and
   a position detector that detects the fitted position of the tubular film delivered by the shot roller based on a waveform of an output signal from the second sensor.

19. The film-fitting device as defined in claim 18, wherein the judging unit
judges that correction of the tubular film delivery speed is not necessary when the fitted position of the tubular film detected by the fitted position detection mechanism is within the predetermined fitted range;
judges that correction of the tubular film delivery speed by a preset first amount of change is necessary when the fitted position of the tubular film corresponds to a first fitted position which has a value less than or equal to a predetermined threshold value set beyond the predetermined fitted range; and
judges that correction of the tubular film delivery speed by a preset second amount of change larger than the first amount of change is necessary when the fitted position of the tubular film corresponds to a second fitted position which has a value greater than the predetermined threshold value, and the delivery speed changing mechanism
increases the tubular film delivery speed by the first amount of change when the tubular film is fitted according to the first fitting manner and its fitted position corresponds to the first fitted position;
increases the tubular film delivery speed by the second amount of change when the tubular film is fitted according to the first fitting manner and its fitted position corresponds to the second fitted position;
decreases the tubular film delivery speed by the first amount of change when the tubular film is fitted according to the second fitting manner and its fitted position corresponds to the first fitted position; and
decreases the tubular film delivery speed by the second amount of change when the tubular film is fitted according to the second fitting manner and its fitted position corresponds to the second fitted position.

20. The film-fitting device as defined in claim 17, wherein
an angle of a roller surface of the shot roller with respect to a vertical line is changeable, and
a predetermined amount of change by which the tubular film delivery speed is changed is preset in correlation to the angle of the roller surface with respect to the vertical line.

21. The film-fitting device as defined in claim 1, further comprising
a spacing adjustment mechanism for causing the shot roller to approach and depart from the mandrel,
wherein
the cutting mechanism is provided upstream of the mandrel, and forms the tubular film having the predetermined length by cutting, into the predetermined length, the tube-forming medium folded in sheet form, and
the film-fitting device is configured such that, while the shot roller is continuously rotated at a rotational speed corresponding to a fitting speed, the spacing adjustment mechanism causes the shot roller to approach the mandrel in synchronization with a timing for fitting the tubular film, so that the shot roller holds the tubular film against the mandrel and delivers the tubular film downstream, and, after the shot roller has delivered the tubular film, the spacing adjustment mechanism causes the shot roller to depart from the mandrel.

22. The film-fitting device as defined in claim 1, further comprising
a spacing adjustment mechanism for causing the shot roller to approach and depart from the mandrel,
wherein
the cutting mechanism is a circle cutter that cuts apart a tubular film having the predetermined length from the tube-forming medium which has a long sleeve-like shape and is arranged around the mandrel, and
the film-fitting device is configured such that, while the shot roller is continuously rotated at a rotational speed corresponding to a fitting speed, the spacing adjustment mechanism causes the shot roller to approach the mandrel in synchronization with a timing for fitting the tubular film, so that the shot roller holds the tubular film against the mandrel and delivers the tubular film downstream, and, after the shot roller has delivered the tubular film, the spacing adjustment mechanism causes the shot roller to depart from the mandrel.

* * * * *